(12) United States Patent
Inoue et al.

(10) Patent No.: US 7,909,359 B2
(45) Date of Patent: Mar. 22, 2011

(54) SIDE AIRBAG APPARATUS

(75) Inventors: Michio Inoue, Aichi-ken (JP); Takashi Naito, Aichi-ken (JP); Yuji Sato, Aichi-ken (JP); Daisuke Yamamura, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 318 days.

(21) Appl. No.: 12/076,867

(22) Filed: Mar. 25, 2008

(65) Prior Publication Data

US 2008/0238057 A1  Oct. 2, 2008

(30) Foreign Application Priority Data

Mar. 30, 2007  (JP) ................................ 2007-091249
Mar. 30, 2007  (JP) ................................ 2007-091250

(51) Int. Cl.
  *B60R 21/207* (2006.01)
(52) U.S. Cl. ................... 280/730.2; 280/735; 280/743.2
(58) Field of Classification Search .................. 280/729, 280/730.2, 735, 742, 743.1, 743.2; 701/45
See application file for complete search history.

(56) References Cited

U.S. PATENT DOCUMENTS

| | | | | | |
|---|---|---|---|---|---|
| 5,489,119 | A | * | 2/1996 | Prescaro et al. | 280/743.2 |
| 6,003,938 | A | * | 12/1999 | Lachat et al. | 297/216.13 |
| 6,012,008 | A | * | 1/2000 | Scully | 701/45 |
| 6,045,151 | A | * | 4/2000 | Wu | 280/728.3 |
| 6,712,389 | B2 | * | 3/2004 | Mauleon | 280/743.2 |
| 6,857,659 | B2 | * | 2/2005 | Webber | 280/743.2 |
| 2003/0189328 | A1 | * | 10/2003 | Cooper et al. | 280/743.2 |

FOREIGN PATENT DOCUMENTS

JP    A-2004-276808    10/2004

* cited by examiner

*Primary Examiner* — Paul N Dickson
*Assistant Examiner* — Joseph Rocca
(74) *Attorney, Agent, or Firm* — Posz Law Group, PLC

(57) ABSTRACT

A side airbag apparatus is provided with an inflator, and an airbag. The airbag is stored in a vehicle seat, is inflated and deployed by gas from the inflator, breaks the vehicle seat so as to jump out, and is inflated and deployed between a body side portion of a vehicle and the vehicle seat. In this side airbag apparatus, a controller predicts a side collision of the vehicle, and makes the inflator start an actuation in advance of the side collision in response to the prediction. Further, in the airbag inflated and deployed in accordance with the actuation start of the inflator, a deploying speed of the airbag is lowered in comparison with the deploying speed at a time of starting the actuation of the inflator after the side collision, at least outside the vehicle seat.

10 Claims, 31 Drawing Sheets

REAR ← → FRONT

Fig.7
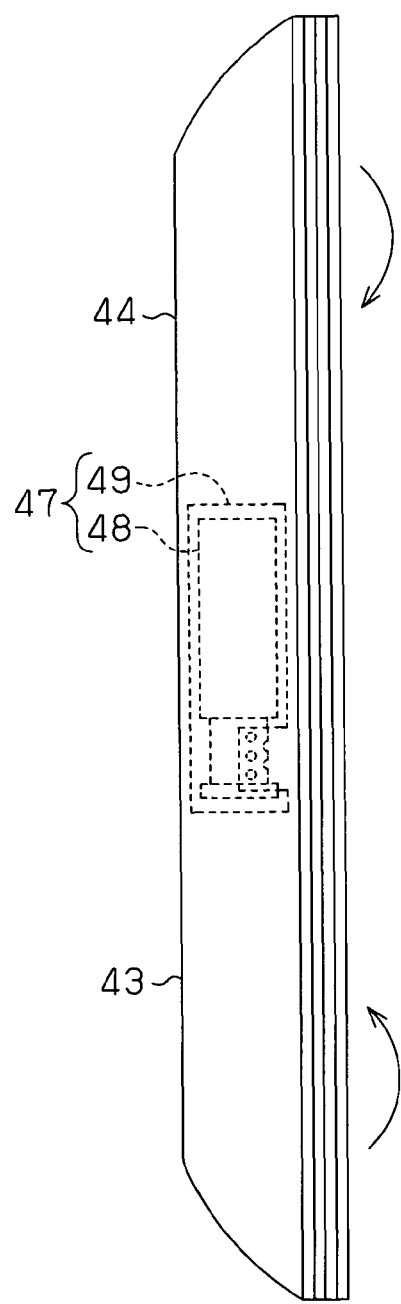
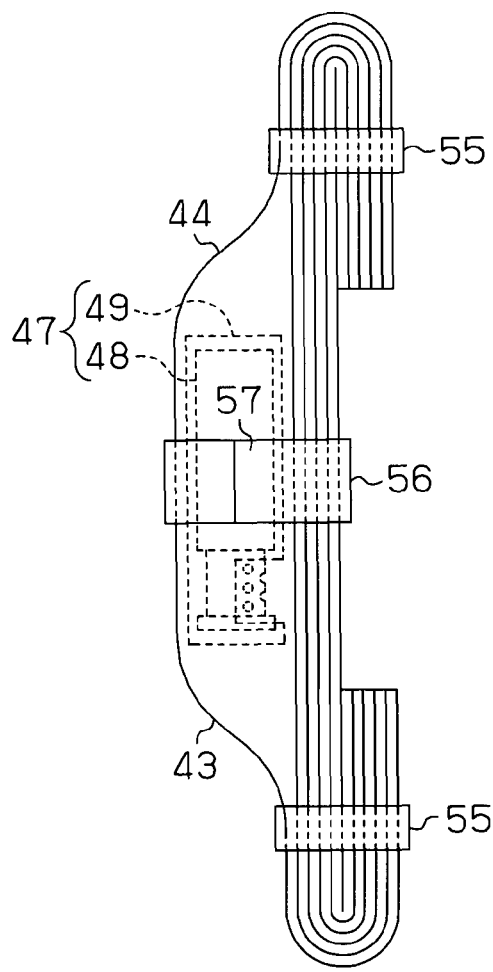

REAR ← → FRONT

REAR ← → FRONT

REAR ← → FRONT (A) [NONRESTRICTIVE POSITION]

(B) [RESTRICTIVE POSITION]

| SEATING POSTURE | SPECIFIC POSTURE | | | NORMAL POSTURE | | |
|---|---|---|---|---|---|---|
| SIDE COLLISION SPEED | LOW SPEED | MEDIUM SPEED | HIGH SPEED | LOW SPEED | MEDIUM SPEED | HIGH SPEED |
| ACTUATION START TIME | EARLY STAGE | | | NORMAL | EARLY STAGE | |
| DEPLOYING SPEED | LOW SPEED | | | NORMAL | | |

REAR ← → FRONT

| SEATING POSTURE | SPECIFIC POSTURE | | | NORMAL POSTURE | | |
|---|---|---|---|---|---|---|
| SIDE COLLISION SPEED | LOW SPEED | MEDIUM SPEED | HIGH SPEED | LOW SPEED | MEDIUM SPEED | HIGH SPEED |
| ACTUATION START TIME | EARLY STAGE | EARLY STAGE | EARLIEST STAGE | NORMAL | EARLY STAGE | EARLIEST STAGE |
| DEPLOYING SPEED | LOW SPEED | | | NORMAL | | |

SIDE AIRBAG APPARATUS

BACKGROUND OF THE INVENTION

The present invention relates to a side airbag apparatus which inflates and deploys an airbag between a body side portion of a vehicle and a vehicle seat, and cushions a shock from a side portion of the vehicle so as to protect a passenger.

For example, Japanese Laid-Open Patent Publication No. 2004-276808 discloses a side airbag apparatus protecting a passenger from a shock caused by a side collision. The side airbag apparatus is provided with an inflator and an airbag. The airbag is stored in a seat back of a vehicle seat in a state of being folded and made compact.

In the side airbag apparatus, if a shock is applied to the body side portion of the vehicle from a side, the inflator is activated so as to blow out a gas into the airbag. The airbag is inflated and deployed by the blown-out gas, and a specific position of the seat back is broken. The airbag flies out forward from the broken position of the seat back while leaving a part thereof within the seat back. The airbag is inflated and deployed in a narrow passenger restraint region between a passenger seated on a vehicle seat and the body side portion, in the manner mentioned above. Since the inflated and deployed airbag is interposed between the passenger and body side portion, the passenger is restrained and the shock from the side portion is absorbed.

In this case, in a side collision, since the passenger restraint region mentioned above is very narrow in comparison with other types collisions, for example, a front collision, it is necessary to inflate and deploy the airbag in a short period of time immediately after a side collision occurs, in the light of a passenger protection. Accordingly, the airbag is inflated and deployed at a high speed actually at a time of detecting the side collision.

However, in the case of inflating and deploying the airbag at a high speed, since an energy applied to the passenger from the airbag is high, it is hard to reliably restrain the passenger. The problem mentioned above tends to be generated particularly in the case where the passenger is seated on a place which is deviated from a normal position, and a part of the body is positioned in a region in which the airbag is inflated and deployed.

SUMMARY OF THE INVENTION

An objective of the present invention is to provide a side airbag apparatus in which a passenger protection performance is improved regardless of a seating posture of a passenger.

To achieve the foregoing objective and in accordance with one aspect of the present invention, a side airbag apparatus absorbing a shock from a side portion of a vehicle so as to protect a passenger is provided. The side airbag apparatus includes an inflator blowing out gas, an airbag stored in a vehicle seat, inflator control means, and a deployment control assembly. The airbag is inflated and deployed by the gas from the inflator, breaks the vehicle seat so as to jump out of the vehicle seat, and is inflated and deployed between a body side portion of the vehicle and the vehicle seat. The inflator control means predicts a side collision of the vehicle, and starts an actuation of the inflator in advance of the side collision in response to the prediction. The deployment control assembly lowers a deploying speed of the airbag in comparison with a deploying speed at a time of starting the actuation of the inflator after the side collision, at least outside the vehicle seat.

BRIEF DESCRIPTION OF THE DRAWINGS

FIG. 7(A) is a side elevational view showing the accordion folded airbag;

FIG. 7(B) is a side elevational view showing the airbag formed as a storage mode;

DETAILED DESCRIPTION OF THE PREFERRED EMBODIMENTS

First Embodiment

A description will be given below of a first embodiment in accordance with the present invention with reference to FIGS. 1 to 17. The following description is given on the assumption that a forward moving direction of a vehicle is set to a front side, and a backward moving direction of the vehicle is set to a rear side. Further, a vertical direction indicates a vertical direction of the vehicle, and a left and right direction indicates a vehicle width direction of the vehicle, that is, a left and right direction when the vehicle moves forward.

Figure 1:
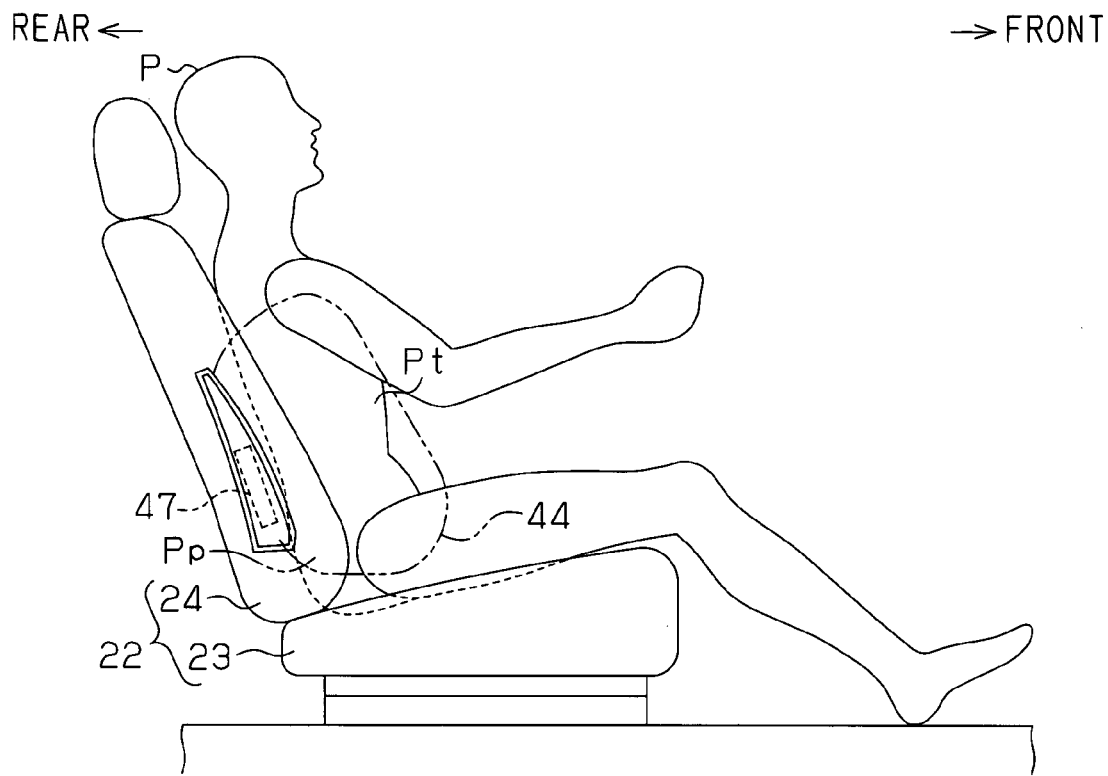
FIG. 1 is a schematic side elevational view of a vehicle seat to which a side airbag apparatus in accordance with a first embodiment of the present invention is applied.
Figure 2:
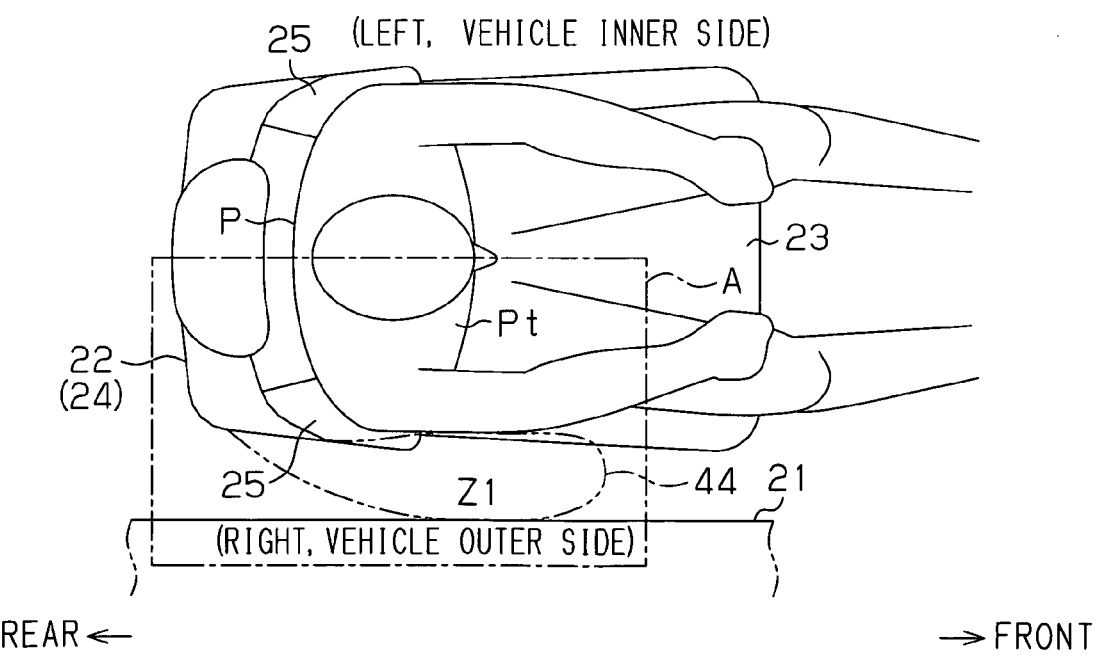
FIG. 2 is a schematic plan view explaining a positional relation between the vehicle seat and a body side portion.

As shown in FIGS. 1 and 2, a vehicle seat 22 is arranged near a body side portion 21 within a passenger compartment. The body side portion 21 is a member constructing a side portion of the vehicle, and is mainly constituted by doors, pillars and the like. The body side portion 21 corresponding to a front seat is constituted by a front door, a center pillar (a B pillar) and the like, and the body side portion 21 corresponding to a rear seat is constituted by a rear portion of a side door (a rear door), a C pillar, a front portion of a wheel well, a rear quarter and the like. The vehicle seat 22 is provided with a seat cushion (a seat portion) 23 and a seat back (a backrest portion) 24.

Figure 3:
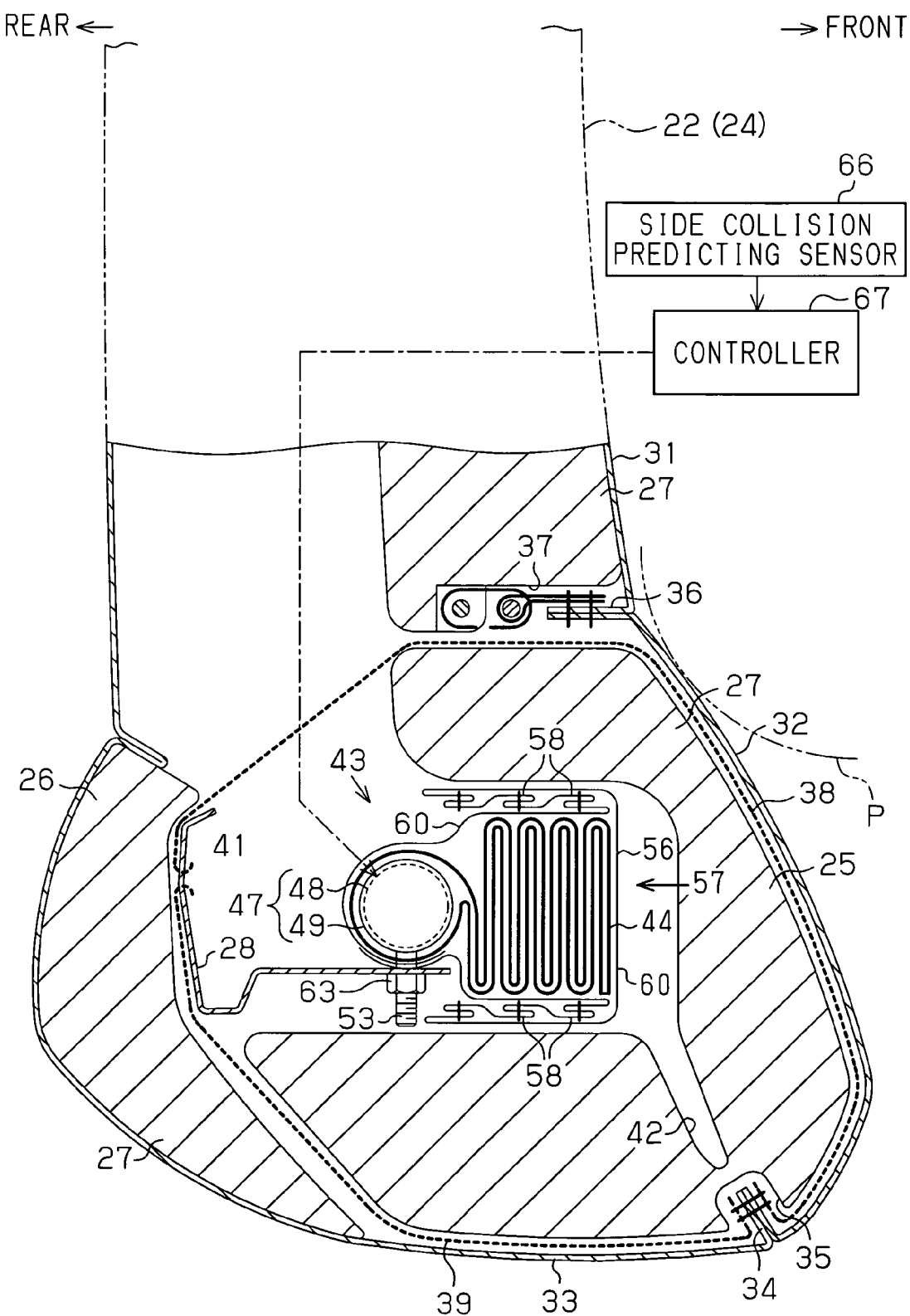
FIG. 3 is a partial cross-sectional plan view showing an inner structure of a seat back.

As shown in FIGS. 2 and 3, the seat back 24 has a side support portion 25 in each of both side portions 26. Both side support portions 25 are structured such as to regulate a motion of a passenger P seated on the vehicle seat 22 in the vehicle width direction.

Next, a description will be given of an inner structure of each side portion 26 of the seat back 24.

A seat frame forming a framework of the seat back 24 is arranged within the seat back 24. As shown in FIG. 3, a seat pad 27 constituted by an elastic material such as urethane foam or the like is arranged around the seat frame. A part of the seat frame is arranged within each side portion 26 of the seat back 24. This portion (hereinafter, refer to as a side frame portion 28) is formed by bending a metal plate.

The seat pad 27 is coated with a plurality of seat cover sheets 31 to 33. The seat cover sheets 32 and 33 are seamed in a side surface of the side support portion 25. The seamed portion 34 is accommodated in a groove portion 35 provided in the seat pad 27. The seamed portion 34 has a lower strength than a non-seamed portion in both seat cover sheets 32 and 33. Accordingly, the seamed portion 34 constructs a part of a breakable portion to be broken by an airbag 44.

Further, the seat cover sheets 31 and 32 are seamed in a root portion of the side support portion 25. The seamed portion 36 is accommodated within a groove portion 37 provided in a front portion of the seat pad 27 in a state of being pulled to a rear side.

Further, two stay cloth sheets 38 and 39 are provided between the seat cover sheets 32 and 33 and the seat pad 27. The stay cloth sheets 38 and 39 are wound around the side frame portion 28 and an airbag module 43. Each of the stay cloth sheets 38 and 39 is formed as a band shape by a hardly expandable material for the purpose of improving a deploying performance of the airbag 44. One end portion of each of the stay cloth sheets 38 and 39 is seamed in the seamed portion 34 together with the seat cover sheets 32 and 33. Further, the other end portion of each of the stay cloth sheets 38 and 39 is locked to the side frame portion 28. Both stay cloth sheets 38 and 39 are expanded at an early stage of the inflation and deployment of the airbag 44. Accordingly, it is possible to suppress the deployment and inflation of the airbag 44 in a different direction from a predetermined direction. Further, both stay cloth sheets 38 and 39 inhibit a deformation of the seat pad 27 and an elongation of the seat cover sheets 32 and 33 so as to set the breakable portion as a trigger of the breakage.

The seat pad 27 is provided with a storage space 41 for installing the airbag module 43 near the side frame portion 28. A slit 42 extends toward the seamed portion 34 of the seat cover sheets 32 and 33 from the storage space 41. In the seat pad 27, a portion between the slit 42 and the seamed portion 34 is thin, and this portion constructs the breakable portion together with the seamed portion 34.

Figure 5:
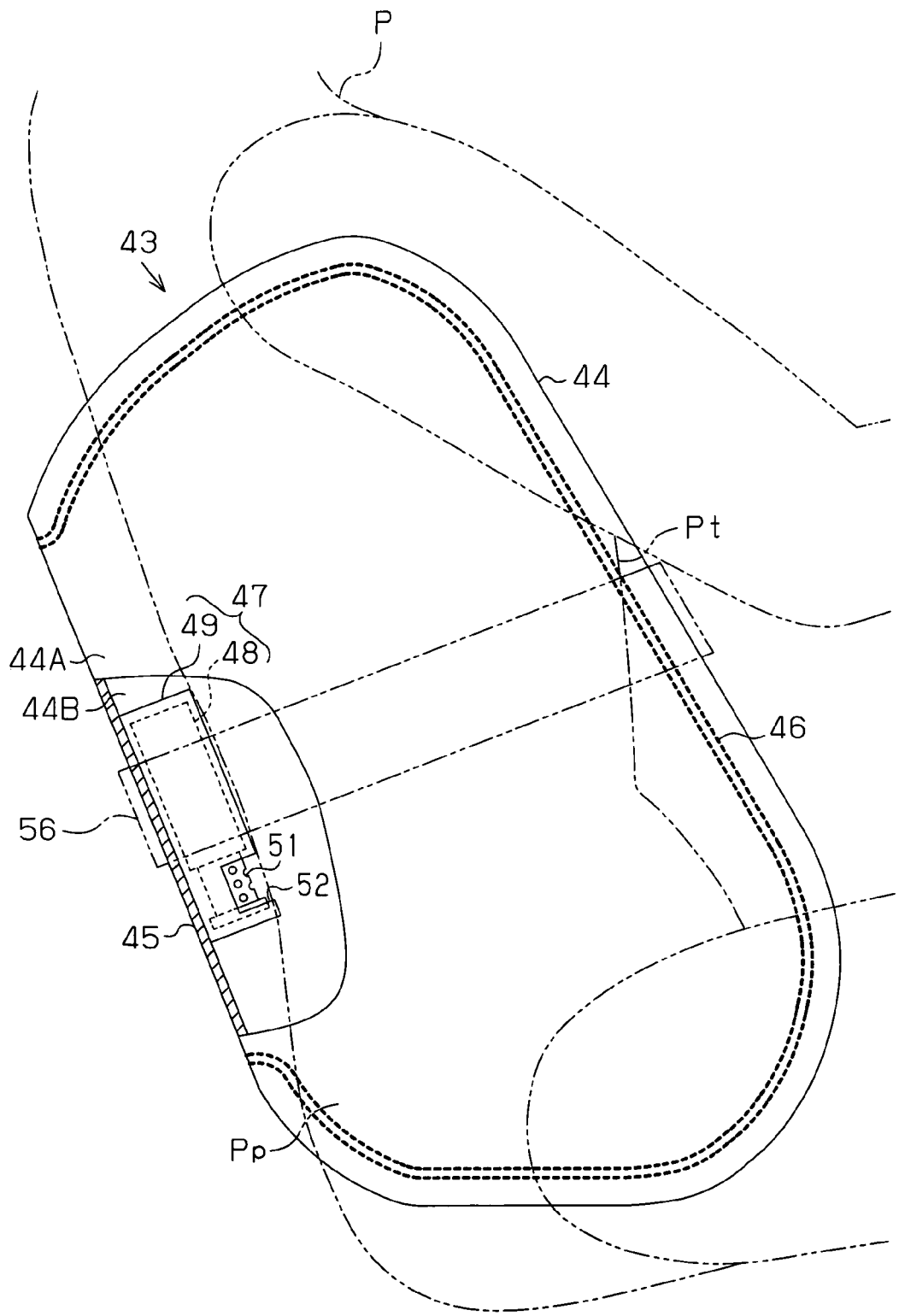
FIG. 5 is a side elevational view showing a positional relation between the airbag module and a passenger when the airbag is deployed.
Figure 6:
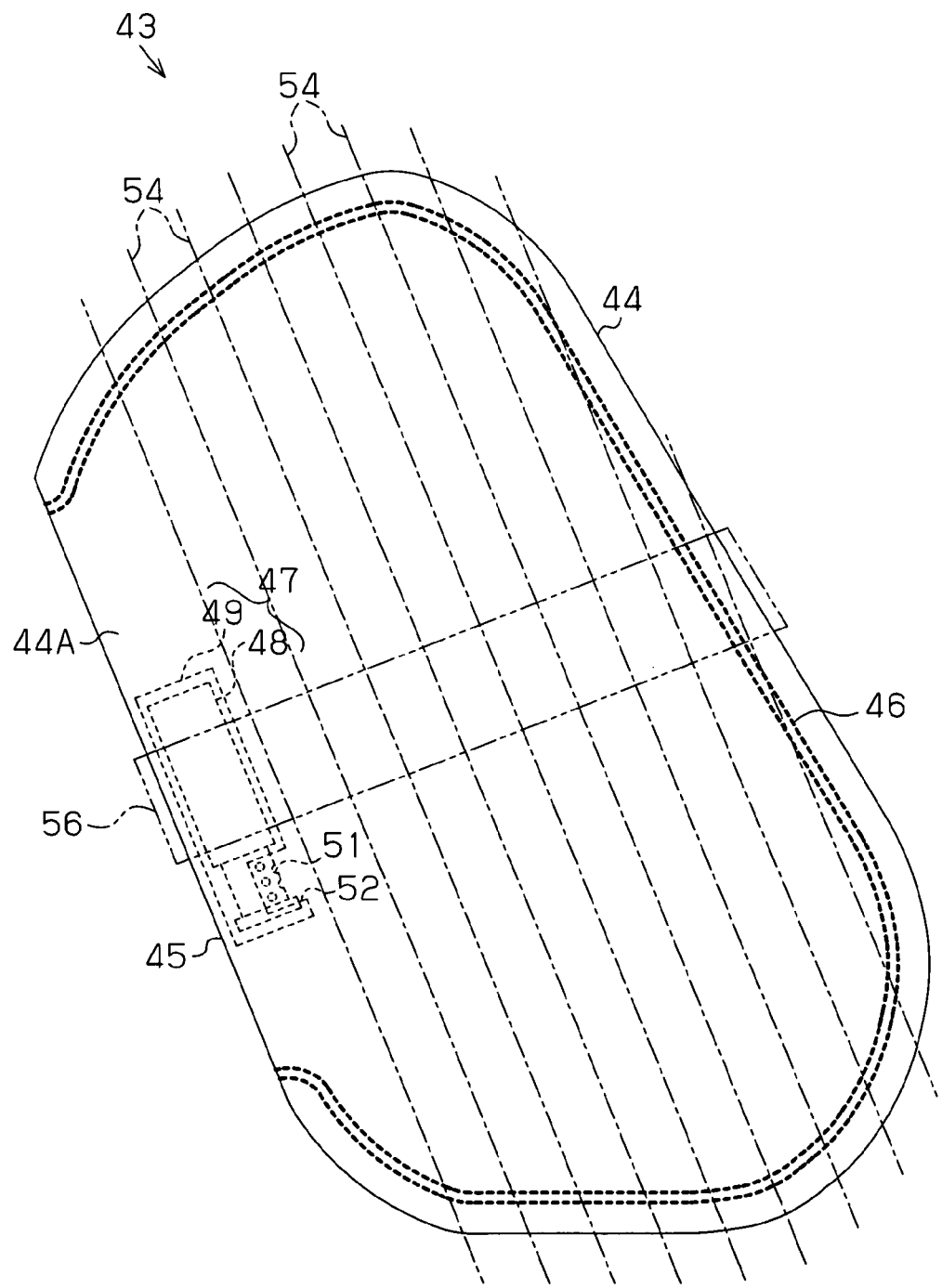
FIG. 6 is a side elevational view showing a fold line when the airbag is accordion folded.
Figure 8:
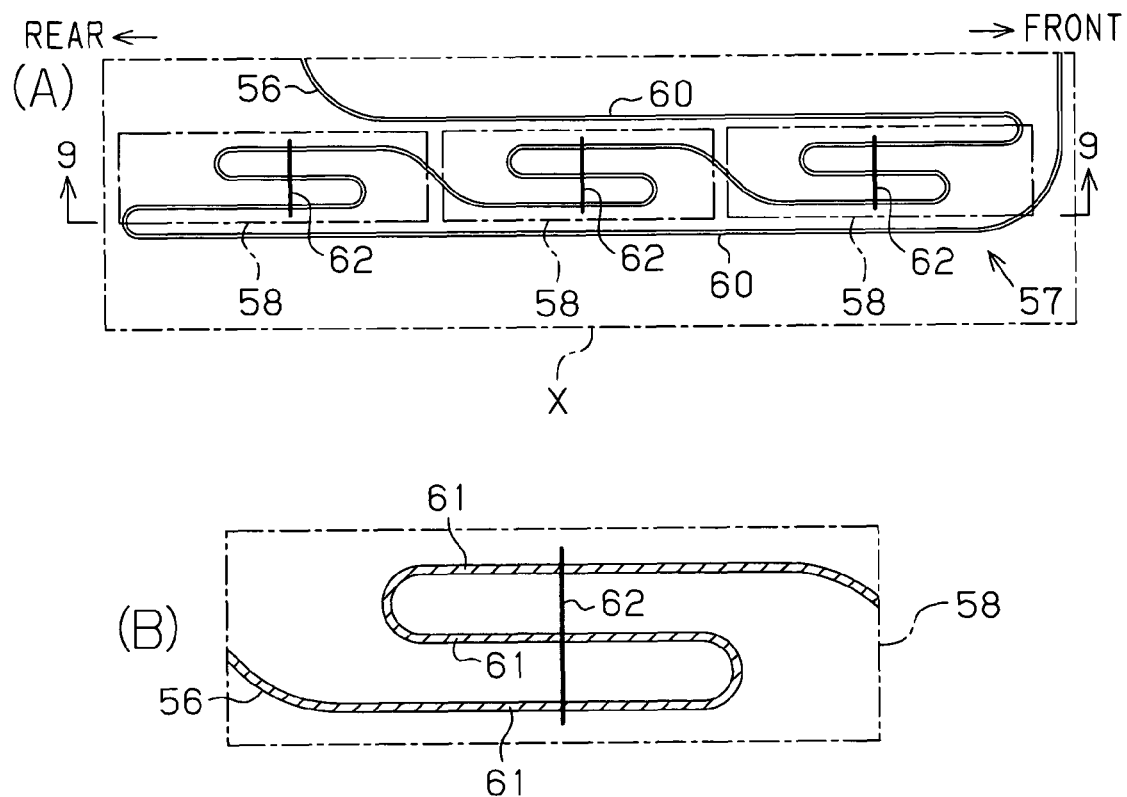
FIG. 8(A) is a cross-sectional plan view showing a portion X in FIG. 4 in an enlarged manner.
FIG. 8(B) is a partial cross-sectional plan view showing a first redundant portion in FIG. 8(A)

The airbag module 43 is provided with the airbag 44 and an inflator assembly 47. Next, a description will be given of each of these constituting members. FIGS. 5 and 6 show the airbag module 43 in a state in which the airbag 44 is deployed without being filled with gas.

<Airbag 44>

As shown in FIG. 5, the airbag 44 is formed as a bag shape by one base fabric sheet. The base fabric sheet is formed by a raw material which has a high strength and a flexibility and can be easily folded, for example, a woven fabric sheet constituted by polyester yarn, polyamide yarn or the like.

At a time of forming the airbag 44, the base fabric sheet having a predetermined shape is first folded into two in the center. Based on this, a pair of overlapping portions 44A and 44B having an identical shape to each other are formed. Both overlapping portions 44A and 44B are arranged so as to be directed to a rear side in a center line 45. Further, both overlapping portions 44A and 44B have a size and a shape which cover a region from a lumbar region Pp of the passenger P to a thorax Pt when the inflation and deployment of the airbag 44 is finished. The airbag 44 may have, for example, a size and a shape which cover a region from the lumbar region Pp of the passenger P to a shoulder part. A pair of overlapping portions 44A and 44B may be formed by overlapping two base fabric sheets. In this case, each of the base fabric sheets constructs each of the overlapping portions 44A and 44B.

The overlapping portions 44A and 44B are coupled to each other in peripheral edge portions (an outer coupling portion 46) thereof. The outer coupling portion 46 is a portion obtained by seaming the peripheral edge portions of both overlapping portions 44A and 44B by sewing threads. The outer coupling portion 46 may be constituted, for example, by a portion adhered by an adhesive agent.

<Inflator Assembly 47>

The inflator assembly 47 is provided with an inflator 48 serving as a gas generation source, and a retainer 49 installed to the inflator 48. The inflator 48 and the retainer 49 are arranged in a center of a rear portion of the airbag 44 in an inner space of the airbag 44.

The inflator 48 is formed as a substantially elongated columnar shape extending vertically. A gas generating agent (not shown) is accommodated in the inflator 48. This type of inflator 48 generates gas on the basis of a combustion reaction of the gas generating agent. A plurality of gas outlets 51 blowing out the gas are provided in a lower end portion of the inflator 48. As the inflator 48, it is possible to employ an inflator of a type breaking a partition wall of a high-pressure gas cylinder by an explosive or the like so as to blow out the gas.

Figure 4:
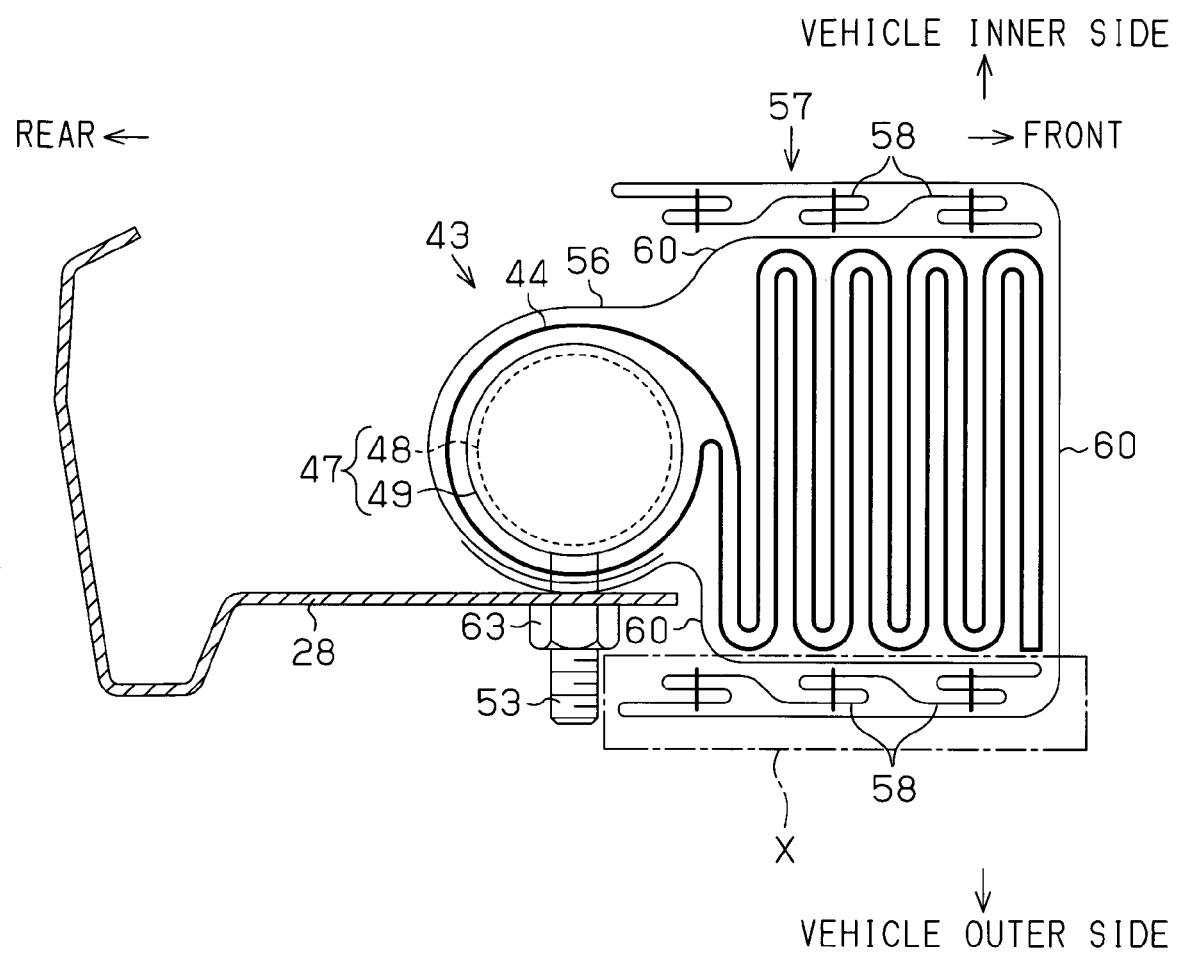
FIG. 4 is a partial cross-sectional plan view showing a side frame portion and an airbag module.

The retainer 49 fixes the inflator 48 to the side frame portion 28 together with the airbag 44 as well as serving as a diffuser. The retainer 49 is formed substantially as an elongated tubular shape by bending a metal plate. A window portion 52 is provided in a front side of a lower end portion of the retainer 49. The partial gas outlets 51 are exposed from an inner side of the retainer 49 through the window portion 52. The gas from the gas outlets 51 is blown out substantially to a front side of the vehicle through the window portion 52. As shown in FIG. 4, a bolt 53 is provided at a different position from the window portion 52 in the retainer 49. The bolt 53 is inserted to the airbag 44, and is exposed to the outside of the airbag 44.

In the side airbag apparatus, the airbag 44 is made compact in a mode (hereinafter, refer to as a storing mode) suitable for being installed in the storage space 41. First, as shown in FIG. 6, the airbag 44 is accordion folded in a state of being deployed without being filled with the gas. The accordion fold is a method of folding the airbag 44 from a front side to a rear side along fold lines 54 at a fixed width while alternately changing folding directions. In accordance with this accordion fold, the airbag 44 is folded in a vertically elongated shape as shown in FIG. 7(A).

Next, as shown in FIG. 7(A), an upper portion of the airbag 44 is folded back in a clockwise direction, and a lower portion of the airbag 44 is folded back in a counterclockwise direction, respectively. The number of times of the fold of the airbag 44 may be changed. On the basis of the fold, the length of the airbag 44 becomes short as shown in FIG. 7(B). The airbag 44 folded as mentioned above is bundled by a binding tape 55 at two positions, and is retained in the folded state.

As shown in FIG. 3, the airbag module 43 is accommodated in the storage space 41 of the seat back 24 in a state of positioning the inflator assembly 47 to a rear side and positioning the airbag 44 in a front side. Further, the bolt 53 inserted to the airbag 44 is fastened to the side frame portion 28 by a nut 63. On the basis of this fastening, the inflator assembly 47 is fixed to the side frame portion 28 together with the airbag 44.

In the airbag module 43, the airbag 44 is inflated as follows by the gas from the inflator 48. Immediately after starting the gas feed, the airbag 44 is first inflated and deployed in the storage space 41. In accordance with a progress of the inflation and deployment, the front portion of the side support portion 25 is inflated by the airbag 44. In accordance with the inflation of the front portion of the side support portion 25, the back of the passenger P seated on the vehicle seat 22 is pressed to the front side. In other words, the airbag 44 indirectly pushes the passenger P with the side support portion 25. If the inflation and deployment makes progress further, the side support portion 25 is broken, and the airbag 44 jumps out of the vehicle seat 22 while leaving a part thereof in the storage space 41. The airbag 44 is inflated and deployed in a passenger restraint region Z1 (refer to FIG. 2) between the body side portion 21 and the vehicle seat 22. The airbag 44 after inflating and deploying directly presses and restrains the passenger P.

A period from the start of the inflation and deployment of the airbag 44 to the end thereof is referred to as "inflation and deployment period". The inflation and deployment period is divided into a period at which the airbag 44 directly or indirectly presses the passenger P so as to restrain, and a period at which the airbag 44 does not restrain. As mentioned above, the airbag 44 indirectly or directly presses the passenger P so as to restrain after pressing the seat pad 27 forward so as to start inflating. Since a timing at which the seat pad 27 starts inflating exists in a medium term of the inflation and deployment period as mentioned above, a period before a timing at which the seat pad 27 starts inflating is referred to as "preceding term of the inflation and deployment period", and a period after the timing is referred to as "latter term of the inflation and deployment period". On the basis of this definition, "preceding term of the inflation and deployment period" corresponds to the period in which the passenger P is not restrained, and "latter term of the inflation and deployment period" corresponds to the period in which the passenger P is directly or indirectly restrained.

In the preceding term of the inflation and deployment period, the airbag 44 is inflated and deployed at the same level of deploying speed V2 as the conventional side airbag apparatus. In contrast, in the latter term of the inflation and deployment period, the airbag 44 is inflated and deployed at a slower deploying speed V1 than the conventional one. Accordingly, the following structure is newly employed in the side airbag apparatus.

As shown in FIG. 4, the airbag module 43 is provided with a belt 56 formed by a cloth, a tape or the like as an elongated member, in addition to the base structure mentioned above. The belt 56 has a length which can surround the inflated and deployed airbag 44. In detail, a length of the belt 56 is a little shorter than an entire length of an outer periphery of the inflated and deployed airbag 44 and longer than a necessary length for surrounding the airbag 44 in the storage mode, in a state in which a redundant portion 57 is elongated. The belt 56 is arranged in such a manner as to surround the outer periphery of the airbag 44 in the storage mode. The length of the belt 56 may be identical to the length of the outer periphery of the inflated and deployed airbag 44, or may be longer than the length.

The bolt 53 of the retainer 49 is inserted to both end portions of the belt 56. Both end portions of the belt 56 are fixed to the side frame portion 28 by the bolt 53 and the nut 63. In the belt 56, the portion (hereinafter, refer to as the redundant portion 57) which does not surround the airbag 44 in the storage mode is slackened. The redundant portion 57 is constituted by a plurality of first redundant portions (first portions) 58 and a plurality of second redundant portions (second portions) 60.

Figure 9:
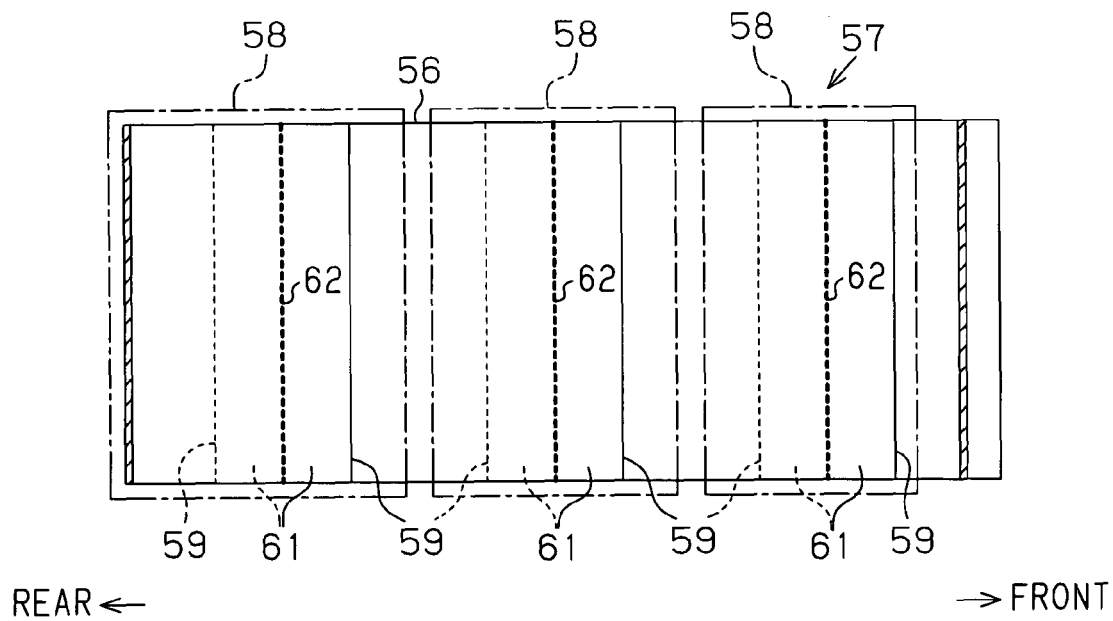
FIG. 9 is a cross-sectional view taken along line 9-9 in FIG. 8(A)

As shown in FIGS. 4 and 8(A), each of the first redundant portions 58 is provided for lowering a deploying speed of the airbag 44 in the latter term of the inflation and deployment period, and has the same structure with each other. As shown in FIGS. 8(B) and 9, each of the first redundant portions 58 is formed by folding the belt 56 over along two fold lines 59 substantially orthogonal to a longitudinal direction of the belt 56 while alternately changing a folding direction. In this case, since two fold lines 59 are provided, three fold pieces 61 folded along the fold lines 59 are overlapped with each other in each of the first redundant portions 58.

Each of the first redundant portions 58 is provided with a retention portion 62 retaining the belt 56 in a slackened state, and canceling the retention in accordance with the inflation of the airbag 44. In the present embodiment, in each of the first redundant portions 58, the retention portion 62 retains three fold pieces 61 in an overlapped state. Each of the retention portions 62 is formed by seaming three fold pieces 61 by sewing threads in a direction orthogonal to a longitudinal direction of the belt 56. In this case, the seamed portion by the sewing threads is broken in accordance with the inflation and deployment of the airbag 44, and the retention by the retention portion 62 is canceled. In this case, a strength at which the retention portion 62 overlaps and retains three fold pieces 61 is defined as retention strength. In each of the retention portions 62, three fold pieces 61 are seamed at different retention strength from the other first redundant portions 58. In accordance with the seam mentioned above, the retention strength is different for each first redundant portion 58.

(i) The fold pieces 61 are seamed by using the sewing threads having a different strength for each first redundant portion 58.

(ii) The fold pieces 61 are seamed by using the sewing threads having a different thickness for each first redundant portions 58. In this case, the retention strength is higher in a thread of a larger size.

(iii) The length of the seam is different for each first redundant portion 58. In this case, the retention strength is higher as the length of the seam becomes longer.

(iv) Sewing interval of the seam is different for each first redundant portion 58. In general, the retention strength becomes higher as the sewing interval becomes narrower.

(v) The number of the retention portion 62 is different for each first redundant portion 58. In this case, the retention strength of the first redundant portion 58 becomes higher as the number of the retention portions 62 is increased.

The second redundant portions 60 are provided for allowing an inflation and deployment of the airbag 44 at a high deploying speed, in the preceding term of the inflation and deployment period. Each second redundant portion 60 is a portion which is elongated in accordance with the inflation and deployment of the airbag 44 before the retention by the retention portion 62 is canceled.

A deployment control assembly is constructed by the first redundant portions 58, the retention portion 62, and the second redundant portions 60. In the deployment control assembly, the raw material, the length and the width of the belt 56, the number and the retention strength of the first redundant portions 58, and the number of the second redundant portions 60 are set so as to satisfy the following conditions.

Condition 1: the retention portion 62 does not prevent the inflation and deployment of the airbag 44 in the preceding term of the inflation and deployment period of the airbag 44.

Condition 2: the retention portion 62 prevents the inflation and deployment of the airbag 44 so as to lower the deploying speed in the latter term of the inflation and deployment period of the airbag 44, and the inflation and deployment of the airbag is finished approximately at the same time as the conventional side airbag. Approximately same time refers to a time (refer to a time t6 in FIG. 13) at which a predetermined period has passed from the generation of the side collision.

As shown in FIG. 3, the side airbag apparatus is provided with a controller 67 as inflator control means, as well as being provided with a side collision predicting sensor 66 constituted by a millimeter wave radar or the like, in addition to the airbag module 43 mentioned above. The millimeter wave radar emits a radio wave (a millimeter wave) having a wavelength of a few millimeters to a side portion of the vehicle, and receives a radio wave reflected from another vehicle positioned in the emitting direction. The millimeter wave radar measures the position of a side collision subject and a relative speed with respect to the vehicle on the basis of a frequency difference generated by a propagation time of the radio wave and a Doppler effect.

The controller 67 is structured mainly by a microcomputer. A central processing unit (CPU) carries out a computing process in accordance with a control program, an initial data, a control map and the like stored in a read only memory (ROM), and controls the actuation of the inflator 48 on the basis of a result of computation.

Next, a description will be given of an operation of the side airbag apparatus with reference to FIG. 13.

Figure 13:
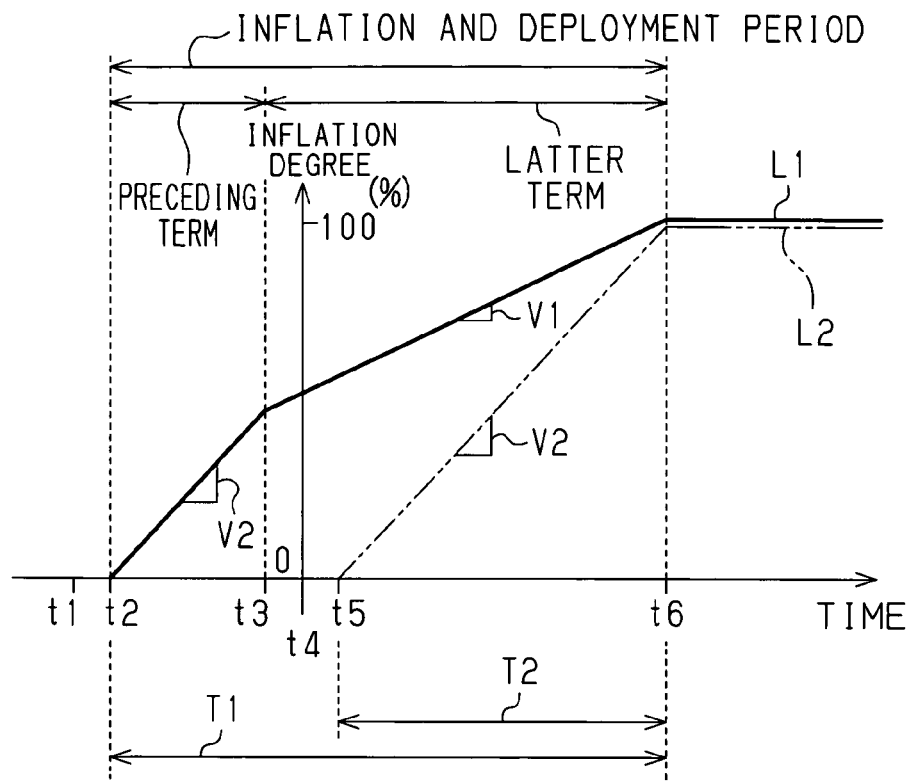
FIG. 13 is a graph showing changes over time of an inflation degree of the airbag.

FIG. 13 schematically shows changes over time of an inflation degree in an early stage of the inflation of the airbag 44. The inflation degree is an index indicating a progress degree of the inflation of the airbag 44. When the airbag 44 is not inflated, that is, is in the storage mode, the inflation degree of the airbag 44 is "0%". Further, when the airbag 44 is inflated to the maximum limit, that is, when the inflation is finished so as to restrain the passenger P, the inflation degree of the airbag 44 is "100%". A change amount of the inflation degree per unit time corresponds to a deploying speed.

In a conventional side airbag apparatus in which the generation of a side collision is detected by a impact sensor, and an ignition command signal is output to an inflator in correspondence to the detection, changes over time of the inflation degree of the airbag is shown by a characteristic line L2 (a two-dot chain line) in FIG. 13.

For example, if a side collision is generated at time t4 in FIG. 13, the side collision is detected by the impact sensor. An ignition command signal is output at time t5 which is slightly delayed from time t4 at which the side collision is generated, and the inflator starts its actuation in correspondence to the signal. The inflation of the airbag is started by the gas from the inflator, the inflation and deployment makes progress at a fixed deploying speed V2, and the inflation is finished at time t6. The deploying speed V2 averagely expresses the deploying speed between predetermined timings.

In contrast, the controller 67 monitors a possibility of a side collision on the basis of the positions of the vehicle and the subject and the relative speed detected by the side collision predicting sensor 66. Further, if the controller 67 predicts a side collision at time t1 in FIG. 13, it outputs the ignition command signal to the inflator 48 at time t2 before the generation of the actual side collision (time t4). The inflator 48 is ignited by the ignition command signal, and the gas generating agent executes the combustion reaction so as to generate the gas having a high temperature and a high pressure. This gas is blown out to the airbag 44 from the gas outlets 51 through the window portion 52 of the retainer 49 (refer to FIG. 5).

Next, a description will be given of a mode of the inflation and deployment of the airbag 44 inflated and deployed by gas, while dividing the inflation and deployment period into the preceding term and the latter term.

<Preceding Term of Inflation and Deployment Period>

Figure 10:
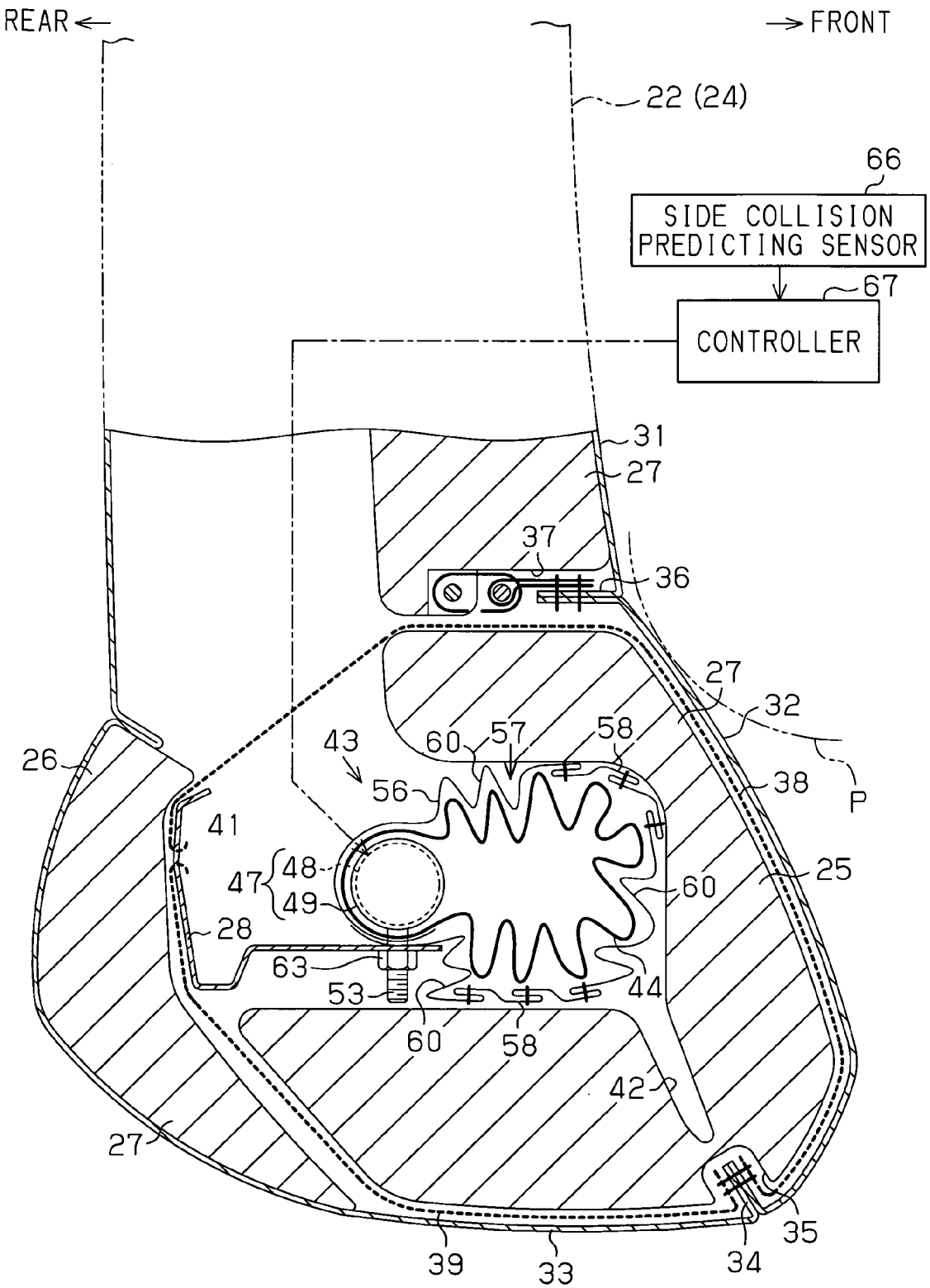
FIG. 10 is a partial cross-sectional plan view showing an initial state when the airbag is inflated.
Figure 11:
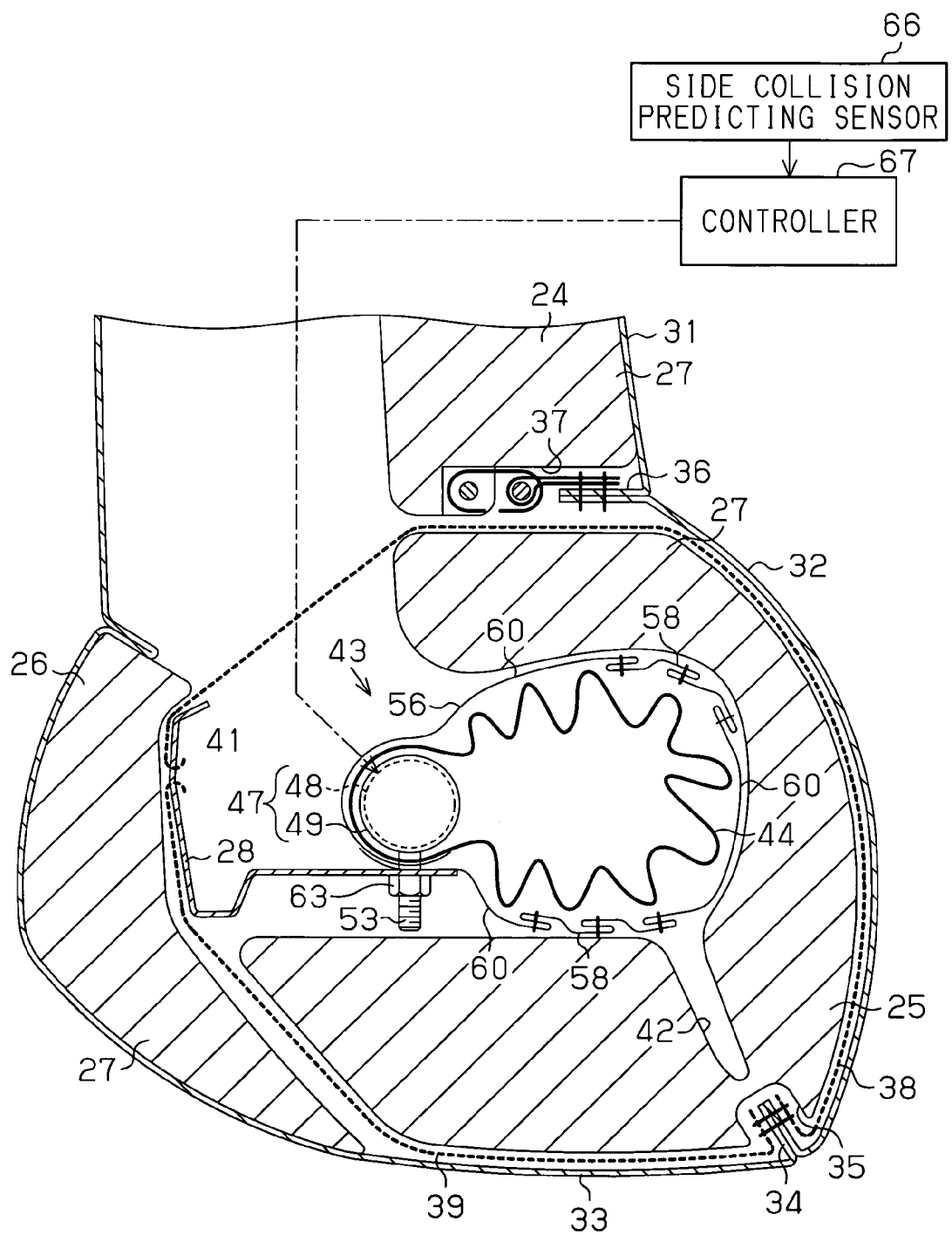
FIG. 11 is a partial cross-sectional plan view showing a state in which a side support portion starts inflating.

As shown in FIG. 10, in the preceding term of the inflation and deployment period, the inflation of the airbag 44 is started by gas, and the binding tape 55 (refer to FIG. 7(B)) binding the airbag 44 is broken. Further, the folded airbag 44 is inflated and deployed within the storage space 41.

The belt 56 arranged on the outside of the airbag 44 is pulled forward by the airbag 44 being inflated and deployed. Accordingly, three fold pieces 61 of each of the first redundant portions 58 are pulled forward on the basis of the inflation and deployment of the airbag 44 while being retained by the retention portion 62. In this stage, each of the second redundant portions 60 is elongated, however, is yet in the slackened state. Therefore, the belt 56 does not prevent the inflation and deployment of the airbag 44. As a result, the airbag 44 is inflated and deployed at the same level of deploying speed V2 as the conventional side airbag apparatus after time t2.

<Latter Term of Inflation and Deployment Period>

In the process that the airbag 44 is inflated and deployed in the storage space 41, the airbag 44 presses the side support portion 25 forward. At time t3 when the inflation and deployment of the airbag 44 further makes progress, the side support portion 25 starts inflating forward on the basis of the pressing operation by the airbag 44 (refer to FIG. 11).

At time t3, the belt 56 is pulled by the airbag 44 being inflated and deployed, and all the second redundant portions 60 are tensioned (come to a state having no slack). In contrast, each of the first redundant portions 58 is retained in a state in which each of the fold pieces 61 is folded back by the retention portion 62. Accordingly, the belt 56 comes to a tension state as a whole. Further, a retention force by the retention portion 62 forms a resistance against the inflation and deployment of the airbag 44. Therefore, since a part of the energy of the inflation and deployment of the airbag 44 is consumed, the deploying speed of the airbag 44 is lowered after time t3.

Figure 12:
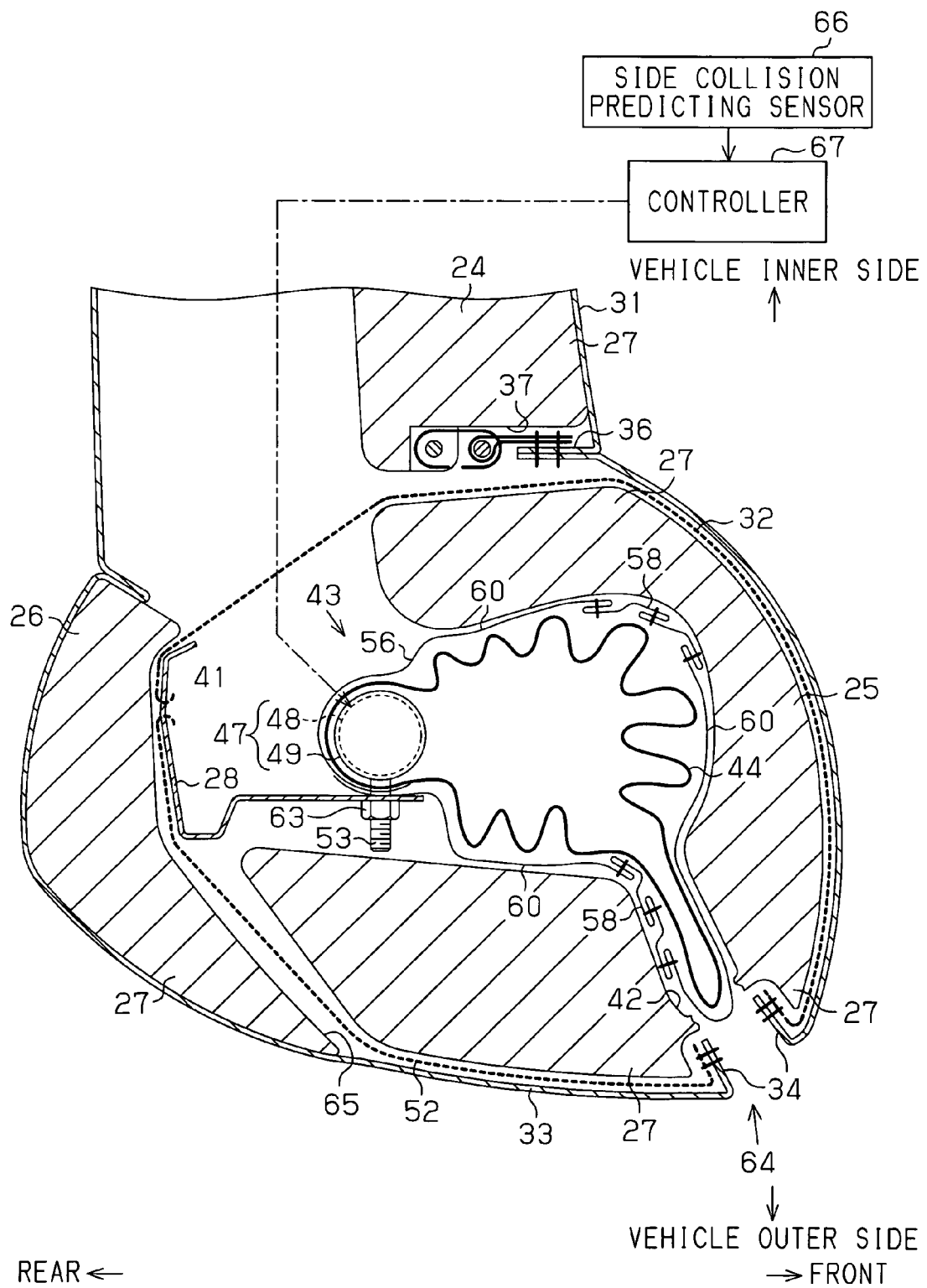
FIG. 12 is a partial cross-sectional plan view showing a state in which a breakable portion is broken.
Figure 14:
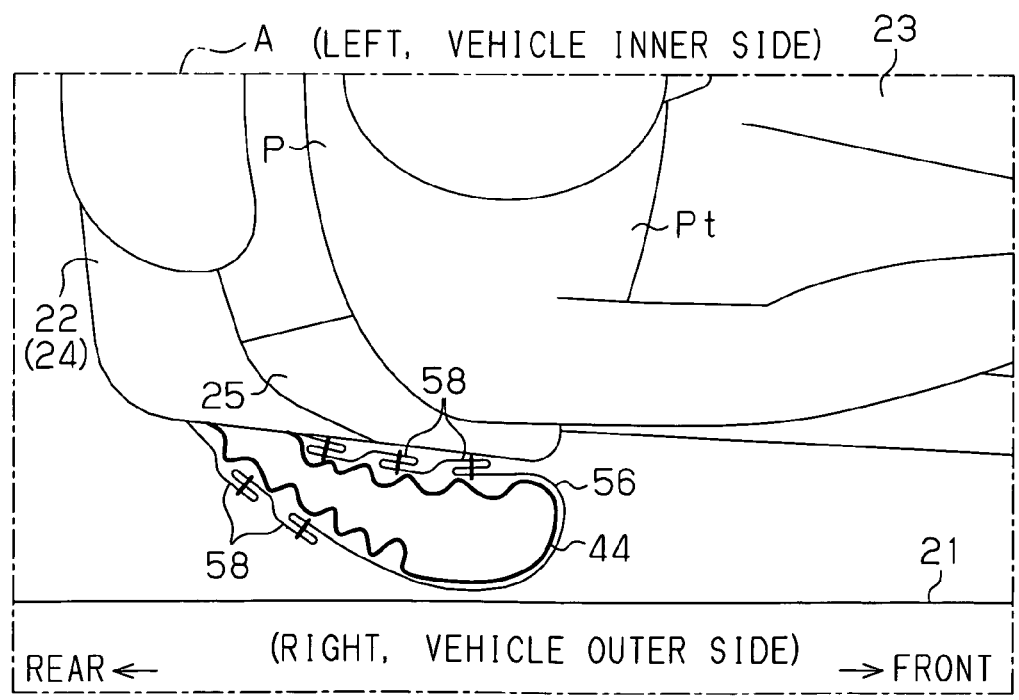
FIG. 14 is a partial plan view showing a state in which the airbag is in process of inflating and deploying.

On the other hand, a part of the airbag 44 enters the slit 42 as the inflation of the airbag 44 makes progress. The airbag 44 continues inflating and deploying after entering the slit 42. Accordingly, as shown in FIG. 12, the breakable portion of the side support portion 25 is broken in accordance with the progress of the inflation of the airbag 44. In other words, a thin portion of the seat pad 27 is broken, and the seamed of the seamed portion 34 is dissembled, whereby the opening 64 is formed. The airbag 44 jumps out from the seat back 24 while expanding the opening 64. At this time, the side support portion 25 is opened forward around the seamed portion 36, and is also opened rearward around a notch 65 provided in a side portion of the seat pad 27. The airbag 44 jumping out from the opening 64 is inflated and deployed forward from the seat back 24 as shown in FIG. 14.

The belt 56 is provided with plural sets of first redundant portions 58 and retention portions 62, and the retention strength of the retention portion 62 is different for each first redundant portion 58. Accordingly, in the period between time t3 and time t6, the retention portion 62 having the lowest retention strength is first broken. Since the energy of the inflation and deployment of the airbag 44 is consumed for breaking the retention portion 62, the deploying speed of the airbag 44 is lowered.

In the first redundant portion 58 in which the retention portion 62 is broken, the structure retaining the three fold pieces 61 in the folded state does not exist, so that a new slack is generated. However, since the airbag 44 is continuously inflated and deployed, the first redundant portion 58 is elongated, and the belt 56 is again tensioned. In the belt 56, the remaining retention portion 62 retains each of the first redundant portions 58 in the folded state. Next, since the energy of the inflation and deployment of the airbag 44 is consumed for breaking the retention portion 62 having the low retention strength, the deploying speed of the airbag 44 is lowered.

Thereafter, since the retention portion 62 is broken in ascending order of the retention strength, and the energy of the inflation and deployment of the airbag 44 is consumed in every breakage, the deploying speed of the airbag 44 is lowered. As a result, in the period between time t3 and time t6, the airbag 44 is inflated and deployed at the slower deploying speed V1 than the conventional side airbag apparatus. The deploying speed V1 averagely expresses the deploying speed between the predetermined timings.

Figure 15:
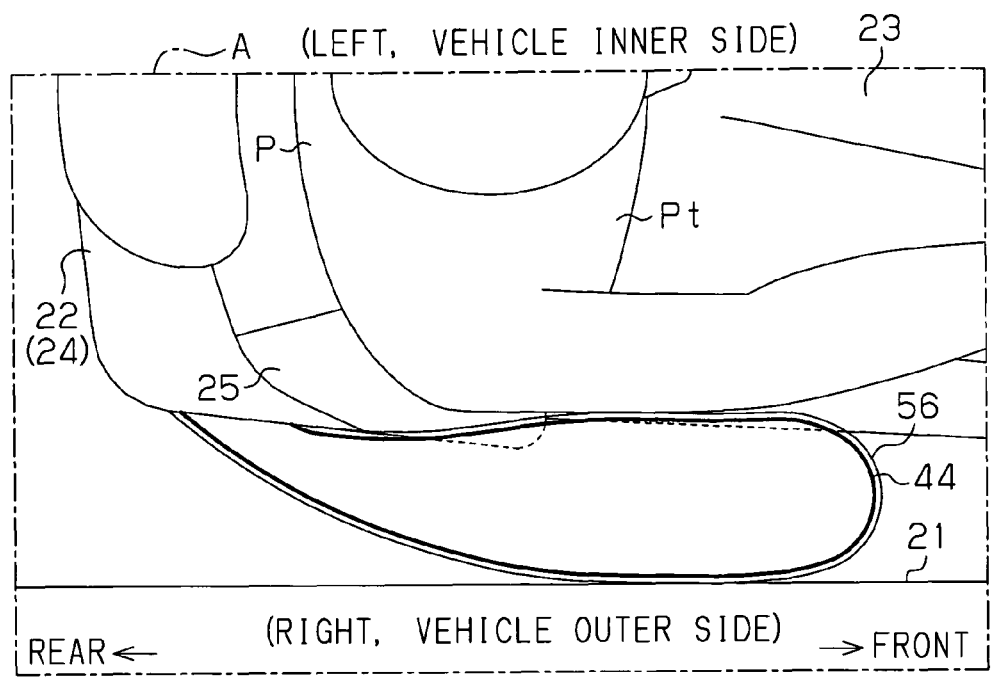
FIG. 15 is a partial plan view showing a state in which the inflation and deployment of the airbag is finished.

The inflation of the airbag 44 is finished in a state shown in FIG. 15 at time t6. The inflated and deployed airbag 44 is interposed between the passenger P, particularly a wide position from the lumbar region Pp and the thorax Pt, and the body side portion 21 bulging into the passenger compartment so as to absorb the shock applied to the passenger P from the side portion. At this time, the retention portions 62 in all the first redundant portions 58 are broken, and the belt 56 comes to the tension state by the airbag 44.

As mentioned above, in spite that the deploying speed is lowered after time t3, the inflation of the airbag 44 is finished at the same time t6 as the conventional side airbag apparatus. This is caused by advancing the starting time of the inflation of the airbag 44 than the case of the conventional side airbag apparatus.

In other words, the time period (the deploying time period) relating to the inflation and deployment of the airbag 44 is different in correspondence to the starting time of the inflation and deployment, under a condition that the inflation and deployment of the airbag 44 is finished at the specific time t6. If the starting time is advanced, the inflating and deploying time period becomes longer in accordance therewith. As shown in FIG. 13, if time t5 immediately after the actual side collision is generated is set to the starting time of the inflation and deployment, the period between time t5 and t6 is a deploying time period T2. In contrast, if the side collision is predicted, and time t2 before the actual side collision is set to the starting time of the inflation and deployment, the period between time t2 and time t6 is a deploying time period T1. A margin is created in the time necessary for the inflation and deployment in correspondence with a difference (=T1−T2) between both deploying time periods T1 and T2, and it is possible to lower the deploying speed by that degree.

Taking this point into consideration, in the present embodiment, the deploying speed of the airbag 44 is made lower than the deploying speed V2 at a time of starting the actuation of the inflator 48 after the side collision in the period (time t3 to time t6) at which the inflation of the airbag 44 is finished outside the vehicle seat 22 after the side support portion 25 starts inflating forward by the airbag 44. Accordingly, the energy applied to the passenger P as a reaction force of the airbag 44 being inflated and deployed is lowered.

When the airbag 44 is inflated and deployed within the vehicle seat 22, that is, until the side support portion 25 starts inflating forward (time t2 and time t3), the lowering of the deploying speed of the airbag 44 as mentioned above is not carried out. In this period, the airbag 44 is deployed and inflated at the same deploying speed V2 as the time when the actuation of the inflator 48 is started after the side collision. Since the side support portion 25 is not inflated during this period (time t2 and time t3), the passenger P is not pushed by the side support portion 25 even if the airbag 44 is quickly inflated and deployed.

Further, in FIG. 13, the description is given of the case where the deploying speed of the airbag 44 is switched from V2 to V1 at time t3 before the actual side collision is generated (time t4), however, the deploying speed of the airbag 44 may be switched after time t4. In the case where a part of the body of the passenger P is positioned in the region in which the airbag 44 is inflated and deployed, it is preferable that this switching timing is set to a timing as early as possible before time t6, in order to make the energy applied to the passenger P by the airbag 44 being inflated and deployed small. Specifically, the switching timing is preferably before time t5, and is more preferably before time t4. It is most preferable that the inflation and deployment of the airbag 44 is started at the slow deploying speed V1 from time t3 before the side collision is generated, such as the present embodiment. It is possible to securely make the deploying speed of the airbag 44 low before the airbag 44 restrains the passenger P.

In accordance with the first embodiment in detail mentioned above, the following advantages are obtained.

(1) If a side collision of the vehicle is predicted by monitoring the condition at a side of the vehicle, the actuation of the inflator 48 is started in advance of the actual side collision. Further, the airbag 44 is inflated and deployed at the lower deploying speed V1 than the deploying speed V2 at a time of starting the actuation of the inflator 48 after the side collision in the latter term of the inflation and deployment period. Accordingly, the energy which the airbag 44 being inflated and deployed applies as the reaction force to the passenger P is lowered, and the passenger P is reliably restrained, the passenger protecting performance is improved.

(2) The advantage (1) mentioned above is sufficiently obtained even in the case where the period after the airbag 44 jumps out from the vehicle seat 22 is set to the latter term of the inflation and deployment period. In the present embodiment, the latter term of the inflation and deployment period includes the period in which the airbag 44 is inflated in the storage space 41, and gets out to the outside of the vehicle seat 22 after the side support portion 25 starts inflating forward. Accordingly, even when the airbag 44 indirectly presses the passenger P with the side support portion 25, the energy applied to the passenger P with the side support portion 25 is lowered. Accordingly, the restraint of the passenger P becomes further easy, and the passenger protection performance is further improved.

(3) In the preceding term of the inflation and deployment period, the airbag 44 is deployed and inflated at the same deploying speed V2 at the time of starting the actuation of the inflator 48 after the side collision. Accordingly, the airbag 44 is quickly inflated and deployed in the vehicle seat 22, and it is possible to get ready for the inflation and deployment of the airbag 44 outside the vehicle seat 22. In the preceding term of the inflation and deployment period, the side support portion 25 is not inflated forward by the airbag 44. Accordingly, the airbag 44 does not indirectly push the passenger P through the side support portion 25. Therefore, even if the airbag 44 is quickly inflated and deployed as mentioned above, the passenger protection performance is not lowered.

(4) The belt 56 is used as the elongated member, and both end portions of the belt 56 are fixed to the vehicle seat 22. Further, since the redundant portion 57 is provided in the belt 56, and the first redundant portion 58 of the redundant portion 57 is folded and retained by the retention portion 62, the redundant portion 57 is retained in the slackened state. Accordingly, since a part of the energy of the inflation and deployment of the airbag 44 is consumed for canceling (breaking) the retention portion 62, the deploying speed of the airbag 44 is securely lowered.

(5) The belt 56 is arranged outside the airbag 44. Accordingly, the inflation in the vehicle width direction of the airbag 44 is regulated by the belt 56, and an excessive inflation in the vehicle width direction is restricted.

The first embodiment may be modified as follows.

(a) The deploying speed of the airbag 44 may be lowered only in the period in which the airbag 44 is inflated and deployed outside the vehicle seat 22. In this case, the second redundant portion 60 may be slackened immediately before the airbag 44 gets out of the vehicle seat 22 from the storage space 41.

Further, the deploying speed of the airbag 44 may be lowered in the period in which the airbag 44 is inflated and deployed in the vehicle seat 22, that is, in the storage space 41. In this case, the second redundant portion 60 may be omitted for achieving the inflation and deployment of the airbag 44 at the high deploying speed V2 in the vehicle seat 22.

(b) The retention portion in each of the first redundant portions 58 may be formed by different means from the sewing threads. For example, the adjacent fold pieces 61 in each of the first redundant portions 58 may be adhered to each other by an adhesive agent.

(c) The retention portion 62 may be constituted by a pair of snap-fit type fastening parts such a snap button and a snap hook. In this case, a pair of fastening parts may be respectively provided in the opposing fold pieces 61 of the first redundant portion 58. In this case, the first redundant portion 58 can be retained in the folded state by coupling both fastening parts. Further, both fastening parts are separated in accordance with the inflation and deployment of the airbag 44, and the retention of the first redundant portion 58 is canceled.

(d) It is possible to change the number of the redundant portions 57 in the belt 56, and the number of the first redundant portions 58 in each of the redundant portions 57.

(e) In all the first redundant portions 58, the retention strength of the retention portion 62 does not need to be different. A plurality of first redundant portions 58 may be divided into a plurality of groups, and the retention strength of the retention portion 62 may be different for each group. Further, the retention strength of the retention portion 62 may be identical in all the first redundant portions 58.

(f) In the case where the retention strength of the retention portion 62 is differentiated between the first redundant portions 58, no demanded relation exists between the magnitude of the retention strength and the position of the first redundant portion 58. Accordingly, it is optional to make the retention strength higher in which of the retention portions 62 in the first redundant portion 58, and make the retention strength lower in which of the retention portions 62 in the first redundant portion 58.

Figure 16:
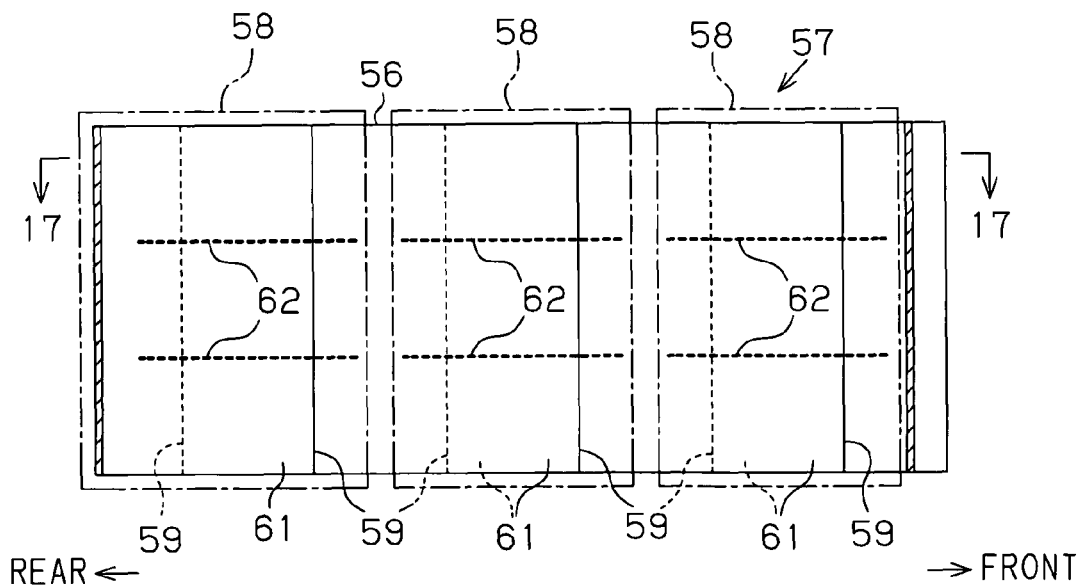
FIG. 16 is a side cross-sectional view of a belt showing a modification of the first embodiment.
Figure 17:
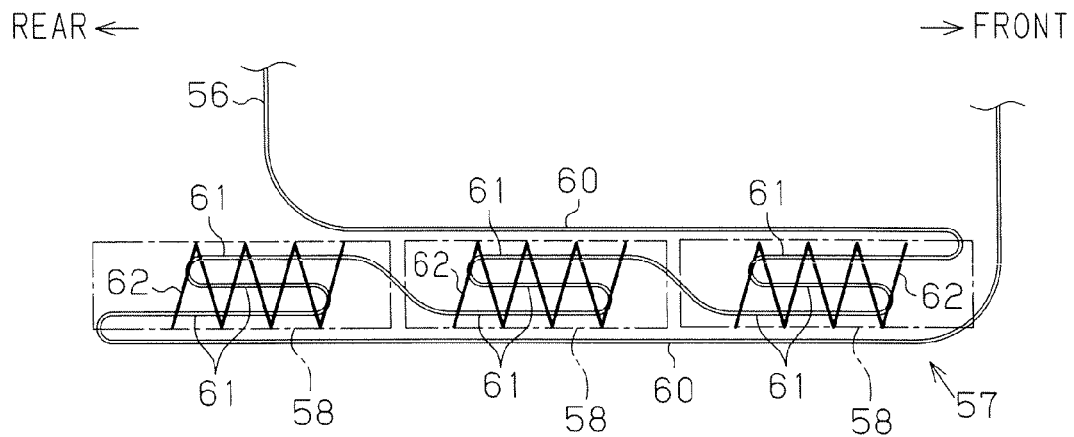
FIG. 17 is a cross-sectional view taken along line 17-17 in FIG. 16.

(g) It is possible to change the extending direction of the retention portion 62 in each of the first redundant portions 58. FIGS. 16 and 17 show one example thereof. In this modification, three fold pieces 61 of each of the first redundant portions 58 are seamed along the longitudinal direction of the belt 56, whereby the retention portion 62 is formed. In the latter term of the inflation and deployment period of the airbag 44, the of the retention portions 62 are broken in the order of the rear side to the front side, in accordance with the progress of the inflation and deployment of the airbag 44. Since the energy of the inflation and deployment of the airbag 44 is consumed for breaking the retention portion 62, the deploying speed of the airbag 44 is lowered.

Although not illustrated, the extending direction of the retention portion 62 may be changed to a direction which diagonally intersects the longitudinal direction of the belt 56. In this case, the same advantages as the first embodiment can be expected.

In FIGS. 16 and 17, the adjacent retention portions 62 in the longitudinal direction of the belt 56 may be connected to each other.

(h) Both end portions of the belt 56 may be fixed to the rear portion of the airbag 44 in place of the side frame portion 28. Further, one end portion of the belt 56 may be fixed to the rear portion of the airbag 44 in place of the side frame portion 28.

(i) It is possible to employ the belt 56 having a length which is slightly shorter than the entire length of an outer periphery of the inflated and deployed airbag 44. In this case, the belt 56 may be separated when the inflation and deployment of the airbag 44 is finished.

A perforated line may be formed along the width direction of the belt 56 such that when the inflation and deployment of the airbag 44 is finished and the belt 56 comes to the tension state, and the belt 56 is cut in the perforated line.

Second Embodiment

Figure 18:
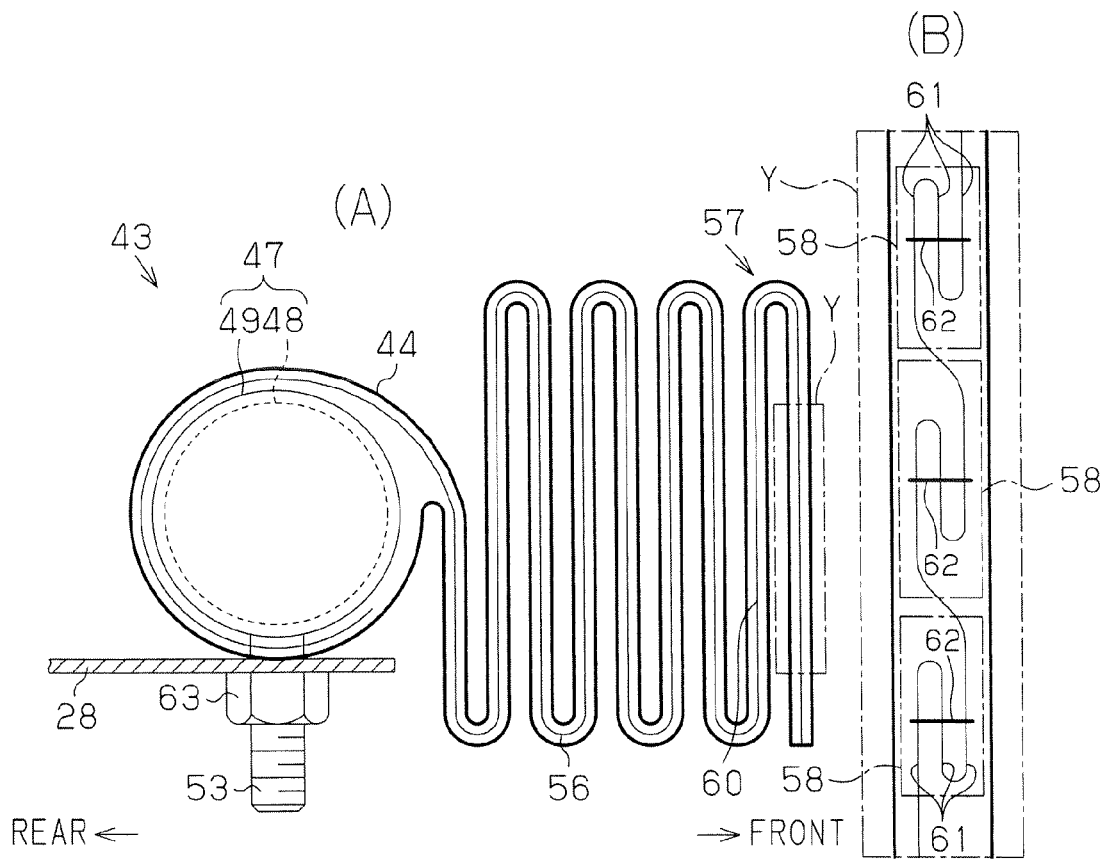
FIG. 18(A) is a cross-sectional plan view showing an airbag module in accordance with a second embodiment.
FIG. 18(B) is a cross-sectional plan view showing a portion Y in FIG. 18(A) in an enlarged manner.

Next, a description will be given of a second embodiment in accordance with the present invention with reference to FIGS. 18(A) and 18(B). The second embodiment is different from the first embodiment in which the belt 56 is arranged outside the airbag 44, in a point that the belt 56 is arranged in the airbag 44.

The belt 56 has the same length as the distance between the rear end and the front end of the inflated and deployed airbag 44. The rear portion of the belt 56 is wound around the inflator assembly 47 within the airbag 44. The bolt 53 of the retainer 49 is inserted to the rear end portion of the belt 56. The rear end portion of the belt 56 is fixed to the side frame portion 28 by the bolt 53 and the nut 63. The front end portion of the belt 56 is coupled to the front end portion within the airbag 44 by means of the seam, the adhesion or the like.

The redundant portion 57 is formed in an intermediate portion in the longitudinal direction of the belt 56. The redundant portion 57 comes to a slackened state when the airbag 44 is in the storage mode. The redundant portion 57 has three first redundant portions 58 and a second redundant portion 60 adjacent the first redundant portions 58. Each of the first redundant portions 58 is formed by folding the belt 56 along the fold line which is substantially orthogonal to the longitudinal direction of the belt 56. Each of the first redundant portions 58 is folded and retained by the retention portion 62. Each of the retention portions 62 is formed by seaming three fold pieces 61 in the direction which is substantially orthogonal to the longitudinal direction of the belt 56 by the sewing threads. In each of the first redundant portions 58, three fold pieces 61 are seamed at a different retention strength from the other first redundant portions 58. On the basis of the seam mentioned above, the retention strength is different for each first redundant portion 58.

A deployment control assembly is constructed by a plurality of first redundant portions 58 and the retention portions 62 provided for each first redundant portion 58. In the deployment control assembly, the raw material, the length and the width of the belt 56, and the number, the retention strength and the like of the first redundant portion 58 are set in such a manner as to satisfy the conditions (i) and (ii) mentioned above. The other structures (including the coupling means) than the above are the same as the first embodiment. Accordingly, the same reference numerals are attached to the same members, portions and the like as the first embodiment, and a description thereof will be omitted.

In the second embodiment, the arranged position of the belt 56 is different from the first embodiment, however, since the energy of the inflation and deployment of the airbag 44 is consumed by the breakage of the retention portion 62 in the latter term of the inflation and deployment period, the deployment speed of the airbag 44 is lowered than the deployment speed V2. Accordingly, the same advantages as the above (1) to (4) in the first embodiment are obtained by the second embodiment. The second embodiment may be modified in the same manner as the items (a) to (i) mentioned above.

Third Embodiment

Figure 19:
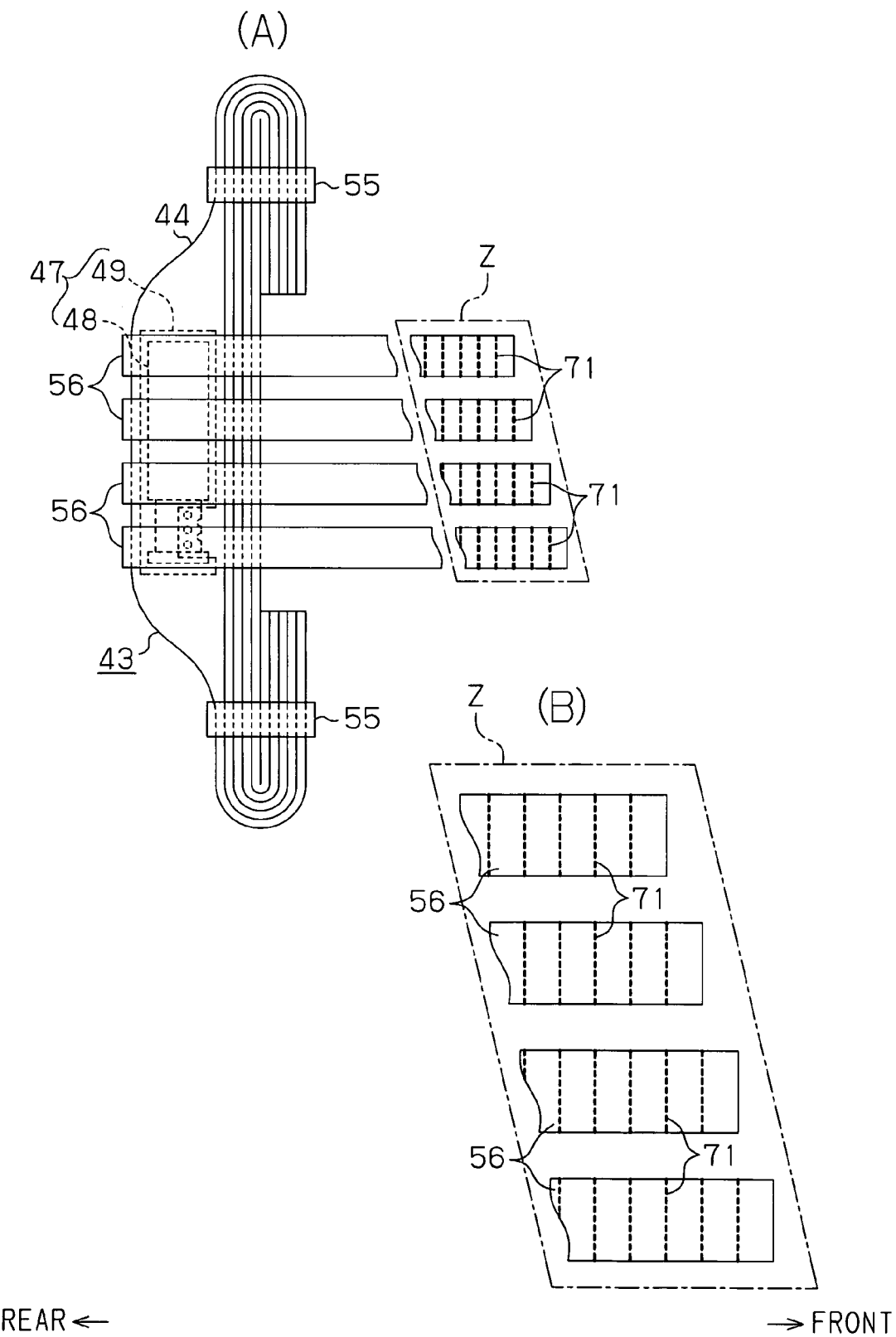
FIG. 19(A) is a side elevational view showing an airbag module in accordance with a third embodiment.
FIG. 19(B) is a partial side elevational view showing a modification of a portion Z in FIG. 19(A) in an enlarged manner.

Next, a description will be given of a third embodiment in accordance with the present invention with reference to FIG. 19(A). In the third embodiment, the deployment control assembly is different from the first embodiment.

The deployment control assembly is provided with a plurality of belts 56 made of the cloth, the tape or the like as the elongated member. The length of each of the belts 56 is shorter than the length which can surround the inflated and deployed airbag 44, and is longer than the length which is necessary for surrounding the airbag 44 in the storage mode. The belts 56 respectively have different lengths. Each of the belts 56 is arranged in such a manner as to surround the airbag 44 substantially in a horizontal direction, outside the airbag 44 in the storage mode. Both end portions of each of the belts 56 are fixed to the side frame portion 28.

In each of the belts 56, the portion which does not surround the airbag 44 in the storage mode is slackened. The length of this portion is different for each belt 56. FIG. 19(A) is illustrated in a state in which a surplus portion is extended, for convenience of explanation.

Each of the belts 56 is provided with a separable portion 71 which has a lower strength than the other portions and tends to be broken. The separable portion 71 is constituted by a perforated line formed along a direction which is substantially orthogonal to the longitudinal direction of the belt 56. In other words, the separable portion 71 is formed by applying a plurality of cuts having a predetermined length to the belt 56 at a predetermined interval. In the separable portion, the cuts and the position having no cut are formed repeatedly. The strength of the separable portion 71 of each of the belts 56 is identical between the belts 56.

In the deployment control assembly, the length of each of the belts 56, and the number, the strength and the like of the separable portions 71 are set in such a manner as to satisfy the following conditions.

Condition 3: in the preceding term of the inflation and deployment period of the airbag 44, all the belts 56 neither come to the tension state nor prevent the inflation and deployment of the airbag 44.

Condition 4: in the latter term of the inflation and deployment period of the airbag 44, at least one belt 56 comes to the tension state, and prevents the inflation and deployment of the airbag 44 so as to lower the deployment speed, and the inflation and deployment is finished approximately at the same time as the conventional side airbag apparatus.

In the third embodiment, unlike the first embodiment, the belt 56 is not provided with the first redundant portion 58, the retention portion 62 and the like. The other structures than the above are the same as the first embodiment. Accordingly, the same reference numerals are attached to the same members and positions as the first embodiment and a description thereof will be omitted. In the third embodiment, the surplus portions of all the belts 56 come to the slackened state when the airbag 44 is in the storage mode.

In the latter term of the inflation and deployment period of the airbag 44, all the belts 56 are elongated in accordance with the inflation and deployment of the airbag 44. Accordingly, the shortest belt 56 is first tensioned so as to prevent the inflation and deployment of the airbag 44. In each of the belts 56, since the strength of the separable portion 71 is lower than the other positions, the separable portion 71 tends to be broken in comparison with the other positions, in the case where the force generated by the airbag 44 is applied to the belt 56.

Accordingly, if the airbag 44 continues inflating and deploying further from the state in which the belt 56 is tensioned, the energy of the inflation and deployment of the airbag 44 is consumed for breaking the separable portion 71. Accordingly, the deployment speed of the airbag 44 is lowered. Further, if the separable portion 71 is broken and the belt 56 is separated, the force preventing the inflation and deployment of the airbag 44 by the belt 56 disappears.

Particularly, the third embodiment has the separable portions 71 as the deployment control assembly, and is provided with a plurality of belts 56 having the different lengths. Accordingly, the belts are broken in order from the separable portion 71 of the short belt 56 in accordance with the inflation of the airbag 44. In the latter term of the inflation and deployment period, since a part of the energy of the inflation and deployment of the airbag 44 is consumed each time the separable portion 71 is broken, the deployment speed of the airbag 44 is lowered than the deployment speed V2.

Accordingly, it is possible to obtain the following advantage (4A) corresponding to the advantage (4) in addition to the advantages (1) to (3) and (5) mentioned above in the first embodiment, by the third embodiment.

(4A) The belt 56 is used as the elongated member, and both end portions of the belt 56 are fixed to the vehicle seat 22. Further, the separable portion 71 is provided in the middle of the belt 56. Accordingly, since a part of the energy of the inflation and deployment of the airbag 44 is consumed for breaking the separable portion 71, the deployment speed of the airbag 44 is securely lowered.

The third embodiment may be modified in the same manner as the items (a) and (h) mentioned above. Further, the third embodiment may be modified as follows.

(j) In place of the separable portion 71 constituted by the perforated line, the belt 56 may be constituted by a plurality of belt pieces, and the adjacent belt pieces may be coupled by a pair of snap-fit type fastening parts so as to be separable. In this case, both fastening parts are separated in accordance with the inflation and deployment of the airbag 44. A part of the energy of the inflation and deployment of the airbag 44 is consumed for this separation, and the deployment speed of the airbag 44 is lowered.

(k) The number of the separable portion 71 in each of the belts 56 may be changed.

(l) In the case of differentiating the length of the belt 56 between the belts 56, there is no specific relation demanded between the length of the belt 56 and the position of the belt 56. Accordingly, it is possible to optionally set the arranged position of the belt 56 in the airbag module 43, and the length of the belt 56.

(m) The strengths of the separable portions 71 are different in correspondence to the ratio of the position having no cut. The more the ratio of the position having no cut is, the higher the strength of the separable portion 71 is. For example, as shown in FIG. 19(B), the ratio of the position having no cut may be different for each belt 56. In this case, it is not necessary to differentiate the strength of the separable portion 71 in all the belts 56. Further, a plurality of belts 56 may be divided into a plurality of groups, and the strength of the separable portion 71 may be different for each group. It is desirable that the strength of the separable portion 71 becomes higher as the belt 56 becomes longer. In this case, it is possible to break the belt 56 in order from the separable portion 71 of the short belt 56 in accordance with the progress of the inflation and deployment of the airbag 44.

(n) The direction in which the separable portion 71 extends may be changed to a direction which diagonally intersects the belt 56.

(o) The belt 56 having the same structure as mentioned above may be arranged in the airbag 44 in the same manner as the second embodiment.

Fourth Embodiment

Next, a description will be given of a fourth embodiment in accordance with the present invention with reference to FIG. 5. In the fourth embodiment, the deployment control assembly is different from the first embodiment.

The deployment control assembly is constructed by at least one belt 56 constituted by a cloth sheet, a tape or the like having an elasticity, as the elongated member. The length in a natural state in which the belt 56 is not expanded is longer than the length necessary for surrounding the airbag 44 in the storage mode. Further, a length in an expanded state of the belt 56 corresponds to a length capable of surrounding the inflated and deployed airbag 44. The belt 56 maintains a natural state in the preceding term of the inflation and deployment period of the airbag 44, and has a length corresponding to the expansion in the latter term.

The belt 56 is arranged outside the airbag 44 in the storage mode, in such a manner as to surround the airbag 44 substantially in the horizontal direction. Both end portions of the belt 56 are fixed to the side frame portion 28. In the belt 56, the portion which does not surround the airbag 44 in the storage mode is slackened.

The other structures than the above are the same as the first embodiment. Accordingly, the same reference numerals are attached to the same members, positions and the like as those of the first embodiment and a description thereof will be omitted. In the fourth embodiment, since the belt 56 is slackened in the preceding term of the inflation and deployment period of the airbag 44, the inflation and deployment of the airbag 44 is not prevented by the belt 56.

In the latter term of the inflation and deployment period of the airbag 44, the slack belt 56 is pulled by the airbag 44 being inflated and deployed (a tension state). The belt 56 is formed by a raw material having the elasticity. Accordingly, the belt 56 is expanded in accordance with the inflation and deployment of the airbag 44. At this time, an elastic restoring force of the belt 56 is increased in accordance with an expansion of the belt 56. Since the energy of the inflation and deployment of the airbag 44 is consumed by the expansion of the belt 56, the deploying speed of the airbag 44 is lowered.

In accordance with the fourth embodiment, it is possible to obtain the following advantage (4B) corresponding to the advantage (4), in addition to the advantages (1) to (3) and (5) mentioned above in the first embodiment.

(4B) Both end portions of the belt 56 made of the elastic raw material are fixed to the side frame portion 28 of the vehicle seat 22. Accordingly, since a part of the energy of the inflation and deployment of the airbag 44 is consumed for the expansion of the belt 56, the deploying speed of the airbag 44 is securely lowered.

The fourth embodiment may be modified in the same manner as the items (a), (h), (i) and (o) mentioned above. In addition, the fourth embodiment may be modified as follows.

(p) The number of the belt 56 is not limited to one, but may be set to a plural number.

Fifth Embodiment

Next, a description will be given of a fifth embodiment in accordance with the present invention with reference to FIGS. 20 to 22. In the fifth embodiment, the deployment control assembly is different from the first embodiment.

In the airbag 44, an inner coupling portion serving as the deployment control assembly is provided in a region surrounded by the outer coupling portion 46. The inner coupling portion couples both overlapping portions 44A and 44B in such a manner as to be separated in accordance with the inflation of the airbag 44.

Figure 20:
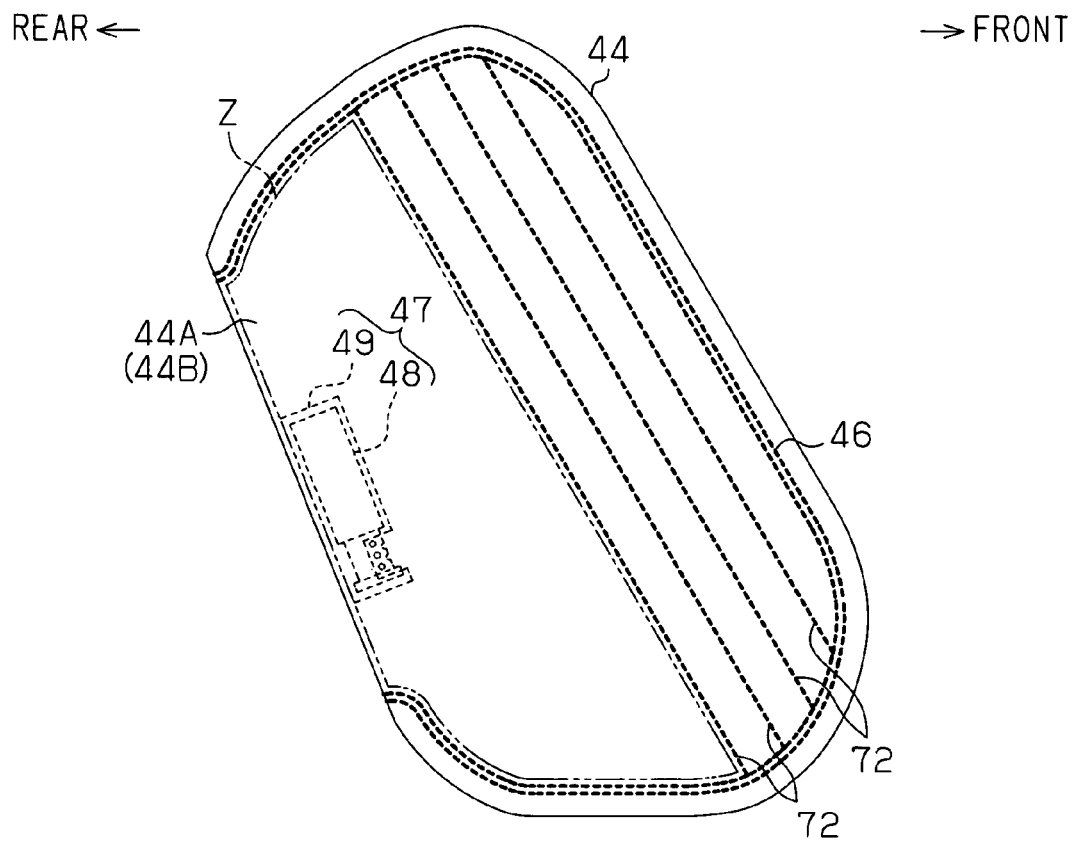
FIG. 20 is a side elevational view showing a positional relation between an airbag in accordance with a fifth embodiment and a tear seam.
Figure 21:
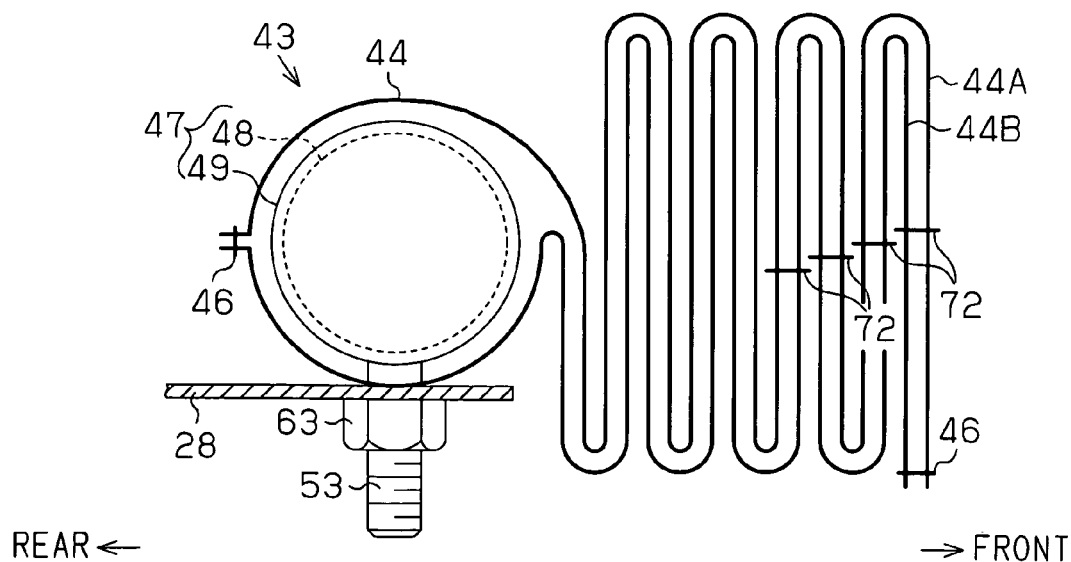
FIG. 21 is a cross-sectional plan view showing an airbag module.

As shown in FIGS. 20 and 21, the inner coupling portion is constituted by four tear seams 72. Each of the tear seams 72 couples both overlapping portions 44A and 44B at a lower strength than the outer coupling portion 46. Each of the tear seams 72 is formed by seaming both overlapping portions 44A and 44B in a direction which is substantially orthogonal to the deploying direction of the airbag 44, by using the sewing threads. Both end portions of each of the tear seams 72 are coupled to the outer coupling portion 46.

The tear seam 72 is set at a position which satisfies the following conditions.

Condition 5: in the preceding term of the inflation and deployment period of the airbag 44, the tear seams 72 do not prevent the inflation and deployment of the airbag 44.

Condition 6: in the latter term of the inflation and deployment period of the airbag 44, the tear seams 72 prevent the inflation and deployment of the airbag 44 so as to lower the deploying speed, and the inflation and deployment of the airbag 44 is finished approximately at the same time as the conventional side airbag apparatus.

The position satisfying both conditions 5 and 6 is the front portion in the region surrounded by the outer coupling portion 46. In other words, the rear portion of the region surrounded by the outer coupling portion 46 serves the same function as the second redundant portion 60 in the first embodiment. In other words, this inflation region corresponds to the region for inflating and deploying the airbag 44 at the high deploying speed V2 in the preceding term of the inflation and deployment period.

The other structures than the above are the same as the first embodiment. Accordingly, the same reference numerals are attached to the same members and positions as those of the first embodiment, and a description thereof will be omitted.

Figure 22:
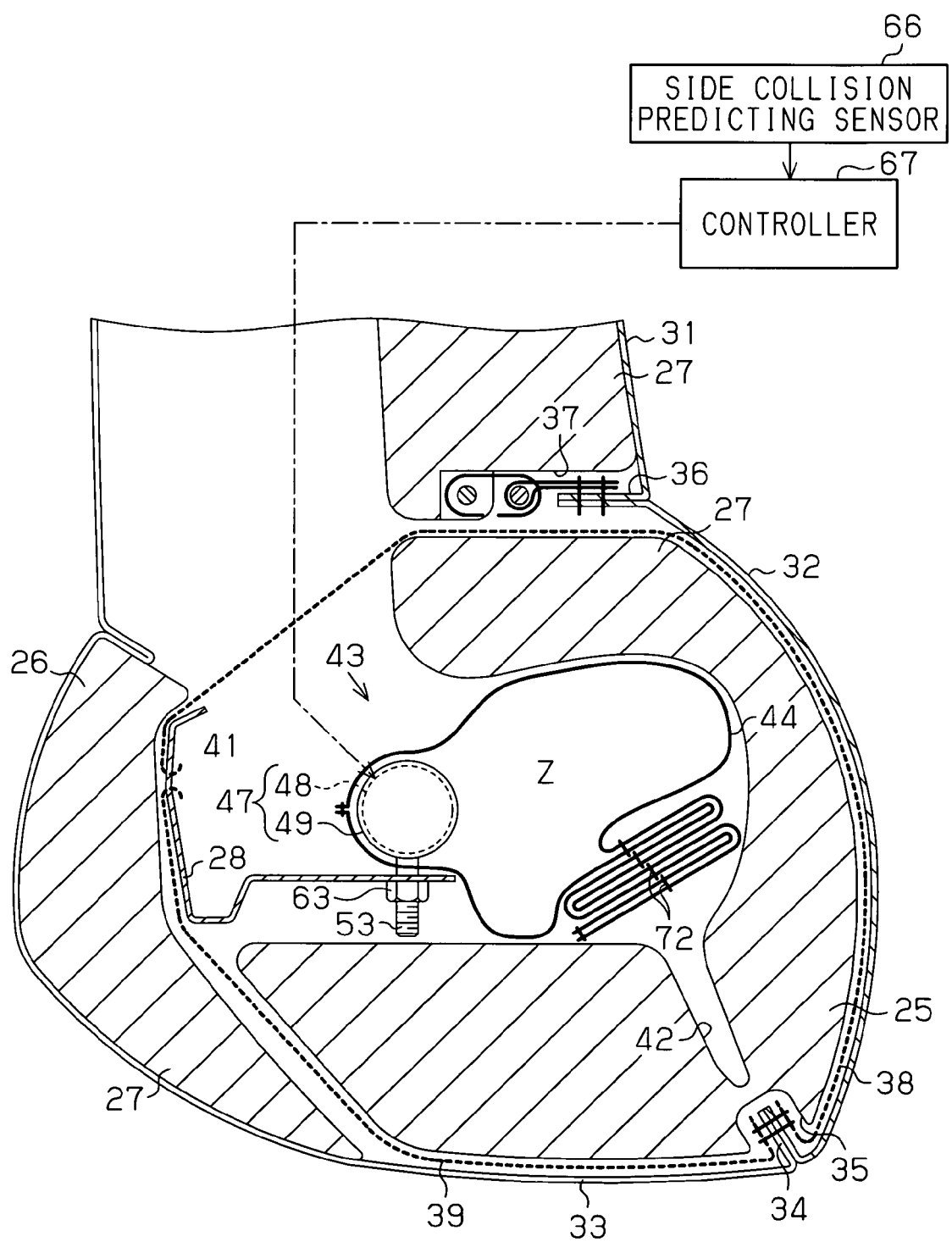
FIG. 22 is a partial cross-sectional plan view showing a state when a side support portion starts inflating.

In the preceding term of the inflation and deployment period of the airbag 44, the inflation region Z of the airbag 44 is inflated and deployed at the high deploying speed V2 in the storage space 41, as shown in FIG. 22. At this time, each of the tear seams 72 is not broken, but couples both overlapping portions 44A and 44B.

In the latter term of the inflation and deployment period of the airbag 44, the tear seam 72 prevents the inflation and deployment of the airbag 44. In the tear seam 72, the force coupling both overlapping portions 44A and 44B is smaller than the other positions (the outer coupling portion 46), and both overlapping portions 44A and 44B tend to be broken. Accordingly, if the inflation and deployment of the airbag 44 further makes progress, the energy for inflating and deploying the airbag 44 is consumed for breaking the tear seam 72. Therefore, the deploying speed of the airbag 44 is lowered. If the tear seam 72 is broken, the force preventing the inflation and deployment of the airbag 44 by the tear seam 72 disappears.

A plurality of tear seams 72 are provided in the front portion of the airbag 44. Accordingly, the tear seams 72 are broken in order from the rear portion (close to the inflator assembly 47) of the airbag 44 to the front portion, in accordance with the inflation of the airbag 44. Since the energy of the inflation and deployment of the airbag 44 is consumed each time the tear seams 72 are broken, the deploying speed of the airbag 44 continues being lowered over a predetermined period.

The timing at which the front portion (the tear seam 72 portion) from the inflation region Z starts opening from the folded state in the airbag 44, that is, the timing at which the deploying speed is switched from V2 to V1 (time t3 in FIG. 13) is preferably in a period from immediately before the airbag 44 jumps out from the vehicle seat 22 to immediately after.

Accordingly, in accordance with the fifth embodiment, it is possible to obtain the following advantage (4C) corresponding to the advantage (4) mentioned above, in addition to the advantages (1) to (3) mentioned above in the first embodiment.

(4C) In both overlapping portions 44A and 44B, the region surrounded by the outer coupling portion 46 is provided with the tear seam 72 coupling both overlapping portions 44A and 44B at the lower strength than the outer coupling portion 46. Accordingly, since a part of the energy of the inflation and deployment of the airbag 44 is consumed for breaking the tear seam 72, the deploying speed of the airbag 44 is securely lowered.

The fifth embodiment may be modified in the same manner as the item (a) mentioned above. In addition, the fifth embodiment may be modified as follows.

(q) The inner coupling portion may be constituted by a pair of snap-fit type fastening parts as described in the item (c) mentioned above. In this case, both overlapping portions 44A and 44B are coupled with both fastening parts by respectively providing both fastening parts in the opposing positions of both overlapping portions 44A and 44B. Further, since both fastening parts are separated in accordance with the inflation and deployment of the airbag 44, the coupling between both overlapping portions 44A and 44B is canceled.

(r) The tear seam 72 may be formed by adhering both overlapping portions 44A and 44B by an adhesive agent.

Figure 23:
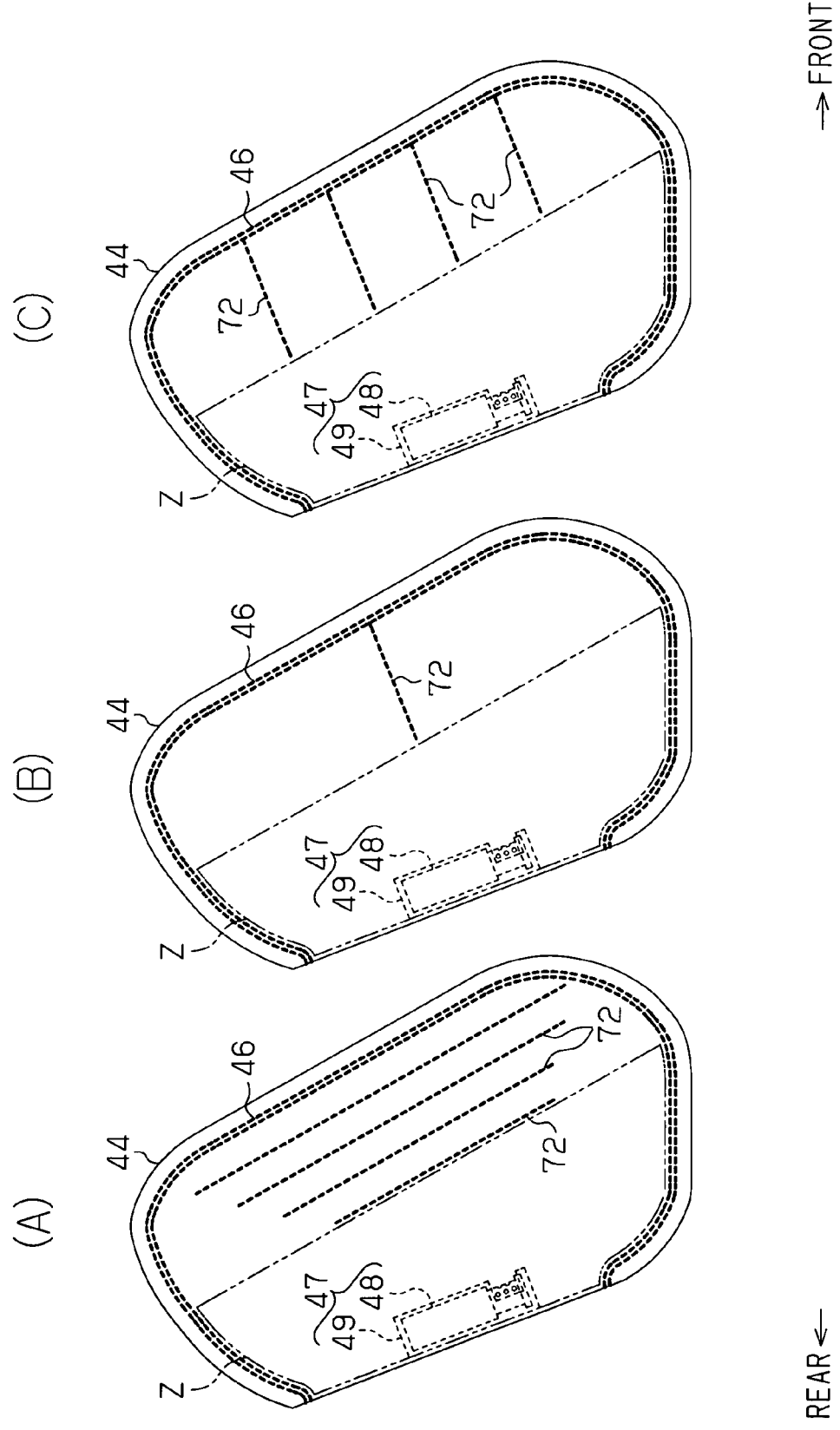
FIGS. 23(A) to 23(C) are side elevational views of an airbag showing modifications of the fifth embodiment.

(s) The longer the tear seams 72 are, the higher the strength of the tear seams 72 is. Accordingly, the length of the tear seams 72 may be different for each tear seam 72. In this case, it is possible to change the deploying speed V1 even in the latter term of the inflation and deployment period. For example, the length of the tear seams 72 may be shorter toward the rear portion from the front portion of the airbag 44, as shown in FIG. 23(A). In this case, in the latter term of the inflation and deployment period, the deploying speed V1 is greatly lowered together with an elapse of a time, and the airbag 44 is slowly inflated and deployed.

(t) For example, as shown in FIG. 23(B), it is possible to employ the tear seams 72 extending in parallel to the deploying direction of the airbag 44. In this case, the tear seams 72 are broken in order from the rear end to the front end in accordance with the progress of the inflation and deployment of the airbag 44. In the case where only one tear seam 72 is provided, the gas from the inflator 48 reaches the front portion of the airbag 44 before the tear seam 72 is broken, whereby the airbag 44 is unevenly inflated. Accordingly, as shown in FIG. 23(C), a plurality of tear seams 72 extending in the deployment direction of the airbag 44 may be provided in the airbag 44. In this case, the tear seams 72 is broken while inflating a whole of the airbag 44 in a wall-balanced manner.

Sixth Embodiment

Next, a description will be given of a sixth embodiment in accordance with the present invention with reference to FIGS. 24 and 25. In the sixth embodiment, the deployment control assembly is different from the first embodiment.

The airbag 44 is folded as mentioned above for setting the airbag 44 in the storage mode, however, there exist plural kinds of folding methods. The readiness of the inflation and deployment of the airbag 44 and the deploying speed are different in correspondence to the folding method. In other words, the quicker the opening of the folded airbag 44 is, the higher the deploying speed is.

Specifically, the folding method includes a roll fold in addition to the accordion fold. The roll fold is a folding method of winding around one end portion of the airbag 44. In general, the accordion folded airbag is more easily opened than the roll folded airbag. Accordingly, in the case where the gas blows out from the inflator, the latter airbag is inflated and deployed later than the former airbag.

Figure 25:
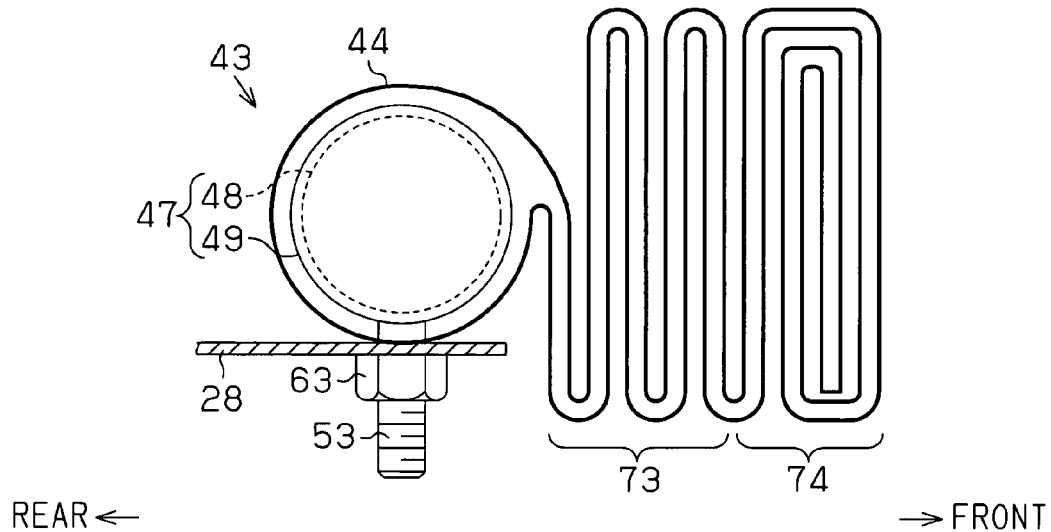
FIG. 25 is a cross-sectional plan view showing an airbag module.

Focusing on this point, in the sixth embodiment, an accordion folded first fold portion 73 and a roll folded second fold portion 74 are formed in the airbag 44 in the storage mode, as shown in FIG. 25. The first fold portion 73 is formed by alternately folding back the rear portion of the airbag 44 from the front end to the rear end of the airbag 44 at a fixed width, in the same manner as the first embodiment. Further, the second fold portion 74 is formed by roll folding the front portion of the airbag 44. In this case, the other portions are wound around the front end of the airbag 44 in a counterclockwise direction.

The first fold portion 73 and the second fold portion 74 satisfy the following conditions.

Condition 7: in the preceding term of the inflation and deployment period of the airbag 44, only the first fold portion 73 is mainly inflated and deployed, and the folded state of the second fold portion 74 is not canceled.

Condition 8: in the latter term of the inflation and deployment period of the airbag 44, the second fold portion 74 is mainly inflated and deployed, and the inflation and deployment of the airbag is finished at the same timing as the conventional side airbag apparatus. In the present embodiment, the deployment control assembly in the sixth embodiment is structured by the first fold portion 73 and the second fold portion 74.

Figure 24:
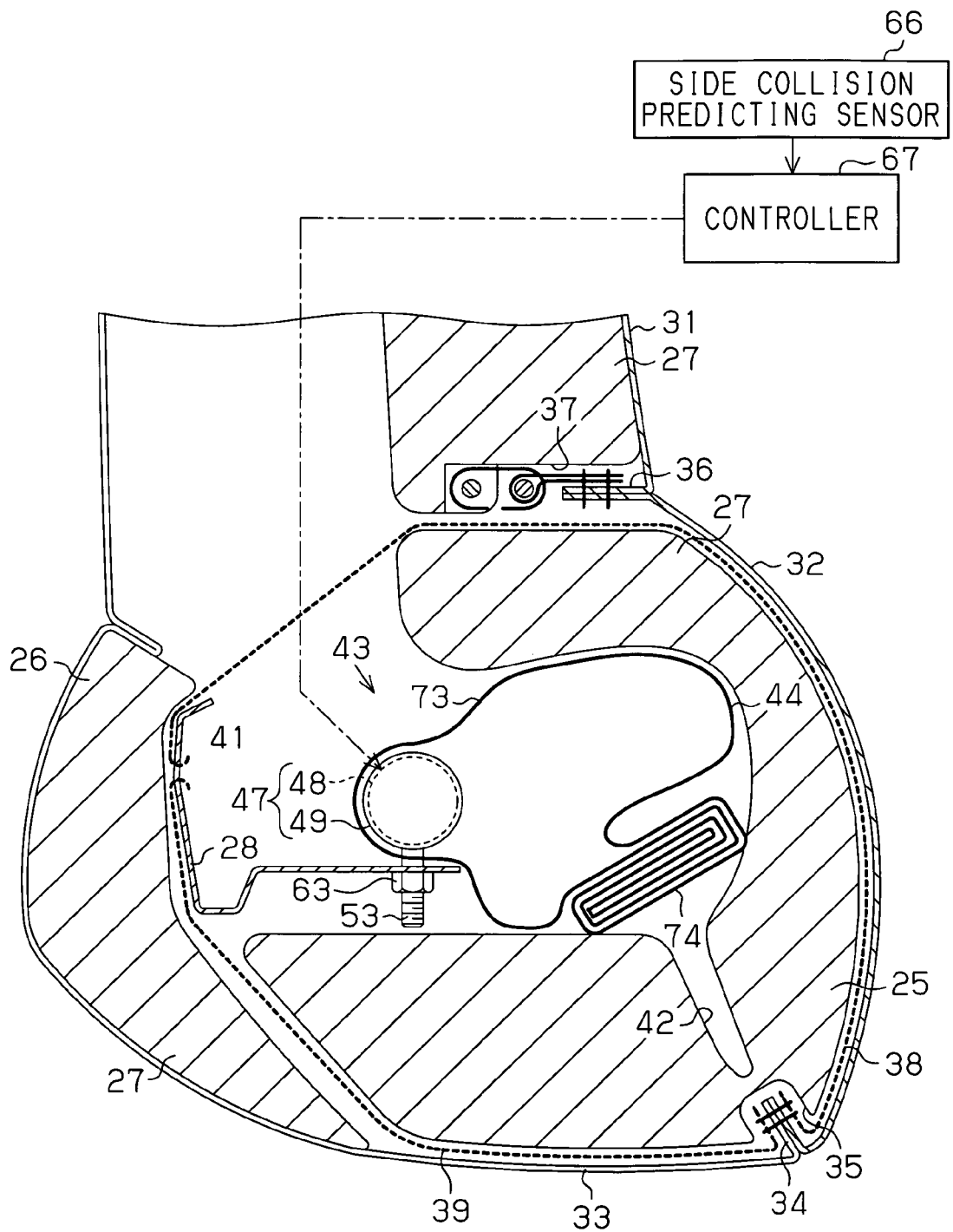
FIG. 24 is a partial cross-sectional plan view showing a state when a side support portion starts inflating in a sixth embodiment.

Immediately after starting the actuation of the inflator 48 (in the preceding term of the inflation and deployment period), the folded state of the first fold portion 73 is mainly canceled in the vehicle seat 22 (the storage space 41), as shown in FIG. 24. In contrast, in the latter term of the inflation and deployment period, the folded state of the second fold portion 74 is mainly canceled. In this state, the second fold portion 74 is deployed forward in a state of being in contact with the body side portion 21 while canceling the folded state.

The timing at which the second fold portion 74 starts canceling the folded state, that is, the timing at which the deploying speed is switched from V2 to V1 (time t3 in FIG. 13) is preferably in the period from immediately before the airbag 44 jumps out from the vehicle seat 22 to immediately after.

Therefore, in accordance with the sixth embodiment, the same advantages as the advantages (1) to (3) in the first embodiment are obtained, and the following advantage is obtained.

(6) The first fold portion 73 is formed in the rear portion of the airbag 44 in the storage mode, and the second fold portion 74 is formed in the front portion of the airbag 44. Accordingly, the airbag 44 is inflated and deployed at the high deploying speed V2 in the preceding term of the inflation and deployment period, and the airbag 44 is inflated and deployed at the low deploying speed V1 in the latter term of the inflation and deployment period.

The sixth embodiment may be modified in the same manner as the item (a) mentioned above. In addition, the sixth embodiment may be modified as follows.

(u) The front portion of the airbag 44 may be wound in a clockwise direction so as to be roll folded.

(v) The rate of the first fold portion 73 and the second fold portion 74 may be appropriately regulated in the airbag 44.

Seventh Embodiment

Next, a description will be given of a seventh embodiment in accordance with the present invention with reference to FIGS. 26(A) and 26(B).

In general, in the side airbag apparatus, as the gas from the inflator 48 fills the airbag 44 and the internal pressure of the airbag 44 is increased, the airbag 44 is inflated and deployed. At this time, if the internal pressure of the airbag 44 is quickly increased, the deploying speed of the airbag 44 becomes higher. In other words, the internal pressure of the airbag 44 is quickly increased in correspondence to the feed amount of the gas blown out from the inflator 48 so as to be fed into the airbag 44. The seventh embodiment is structured such as to be capable of changing the feed amount of the gas blown out from the inflator 48 so as to be fed into the airbag 44.

The lower end portion of the retainer 49 is provided with a plurality of through holes 75 in place of the window portion 52 in the first embodiment. The through hole 75 serves as a passage of the gas blown out from the gas outlet 51 of the inflator 48 (refer to FIG. 5). The through hole 75 is provided in such a manner as to be directed at least to the front side in the peripheral surface of the retainer 49. A plurality of through holes 75 are provided at two different positions in the longitudinal direction of the retainer 49. In this case, the through hole positioned in an upper side is referred to as a through hole 75U, and the through hole positioned in a lower side is referred to as a through hole 75L.

A movable member 76 formed as a closed-end cylindrical shape is installed to the lower end portion of the retainer 49 so as to be movable along the longitudinal direction of the retainer 49. The movable member 76 is retained at a second position (a nonrestrictive position) shown in FIG. 26(A), in an initial state. In the nonrestrictive position, the movable member 76 does not close any of the through holes 75U and 75L. In other words, the movable member 76 does not restrict the feed amount of the gas blown out from the inflator 48. The feed amount of the gas means an amount of the gas fed to the airbag 44 from the inflator 48 per unit time.

Figure 26:
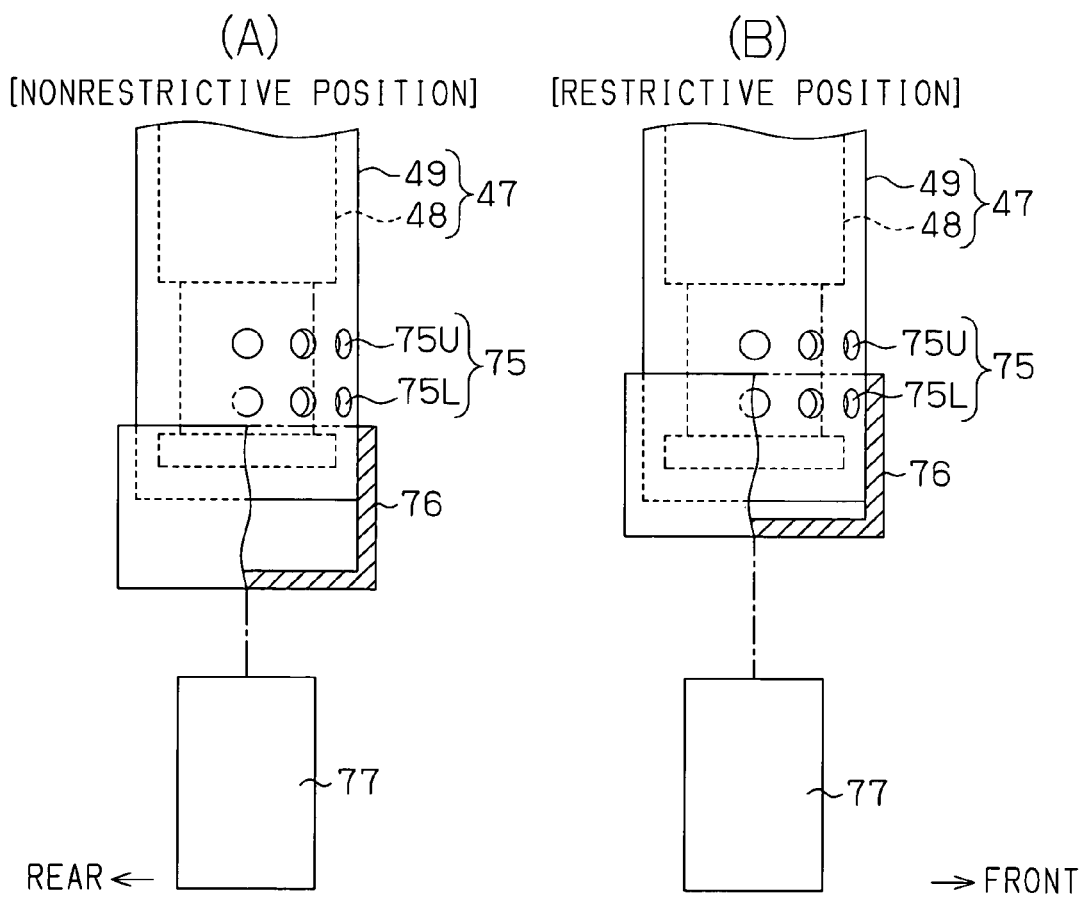
FIG. 26(A) is a side elevational view, with a part cut away, showing a state in which a movable member is retained at a nonrestrictive position in a seventh embodiment.
FIG. 26(B) is a side elevational view, with a part cut away, showing a state in which the movable member is moved to a limited position.

To the movable member 76, there is coupled an actuator 77 moving the movable member 76 to a first position (a restrictive position) shown in FIG. 26(B). Since the movable member 76 closes only the lower through hole 75L at the restrictive position, the feed amount of the gas blown out from the inflator 48 so as to be fed to the airbag 44 is restricted.

The controller 67 retains the movable member 76 at the nonrestrictive position shown in FIG. 26(A) without actuating the actuator 77 in the preceding term of the inflation and deployment period of the airbag 44, and actuates the actuator 77 so as to move the movable member 76 to the restrictive position shown in FIG. 26(B) in the latter term of the inflation and deployment period. In the present embodiment, the deployment control assembly is constructed by the movable member 76, the actuator 77 and the controller 67.

In accordance with the structure mentioned above, the feed amount of the gas blown out from the inflator 48 so as to be fed into the airbag 44 is different in correspondence to the position of the movable member 76, whereby the deploying speed of the airbag 44 is different. If a great amount of gas is fed to the airbag 44 from the inflator 48, the airbag 44 is inflated and deployed at a high deploying speed. In contrast, if only a small amount of gas is fed to the airbag 44 from the inflator 48, the airbag 44 is inflated and deployed at the low deploying speed.

In the seventh embodiment, the movable member 76 is retained at the nonrestrictive position in the preceding term of the inflation and deployment period of the airbag 44. Accordingly, the gas blown out from the inflator 48 is fed to the airbag 44 without being restricted by the movable member 76. Accordingly, since the gas quickly fills the airbag 44, the internal pressure of the airbag 44 is quickly increased, and the airbag 44 is inflated and deployed at the high deploying speed V2.

In contrast, the movable member 76 is moved to the restricted position in the latter term of the inflation and deployment period. In this case, since the gas blown out from the inflator 48 is restricted by the movable member 76, the amount of the gas fed to the airbag 44 is reduced. Accordingly, an increase of the internal pressure of the airbag 44 is slow, and the airbag 44 is inflated and deployed at the low deploying speed V1 accordingly.

Therefore, in accordance with the seventh embodiment, the same advantages as the advantages (1) to (3) mentioned above in the first embodiment are obtained, and the following advantage is obtained.

(7) It is possible to change the feed amount of the gas blown out from the inflator 48 so as to be fed to the airbag 44 by the movable member 76. In other words, in the latter term of the inflation and deployment period of the airbag 44, the movable member 76 is moved to the position restricting the feed amount of the gas by the actuator 77. Accordingly, it is possible to inflate and deploy the airbag 44 at the low deploying speed V1.

In this case, the seventh embodiment may be modified in the same manner as the item (a) mentioned above. In addition, the seventh embodiment may be modified as follows.

(w) The inflator assembly 47 may be changed to a structure which does not use the retainer 49. In this case, the closed-end cylindrical shape movable member 76 is installed to the lower end portion of the inflator 48 so as to be movable along the longitudinal direction of the inflator 48. The movable member 76 is retained at the position which does not close the gas outlet 51 of the inflator 48, in the initial state. At this position, the movable member 76 does not restrict the feed amount of the gas blown out from the inflator 48 so as to be fed to the airbag 44. In the latter term of the inflation and deployment period of the airbag 44, the movable member 76 is moved to the position closing a part of the gas outlet 51 by the actuator 77. It is possible to restrict the feed amount of the gas blown out from the inflator 48 so as to be fed to the airbag 44 by the movable member 76 arranged at this position. Accordingly, the same advantages as the seventh embodiment are obtained. It is possible to combine the deployment control assemblies shown in the first to seventh embodiments mentioned above.

Eighth Embodiment

Next, a description will be given of an eighth embodiment in accordance with the present invention with reference to FIGS. 27 to 40. In this case, the same reference numerals are attached to the same members, positions and the like as those of the first embodiment, and a detailed description thereof will be omitted.

As shown in FIGS. 27 to 29(A), the other end portion 56B of the belt 56 is coupled to the side frame portion 28 of the vehicle seat 22 by coupling means. The coupling means is provided with an anchor member 71 and a restraint member 72. The anchor member 71 is constituted by a pin, and is fixed to the end portion 56B of the belt 56. The restraint member 72 is made of a shape memory alloy transformed by energization, and is fixed to an end portion 56A of the belt 56.

The restraint member 72 has a substantially annular shape surrounding an outer periphery of the anchor member 71 as shown in FIG. 29(A) when it is not energized, and grips the anchor member 71. On the basis of this grip, in the coupling means, the end portion 56B of the belt 56 is coupled to the side frame portion 28 with the anchor member 71 and the restraint member 72, and the end portion 56A of the belt 56 is coupled to the side frame portion 28 with the bolt 53 and the nut 63, respectively (a coupled state). The end portion 56A of the belt 56 is always fixed to the side frame portion 28. Accordingly, in the coupled state, both end portions 56A and 56B of the belt 56 are fixed to the vehicle seat 22.

Further, the restraint member 72 is transformed to a substantially circular arc shape surrounding the outer periphery of the anchor member 71, as shown in FIG. 29(B), when it is energized. Since the grip of the anchor member 71 by the restraint member 72 is weakened on the basis of this transformation, the coupling (the restraint) of the anchor member 71 by the restraint member 72 is canceled (a coupling canceled state). Accordingly, in the coupling canceled state, only one end portion 56A of the belt 56 is fixed to the vehicle seat 22. The coupled state and the coupling canceled state of the coupling means are switched by controlling the energization of the restraint member 72 by a controller 84 as mentioned above.

Figure 27:
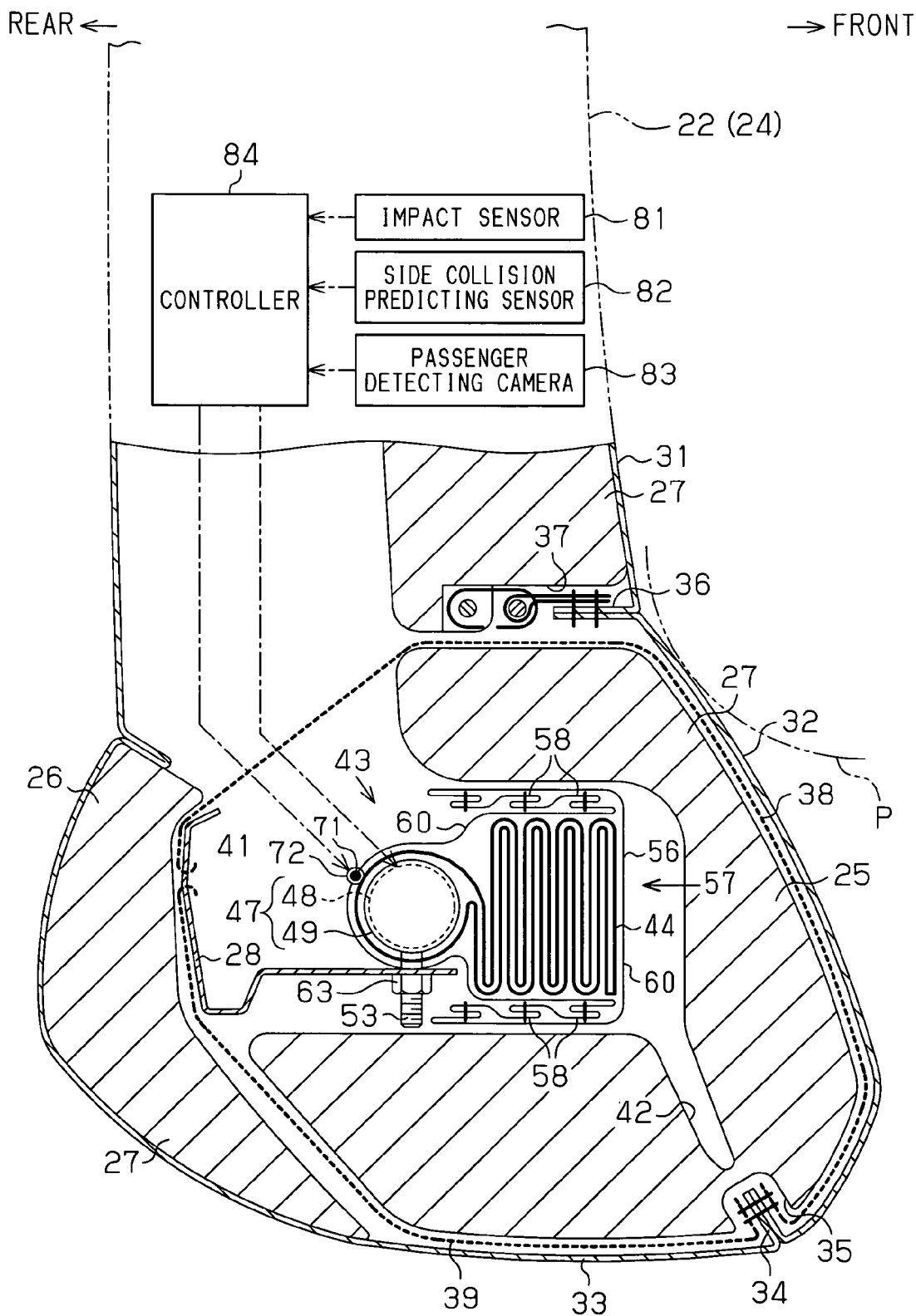
FIG. 27 is a partial cross-sectional plan view showing an inner structure of a seat back in an eighth embodiment.
Figure 28:
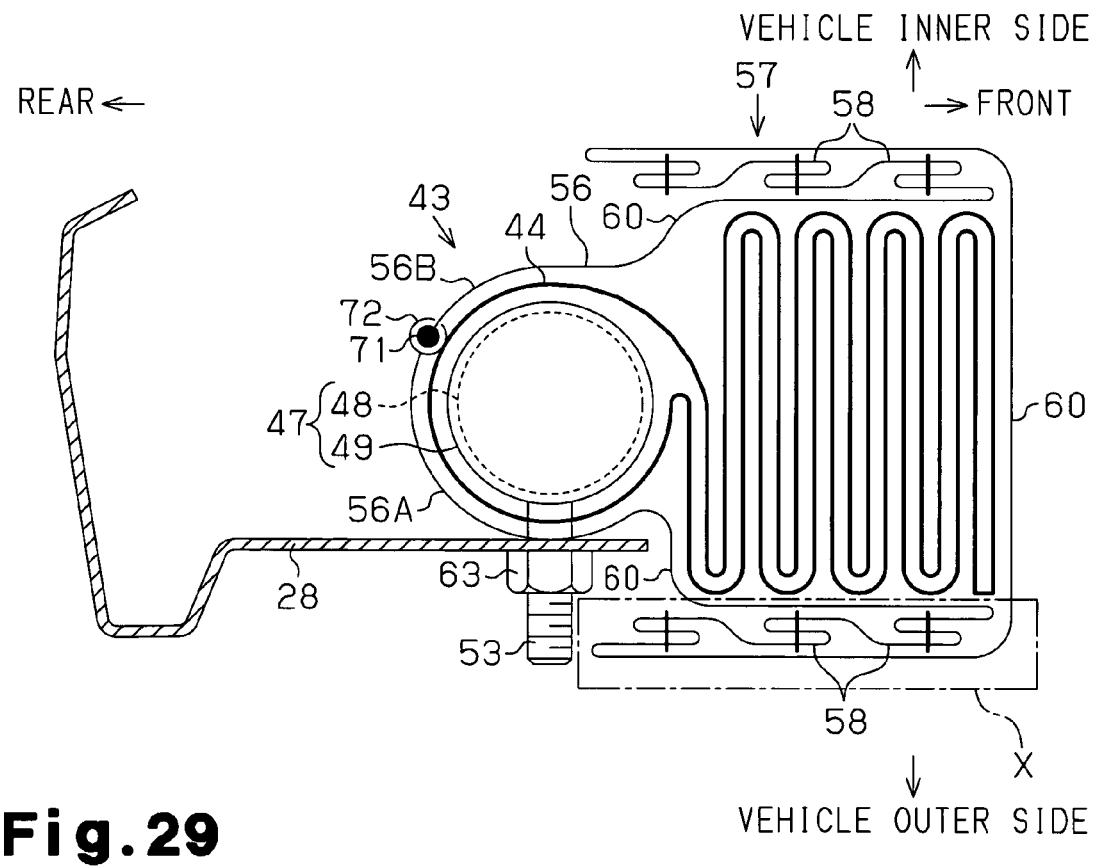
FIG. 28 is a partial cross-sectional plan view showing a side frame portion and an airbag module in an enlarged manner.
Figure 29:
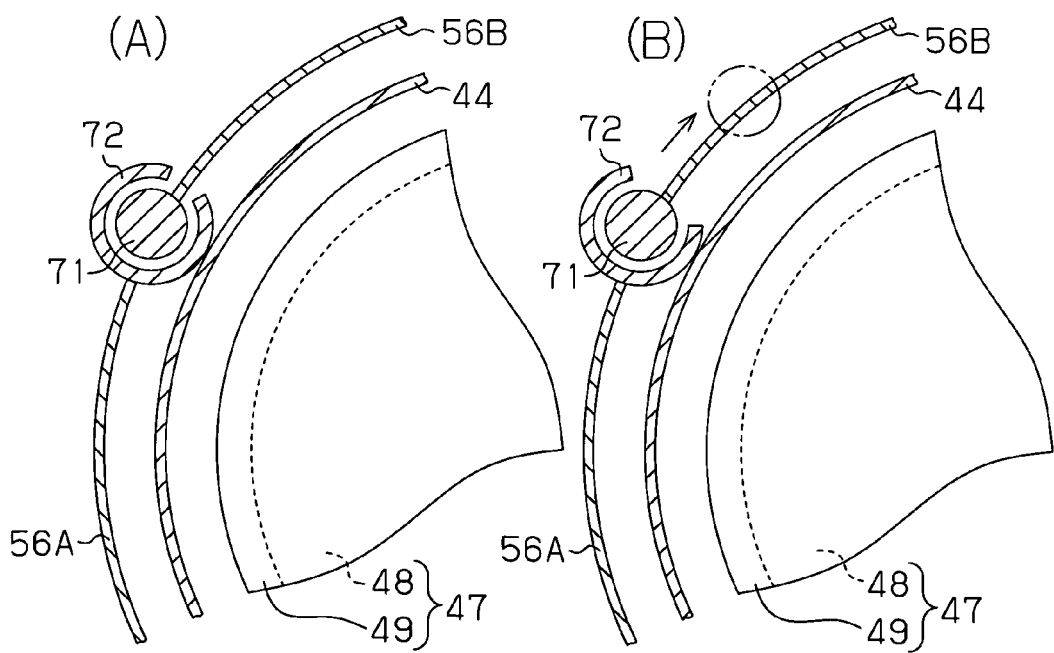
FIG. 29(A) is a partial cross-sectional plan view showing coupling means coupling an end portion of a belt to the side frame portion.
FIG. 29(B) is a partial cross-sectional view showing a state in which a coupling by coupling means is canceled.

As shown in FIG. 27, the side airbag apparatus is provided with an impact sensor 81, a side collision predicting sensor 82, a passenger detecting camera 83 and the controller 84, in addition to the airbag module 43 mentioned above. The impact sensor 81 is used as a first detector, and is provided in the body side portion 21 of the vehicle or the like. The impact sensor 81 detects a shock in the case where a shock of a predetermined or greater value is applied to the vehicle from a side portion (when the side collision is generated). The side collision predicting sensor 82 is constituted by a millimeter wave radar or the like, and is used as a part of the predicting means and a speed detector.

The passenger detecting camera 83 is constituted by a CCD camera or the like, and is used as a second detector detecting whether a part of the body of the passenger P exists in the passenger restraint region Z1 shown in FIG. 2, and a position detector detecting a seat position of the passenger P. The passenger detecting camera 83 forms images of the passenger restraint region Z1 and the region in which the passenger P is seated on the vehicle seat 22.

The controller 84 serves as inflator control means, a part of the predicting means, changing means for changing the actuation start time, and a part of the deployment control assembly. The controller 84 is structured mainly by a microcomputer, and carries out various computing processes on the basis of signals from the various sensors 81 to 83. For example, the controller 84 carries out an image processing of the imaged data by the passenger detecting camera 83, detects whether a part of the body of the passenger P exists in the passenger restraint region Z1 by the airbag 44, and detects whether the passenger P is seated at a normal position of the vehicle seat 22. The normal position is a position at which the passenger P is seated at the center of the seat cushion 23, and reclines in the center of the seat back 24.

Figures 30, 31:
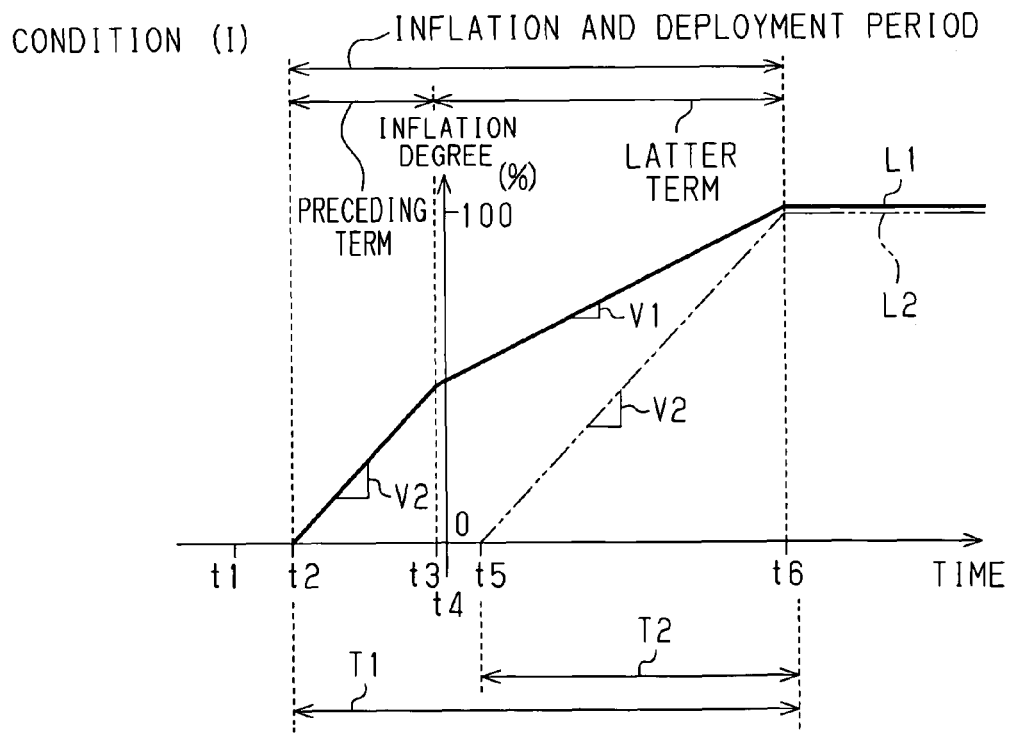
FIG. 30 is a view showing a relation among a seated posture, a side collision speed, and the content of control by a controller.
FIG. 31 is a graph showing changes over time of an inflation degree of the airbag in a condition (I)

The controller 84 predicts the side collision of the vehicle on the basis of the results of detection, and the results of detection by the impact sensor 81 and the side collision predicting sensor 82, and controls various actuations of the inflator 48 and the restraint member 72 in correspondence to the predicted result. FIG. 30 shows an outline of the control contents by the controller 84. "Seating posture" in FIG. 30 means a posture of the passenger P seated on the vehicle seat 22.

"Specific posture" means a posture when the passenger P is seated in a state of positioning a part of the body in the passenger restraint region Z1. Specifically, in the case of detecting that a part of the body of the passenger P exists in the passenger restraint region Z1 as a result of the image processing of the imaging data by the passenger detecting camera 83, it is determined that the seating posture of the passenger P is "specific posture" regardless of whether the passenger P is seated at the normal position of the vehicle seat 22.

"Normal posture" means a posture when the passenger P is seated without positioning a part of the body in the passenger restraint region Z1. Specifically, in the case of detecting that a part of the body of the passenger P does not exist in the passenger restraint region Z1, and the passenger P is seated at the normal position of the vehicle seat 22, as a result of the image processing of the imaging data by the passenger detecting camera 83, it is determined that the seating posture of the passenger P is "normal posture".

"Side collision speed" in FIG. 30 means a relative speed immediately before the side collision between the vehicle and the subject (particularly, the other car). The side collision speed is sectionalized into three comprising a low speed, a medium speed and a high speed.

An actuation start time in FIG. 30 corresponds to a time at which the inflator 48 starts an actuation in response to an ignition command signal from the controller 84 (is ignited so as to start blowing out gas). The actuation start time is sectionalized into "normal" and "early stage". The actuation start time at a time of starting the actuation of the inflator 48 immediately after the actual side collision generation on the basis of the result of detection of the impact sensor 81 corresponds to "normal". In contrast, the actuation start time at a time of predicting the side collision on the basis of the result of detection of the side collision predicting sensor 82 and starting the actuation of the inflator 48 in advance of the actual side collision corresponds to "early stage".

A deploying speed in FIG. 30 corresponds to a speed when the airbag 44 is inflated and deployed by the gas. The deploying speed is sectionalized into "normal speed" and "low speed". The deploying speed in the case where the inflation and deployment of the airbag 44 is not prevented by the belt 56 corresponds to "normal speed". In contrast, the deploying speed in the case where the inflation and deployment of the airbag 44 is prevented by the belt 56 corresponds to "low speed". This "low speed" means a lower speed than "normal speed", rather than a low absolute value of the deploying speed.

(I) Control modes of the actuation start time and the deploying speed are different in a case (I) where the seating posture is "specific posture", a case (II) where the seating posture is "normal posture" and the side collision speed is "medium or high speed", and a case (III) where the seating posture is "normal posture" and the side collision speed is "low speed".

Figure 36:
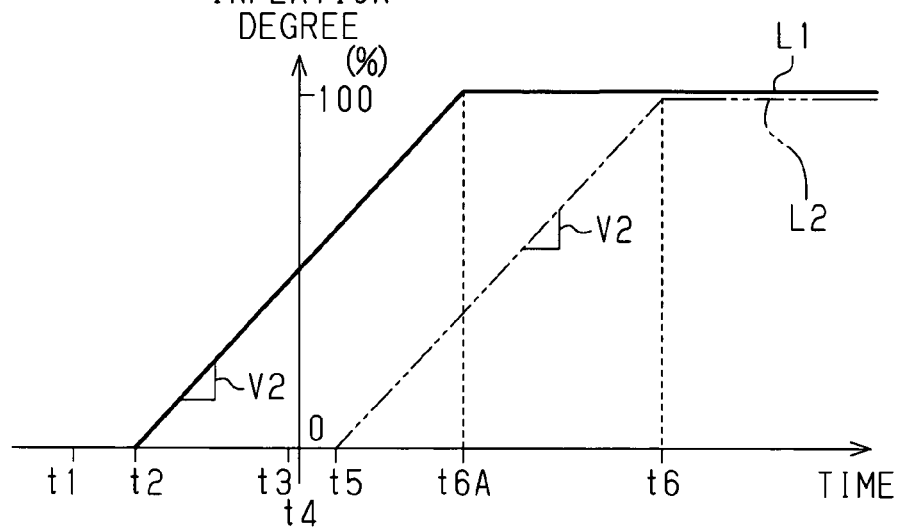
FIG. 36 is a graph showing changes over time of the inflation degree of the airbag in the condition (II)
Figure 37:
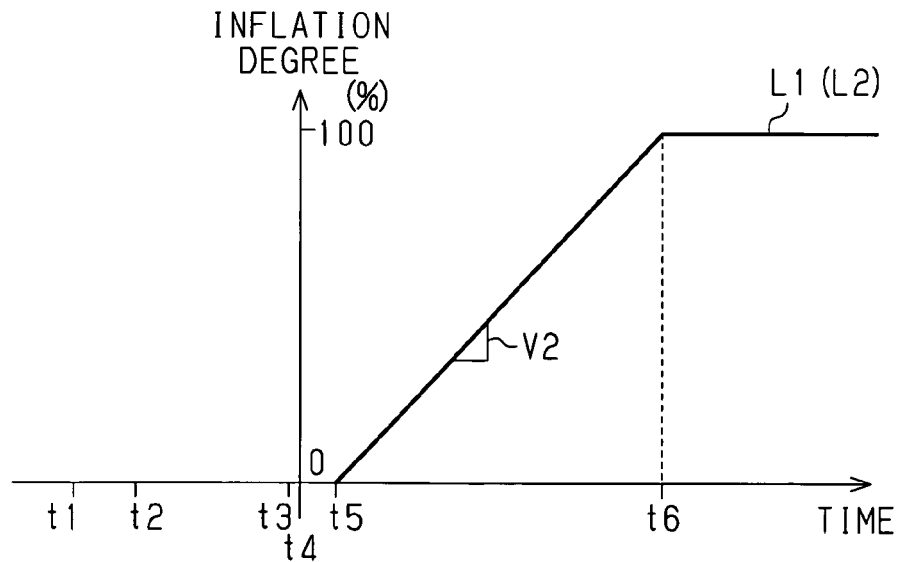
FIG. 37 is a graph showing changes over time of the inflation degree of the airbag in the condition (III)

Next, a description will be given of the control contents by the controller 84 with reference to FIGS. 31, 36 and 37, for three conditions (I) to (III). FIGS. 31, 36 and 37 schematically show the time change of the inflation degree at an early stage of the inflation of the airbag 44. The inflation degree is an index indicating the progress degree of the inflation of the airbag 44. When the airbag 44 is not inflated, that is, is in the storage mode, the inflation degree of the airbag 44 is "0%". Further, when the airbag 44 is inflated to the maximum, that is, the inflation is finished so as to restrain the passenger P, the inflation degree of the airbag 44 is "100%". A change amount of the inflation degree per unit time corresponds to the deploying speed.

Condition (I): Case where the Seating Posture is "Specific Posture"

The controller 84 monitors a condition of the side portion of the vehicle (particularly, a possibility of the side collision) on the basis of the position and the relative speed detected by the side collision predicting sensor 82, during the travel or the stop of the vehicle.

In the case where the seating posture is "specific posture", if the side collision is predicted at time t1 in advance of the side collision at time t4 in FIG. 31, as a result of monitoring, the controller 84 sets the actuation start time of the inflator 48 to "early stage" and sets the deploying speed of the airbag 44 to "low speed" regardless of the side collision speed.

In more detail, in order to set the actuation start time of the inflator 48 to "early stage", the controller 84 outputs the ignition command signal to the inflator 48 at time t2 before the generation (time t4) of the actual side collision. The inflator 48 is ignited on the basis of the ignition command signal, and the gas generating agent carries out the combustion reaction so as to generate a high-temperature and high-pressure gas. The gas is blown out from the gas outlet 51, and the inflation of the airbag 44 is started.

Further, in order to set the deploying speed of the airbag 44 to "low speed", the energization of the restraint member 72 continues being stopped. At this time, the restraint member 72 has a substantially annular shape surrounding the outer periphery of the anchor member 71, as shown in FIG. 29(A), and continues gripping the anchor member 71. On the basis of this grip, the coupling state of the coupling means is maintained, and the anchor member 71 continues being restrained.

If the inflation of the airbag 44 is started when the coupling means is in the coupled state, the belt 56 is pulled in accordance with the inflation and deployment of the airbag 44. In this case, since the belt 56 acts on the inflation and deployment of the airbag 44, the airbag 44 is inflated and deployed in accordance with different modes, between the preceding term and the latter term of the inflation and deployment period.

<Preceding Term of Inflation and Deployment Period>

Figure 32:
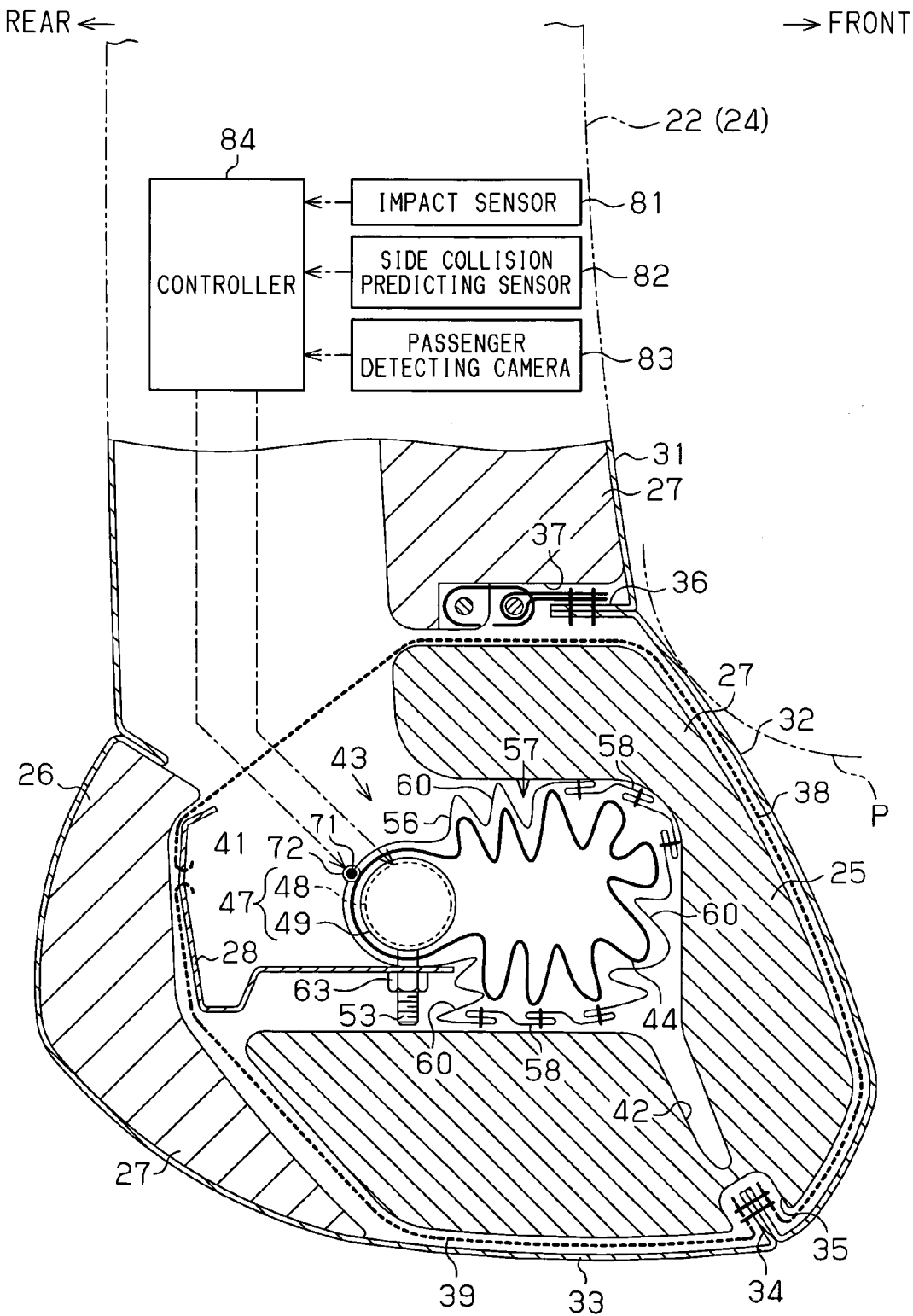
FIG. 32 is a partial cross-sectional plan view of a seat back showing an initial state when the airbag is inflated in the condition (I)
Figure 33:
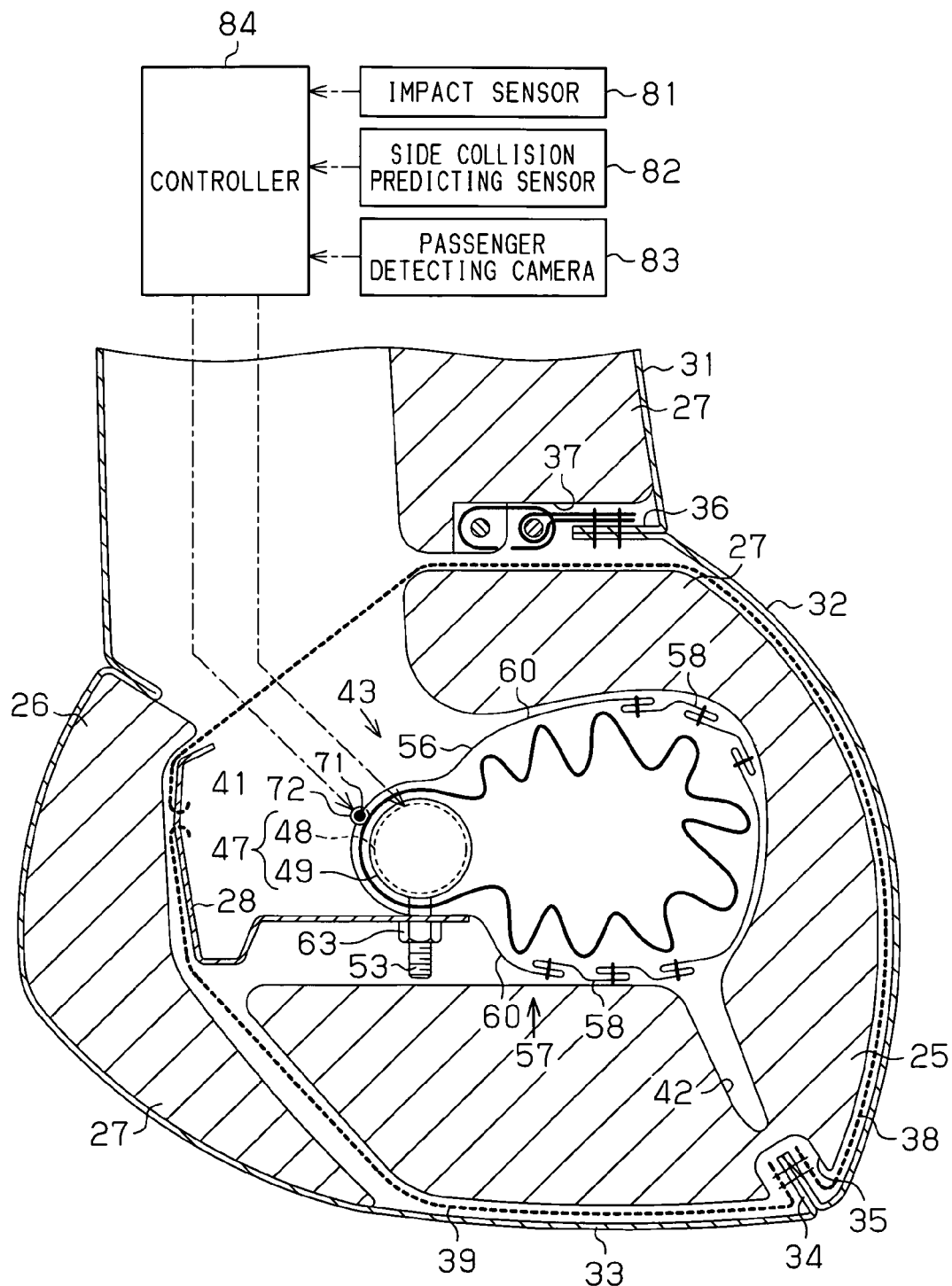
FIG. 33 is a partial cross-sectional plan view showing a state when the side support portion starts inflating.

As shown in FIG. 32, in the preceding term of the inflation and deployment period, the inflation of the airbag 44 is started by the gas, and the binding tape 55 (FIG. 7(B)) binding the airbag 44 is broken. Further, the folded airbag 44 is inflated and deployed within the storage space 41.

The belt 56 arranged outside the airbag 44 is pulled to the front side by the airbag 44 being inflated and deployed. Accordingly, three fold pieces 61 of each of the first redundant portions 58 are pulled forward while being retained by the retention portion 62, on the basis of the inflation and deployment of the airbag 44. In this stage, each of the second redundant portions 60 is elongated, however, is in the slackened state. Accordingly, the belt 56 does not prevent the inflation and deployment of the airbag 44. As a result, the airbag 44 is inflated and deployed at the same level of deploying speed V2 as the conventional side airbag apparatus, after time t2. The deploying speed V2 averagely expresses the deploying speed between the predetermined timings.

<Latter Term of Inflation and Deployment Period>

In the process that the airbag 44 is inflated and deployed in the storage space 41, the airbag 44 presses the side support portion 25 forward. At time t3 when the inflation and deployment of the airbag 44 further makes progress, the side support portion 25 starts inflating forward on the basis of the pressing by the airbag 24 (refer to FIG. 33).

At time t3, the belt 56 is pulled by the airbag 44 being inflated and deployed, and all the second redundant portions 60 are tensioned. In contrast, each of the first redundant portions 58 is retained in a state in which each of the fold pieces 61 is folded by the retention portion 62. Accordingly, the belt 56 comes to the tension state as a whole. Further, the retention force by the retention portion 62 forms a resistance against the inflation and deployment of the airbag 44. Therefore, since a part of the energy of the inflation and deployment of the airbag 44 is consumed, the deploying speed of the airbag 44 starts lowering after time t3.

Figure 34:
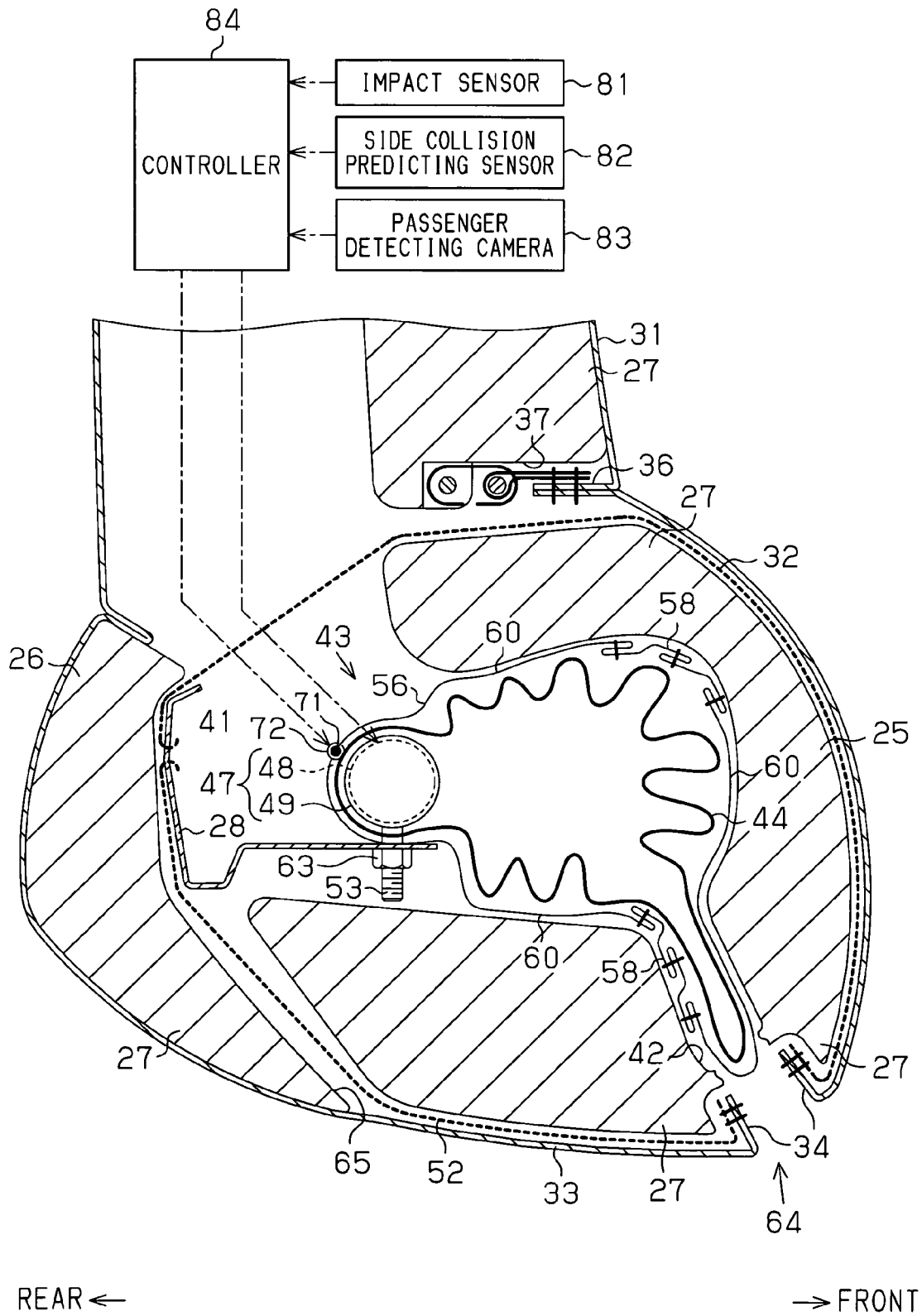
FIG. 34 is a partial cross-sectional plan view showing a state when a breakable portion is broken.
Figure 35:
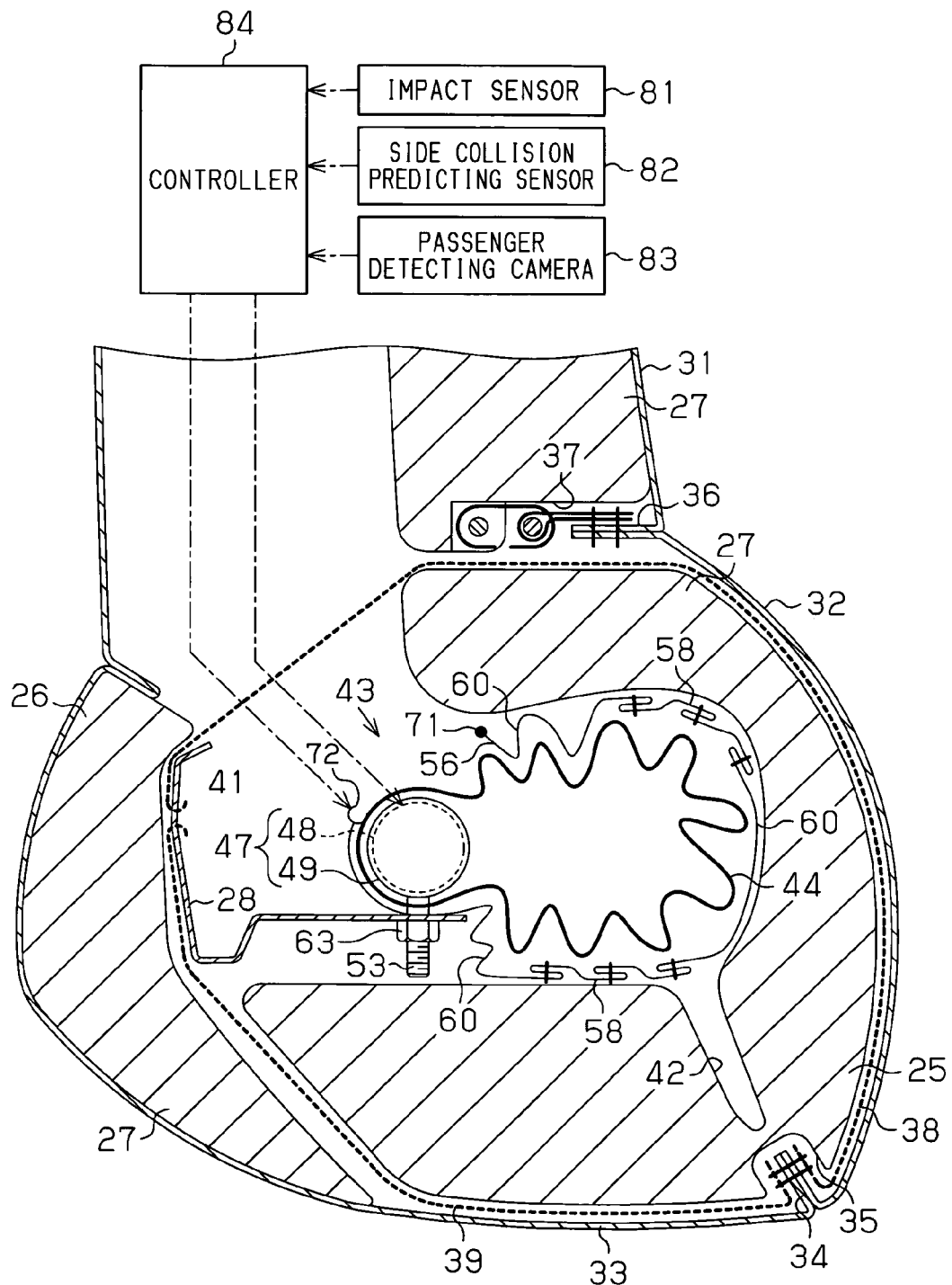
FIG. 35 is a partial cross-sectional plan view of a seat back showing an initial state when the airbag is inflated in conditions (II) and (III)

On the other hand, a part of the airbag 44 enters the slit 42 in accordance with the progress of the inflation of the airbag 44. The airbag 44 continues inflating and deploying even after entering the slit 42. Therefore, as shown in FIG. 34, the breakable portion of the side support portion 25 is broken in accordance with the progress of the inflation of the airbag 44. In other words, the thin portion of the seat pad 27 is broken, and the seam of the seamed portion 34 is dissolved, whereby the opening 64 is formed. The airbag 44 jumps out from the seat back 24 while expanding the opening 64. At this time, the side support portion 25 opens forward around the seamed portion 36, and also opens rearward around the notch 65 provided in the side portion of the seat pad 27. The airbag 44 jumping out from the opening 64 is inflated and deployed forward from the seat back 24 as shown in FIG. 35.

In this case, since the belt 56 is provided with plural sets of first redundant portions 58 and retention portions 62, and the retention strength of the retention portion 62 is different for each first redundant portion 58, the retention portion 62 having the lowest retention strength is first broken in the period between time t3 and time t6. Since the energy of the inflation and deployment of the airbag 44 is consumed for breaking the retention portion 62, the deploying speed of the airbag 44 is lowered.

In the first redundant portion 58 in which the retention portion 62 is broken, the structure folding and retaining three fold pieces 61 does not exist, so that a new slack is generated. However, since the airbag 44 is continuously inflated and deployed, the first redundant portion 58 is elongated, and the belt 56 is again tensioned. In the belt 56, the remaining retention portion 62 retains each of the first redundant portions 58 in the folded state. Since the energy of the inflation and deployment of the airbag 44 is consumed for breaking the retention portion 62 having the lowest retention strength among the remaining retention portions 62, the deploying speed of the airbag 44 is lowered.

Since the retention portion 62 is thereafter broken in order from the retention portion 62 having the low retention strength, and the energy of the inflation and deployment of the airbag 44 is consumed in every breakage, the deploying speed of the airbag 44 is lowered. As a result, in the period between time t3 and time t6, the airbag 44 is inflated and deployed at the lower deploying speed V1 than the conventional side airbag apparatus. The deploying speed V1 averagely expresses the deploying speed between the predetermined timings.

The inflation of the airbag 44 is finished at time t6. As shown in FIG. 5, the airbag 44 being inflated and deployed is interposed between the passenger P, particularly the wide portion from the lumbar region Pp to the thorax Pt, and the body side portion 21 bulging into the passenger compartment so as to absorb the shock applied to the passenger P from the side portion. At this time, the retention portions 62 in all the first redundant portions 58 are broken, and the belt 56 comes to the tension state by the airbag 44.

As mentioned above, the inflation of the airbag 44 is finished at the same time t6 as the conventional side airbag apparatus in spite that the deploying speed is lowered after time t3. This is because the start time of the inflation of the airbag 44 is advanced in comparison with the case of the conventional side airbag apparatus.

In other words, under the condition that the inflation and deployment of the airbag 44 is finished at the specific time t6, the time (the deploying time period) relating to the inflation and deployment of the airbag 44 is different in correspondence to the start time of the inflation and deployment. If the start time is advanced, the inflating and deploying time period is elongated in accordance therewith. As shown in FIG. 31, if time t5 immediately after the actual side collision is generated is set to the start time of the inflation and deployment, the period between time t5 and time t6 is the deploying time period T2. In contrast, if the side collision is predicted, and time t2 before the actual side collision is set to the start time of the inflation and deployment, the period between time t2 and time t6 is the deploying time period T1. The margin is created in the time necessary for the inflation and deployment in correspondence with the difference (=T1−T2) between both deploying time periods T1 and T2, and it is possible to lower the deploying speed by that degree.

Taking this point into consideration, in the present embodiment, the deploying speed of the airbag 44 is made lower than the deploying speed V2 at a time of starting the actuation of the inflator 48 after the side collision in the period (time t3 to time t6) at which the inflation of the airbag 44 is finished outside the vehicle seat 22 after the side support portion 25 starts inflating forward by the airbag 44. Accordingly, the energy applied to the passenger P as a reaction force of the airbag 44 being inflated and deployed is lowered.

In this case, when the airbag 44 is inflated and deployed within the vehicle seat 22, that is, until the side support portion 25 starts inflating forward (time t2 and time t3), the lowering of the deploying speed of the airbag 44 as mentioned above is not carried out. In this period, the airbag 44 is deployed and inflated at the same deploying speed V2 as the time when the actuation of the inflator 48 is started after the side collision. Since the side support portion 25 is not inflated during this period (time t2 and time t3) as mentioned above, the passenger is not pushed by the side support portion 25 even if the airbag 44 is quickly inflated and deployed.

Further, in FIG. 31, the description is given of the case where the deploying speed of the airbag 44 is switched from V2 to V1 at time t3 before the actual side collision is generated (time t4), however, the deploying speed of the airbag 44 may be switched after time t4. In the case where a part of the body of the passenger P is positioned in the region in which the airbag 44 is inflated and deployed, it is preferable that this switching timing is set to a timing as early as possible before time t6, in order to make the energy applied to the passenger P by the airbag 44 being inflated and deployed small. Specifically, the switching timing is preferably before time t5, and is more preferably before time t4. It is most preferable that the inflation and deployment of the airbag 44 is started at the slow deploying speed V1 from time t3 before the side collision is generated, as in the present embodiment. It is possible to securely reduce the deploying speed of the airbag 44 before the airbag 44 restrains the passenger P.

Condition (II): case where the seating posture is "normal posture" and the side collision speed is "medium or high speed"

In this case, if the side collision is predicted at time t1 in advance of the side collision at time t4 in FIG. 36, the actuation start time of the inflator 48 is set to "early stage", and the deploying speed of the airbag 44 is set to "normal".

In more detail, in order to set the actuation start time of the inflator 48 to "early stage", the ignition command signal is output to the inflator 48 at time t2 before the generation of the actual side collision (time t4). The inflator 48 is ignited on the basis of the ignition command signal, the high-temperature and high-pressure gas is generated and blown out, and the inflation of the airbag 44 is started.

Further, in order to set the deploying speed of the airbag 44 to "normal", the energization of the restraint member 72 is executed. On the basis of the energization, the restraint member 72 is transformed substantially in a circular arc shape along the outer periphery of the anchor member 71, as shown in FIG. 29(B). On the basis of the transformation, the gripping force of the anchor member 71 by the restraint member 72 is weakened, and the coupling (the restraint) of the anchor member 71 by the restraint member 72 is canceled. In this coupling canceled state, the anchor member 71 is released from the grip by the restraint member 72. Accordingly, as shown in FIG. 35, the other end portion 56B of the belt 56 is disconnected from the vehicle seat 22, in a state in which only one end portion 56A of the belt 56 is fixed to the vehicle seat 22. Therefore, it is impossible to bring out the function of preventing the inflation and deployment of the airbag 44 so as to lower the deploying speed.

The airbag 44 is inflated and deployed in the storage space 41 immediately after starting the gas feed. The airbag 44 breaks the vehicle seat 22, and jumps out of the vehicle seat 22 while leaving a part of the airbag 44 in the storage space 41. The airbag 44 is inflated and deployed toward the front side from the vehicle seat 22 in the passenger restraint region Z1 (refer to FIG. 2). The airbag 44 being inflated and deployed pushes the passenger P directly to the side portion so as to restrain.

As a result, the airbag 44 is inflated and deployed at the same level of the deploying speed V2 as the conventional side airbag apparatus after time t2, as shown by a characteristic line L1 in FIG. 36. The deployment and inflation of the airbag 44 is finished at time t6A which is earlier than the case where the inflator 48 is actuated so as to start the inflation and deployment of the airbag 44 after detecting the side collision.

Condition (III): Case where the Seating Posture is "Normal Posture" and the Side Collision Speed is "Low Speed"

In this case, the actuation start time of the inflator 48 is set to "normal", and the deploying speed of the airbag 44 is set to "normal".

In more detail, in order to set the actuation start time of the inflator 48 to "normal", if the generation of the side collision is detected by the impact sensor 81 at time t4 regardless of whether a side collision is predicted, as shown in FIG. 37, the ignition command signal is output to the inflator 48 at time t5 immediately after the detection. The inflator 48 is ignited on the basis of the ignition command signal, the high-temperature and high-pressure gas is generated and blown out, and the inflation of the airbag 44 is started.

Further, in order to set the deploying speed of the airbag 44 to "normal", the energization of the restraint member 72 is executed. On the basis of the energization, the restraint member 72 is transformed, and the coupling (the restraint) of the anchor member 71 by the restraint member 72 is canceled (the coupling canceled state). In this case, in the same manner as the condition (II), in a state in which only one end portion 56A of the belt 56 is fixed to the vehicle seat 22 the other end portion 56B of the belt 56 is disconnected from the vehicle seat 22. Therefore, it is impossible to bring out the function of preventing the inflation and deployment of the airbag 44 so as to lower the deploying speed.

Accordingly, the airbag 44 is inflated and deployed in the storage space 41 immediately after starting the gas feed. The airbag 44 breaks the vehicle seat 22, and jumps out of the vehicle seat 22 while leaving a part of the airbag 44 in the storage space 41. The airbag 44 is inflated and deployed toward the front side from the vehicle seat 22 in the passenger restraint region Z1 (refer to FIG. 2). The airbag 44 being inflated and deployed pushes the passenger P directly to the side portion so as to restrain.

As a result, the airbag 44 is inflated and deployed at the same level of the deploying speed V2 as the conventional side airbag apparatus after time t5, as shown by a characteristic line L1 in FIG. 37, and the deployment and inflation of the airbag 44 is finished at the same time t6 as the case of the conventional side airbag apparatus.

As mentioned above, in the case where the passenger P is seated in "normal posture" and the side collision speed is "low speed", the actuation start time of the inflator 48 is set to "normal" because of the following points.

The internal pressure of the airbag 44 inflated and deployed by the gas is changed in accordance with an elapse of the time. The inner pressure of the airbag 44 is increased at an early stage of the inflation and deployment, becomes maximum when the inflation and deployment is finished, and thereafter comes down. Accordingly, it is desirable that the restraint of the passenger by the airbag 44 is carried out when the internal pressure of the airbag 44 is maximum.

Figure 38:
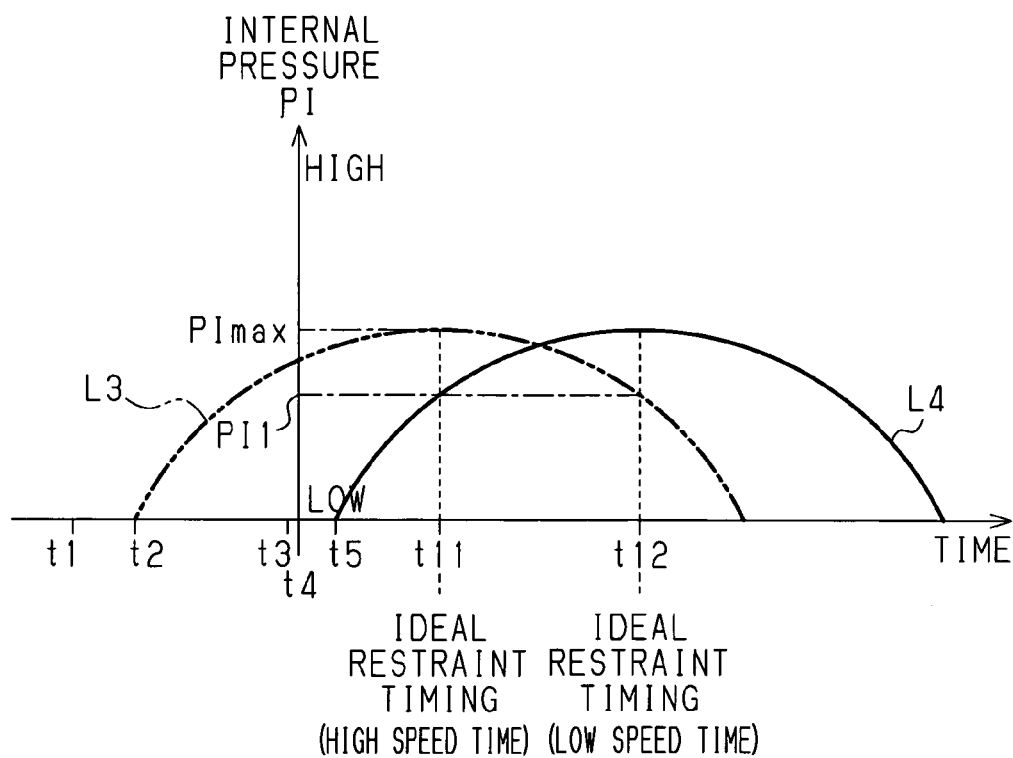
FIG. 38 is a graph showing changes over time of an internal pressure of the airbag.
Figure 39:
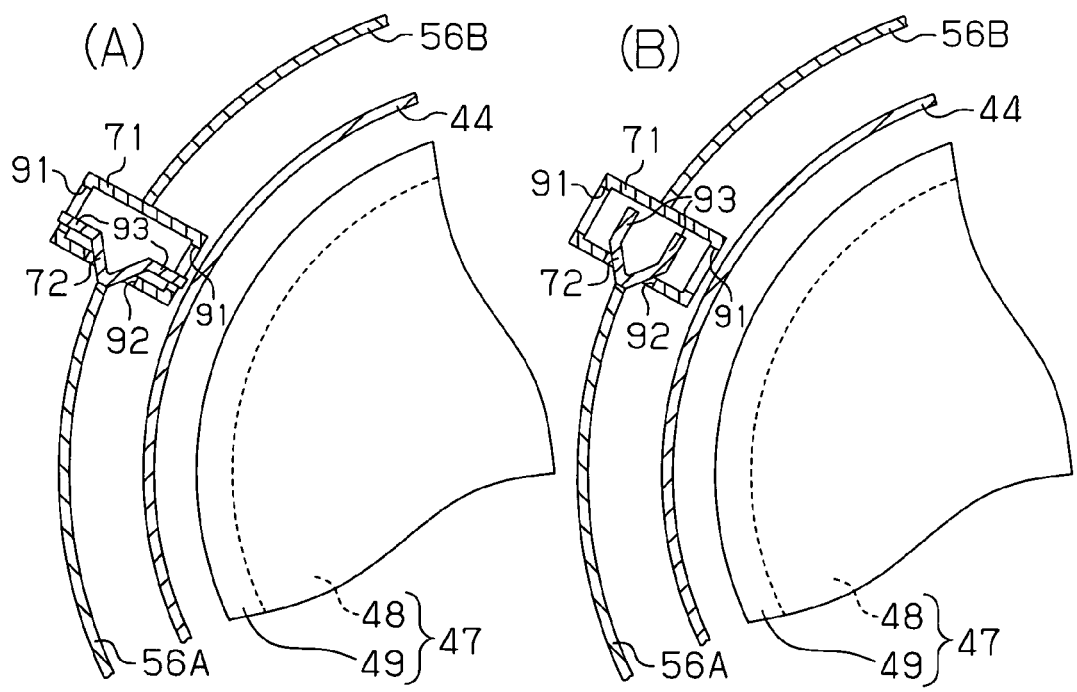
FIG. 39(A) is a partial cross-sectional view showing coupling means in accordance with a modification.
FIG. 39(B) is a partial cross-sectional view showing a state in which a coupling by the coupling means is cancelled.
Figure 40:
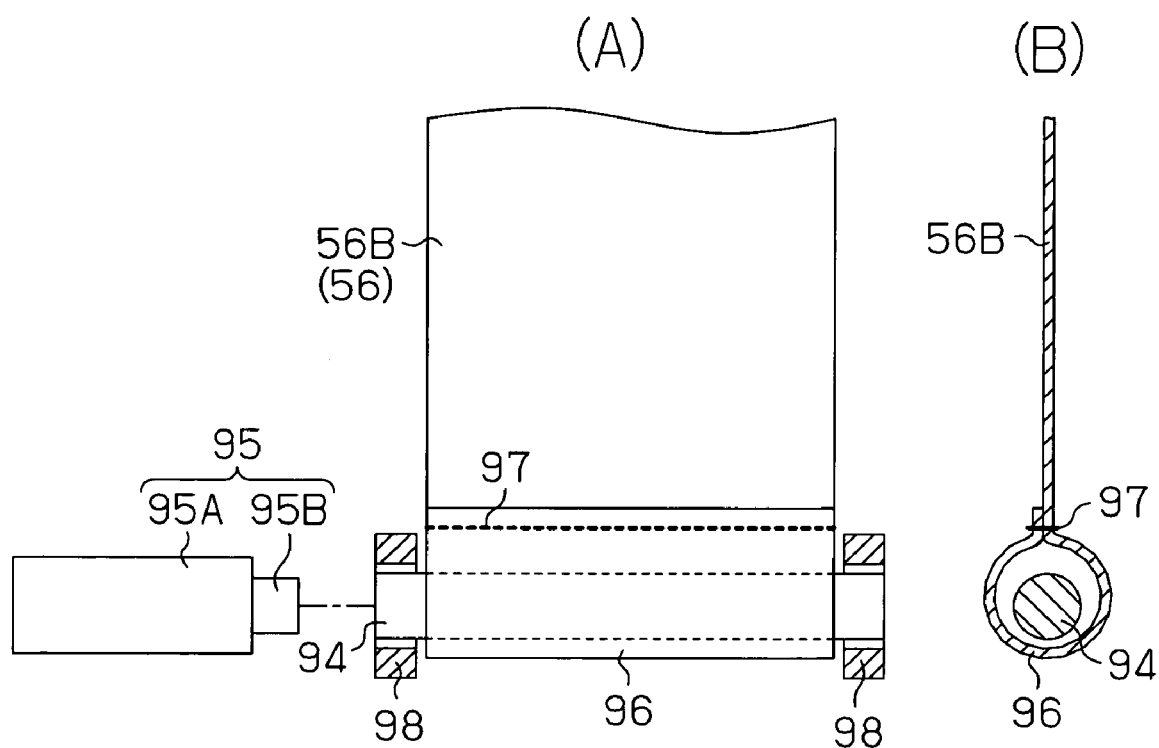
FIG. 40(A) is a partial cross-sectional plan view showing coupling means in accordance with a modification.
FIG. 40(B) is a side cross-sectional view of FIG. 40(A)

On the other hand, after the side collision is generated, the desirable restraining timing for restraining the passenger P by the airbag 44 is different in correspondence to the relative speed (the side collision speed) between the vehicle and the side collision subject as shown in FIG. 38. The desirable restraining timing is an early time t11 when the side collision speed is high (e.g. at a time of high speed), and is a late time t12 when the side collision speed is low.

Further, if the actuation start time of the inflator 48 is advanced, the period of the inflation and deployment of the airbag 44 is advanced as shown by a characteristic line L3 in FIG. 38. In accordance with this, a time at which the internal pressure PI of the airbag 44 comes to the maximum value PImax is advanced.

In other words, if the actuation start time of the inflator 48 is advanced when the side collision speed is low, there is a risk that the internal pressure PI of the airbag 44 reaches the maximum value PImax earlier than a restraint timing (time t12) corresponding to the side collision speed. In this case, since the passenger P is restrained by the airbag 44 having the internal pressure PI1 which is lower than the maximum value PImax, the protecting performance of the passenger P is not sufficiently brought out.

In the present embodiment, in the case where the passenger P is seated in the normal posture, and the side collision speed between the vehicle and the side collision subject is low, change of the actuation start time of the inflator 48 is inhibited. The normal posture means a posture in which a part of the body of the passenger P does not exist in the passenger restraint region Z1, and the passenger P is seated at the normal position of the vehicle seat 22. In this case, the actuation start time of the inflator 48 is the same as the actuation start time (time t5) of the inflator 48 in the case where the side collision of the vehicle is detected by the impact sensor 81. In accordance with this, the period of the inflation and deployment of the airbag 44 is the same as the case where the side collision of the vehicle is detected by the impact sensor 81. As a result, the internal pressure PI of the airbag 44 is changed in the same manner as the case where the side collision of the vehicle is detected by the impact sensor 81, as shown by a characteristic line L4 in FIG. 38. Accordingly, the timing at which the internal pressure PI of the airbag 44 comes to the maximum value PImax comes close to an ideal restraint timing (time t12) at a time of the low speed.

In accordance with the eighth embodiment in detail mentioned above, the following advantages are obtained.

(1) The structure detects whether a part of the body of the passenger P exists in the passenger restraint region Z1 of the airbag 44 as well as monitoring the condition on a side of the vehicle. In the condition (I) in which the side collision is predicted, and a part of the body of the passenger P is detected to exist in the passenger restraint region Z1 of the airbag 44, the actuation start time of the inflator 48 is advanced from the actuation start time corresponding to the detection of the side collision by the impact sensor 81. Further, outside the vehicle seat 22, the structure is made such that the airbag 44 is inflated and deployed at the deploying speed V1 which is lower than the deploying speed V2 when the actuation of the inflator 48 is started after the side collision. Accordingly, since the energy applied to the passenger P as the reaction force of the airbag 44 being inflated and deployed is lowered, and the passenger P is reliably restrained, the passenger protecting performance is improved.

Further, in the conditions (II) and (III) in which the passenger P is seated in the normal posture, the structure is made such that the airbag 44 is inflated and deployed at the same deploying speed V2 as that at a time of starting the actuation of the inflator 48 after the side collision. Accordingly, it is possible to protect the passenger P seating in the normal posture from the shock by the quickly airbag 44 being inflated and deployed.

(2) The advantage in the condition (I) is sufficiently obtained even in the case where the period after the airbag 44 jumps out from the vehicle seat 22 is set to the latter term of the inflation and deployment period. In the present embodiment, the period until the airbag 44 comes out of the vehicle seat 22 after the airbag 44 is inflated within the vehicle seat 22 and the vehicle seat 22 starts inflating forward is included in the latter term of the inflation and deployment period mentioned above. Accordingly, even when the airbag 44 indirectly presses the passenger P with the vehicle seat 22, the energy applied to the passenger P with the side support portion 25 is lowered, the restraint of the passenger P is easily achieved, and the passenger protecting performance is further improved.

(3) In the preceding term of the inflation and deployment period in the condition (I), the airbag 44 is deployed and inflated at the same deploying speed V2 at a time of starting the actuation of the inflator 48 after the side collision. Accordingly, the airbag 44 is quickly inflated and deployed in the vehicle seat 22, and can get ready for the inflation and deployment of the airbag 44 outside the vehicle seat 22. In the preceding term of the inflation and deployment period, the vehicle seat 22 is not inflated forward by the airbag 44. Accordingly, the airbag 44 does not indirectly push the passenger P through the vehicle seat 22. Therefore, even if the airbag 44 is quickly inflated and deployed as mentioned above, the passenger protecting performance is not lowered.

(4) The side collision speed between the vehicle and the side collision subject is detected. In the case of the condition (II) that the side collision is predicted in the condition that the passenger P is seated in the normal posture, and the detected side collision speed is the medium or high speed, the actuation start time of the inflator 48 is advanced in comparison with the case of the conventional side airbag apparatus (refer to FIG. 36). In this case, since the passenger P is restrained by the airbag 44 from an earlier stage, the passenger protecting performance is improved.

(5) The structure detects the side collision speed between the vehicle and the side collision subject, and detects the seated position of the passenger P in the vehicle seat 22. When the side collision is predicted, in the case where the passenger P is detected to seat in the normal posture and the side collision speed is low, the period of the inflation and deployment of the airbag 44 is set to the same as the case of detecting the side collision of the vehicle by inhibiting the change of the actuation start time of the inflator 48 and setting the actuation start time to the same timing as the case where the side collision of the vehicle is detected by the impact sensor 81 (refer to FIGS. 37 and 38).

Accordingly, it is possible to approximate the time at which the internal pressure PI of the airbag 44 comes to the maximum value PImax to the desirable restraint timing (time t12) corresponding to the low side collision speed. Even in the case where the side collision speed is low, it is possible to properly restrain the passenger P when the internal pressure PI of the airbag 44 is high.

(6) In the case where the airbag 44 is in the storage mode, the belt 56 having the slack redundant portion 57 is used, and the one end portion 56A of the belt 56 is fixed to the side frame portion 28. Further, the coupling means constituted by the anchor member 71 and the restraint member 72 can be switched to a coupling state for coupling the other end portion 56B of the belt 56 to the side frame portion 28, and a coupling canceled state for canceling the coupling. Further, the first redundant portion 58 is folded and retained by the retention portion 62 provided in each of the first redundant portions 58 of the redundant portion 57, and the retention is canceled in accordance with the inflation and deployment of the airbag 44. Accordingly, in the condition (I), a part of the energy of the inflation and deployment of the airbag 44 is consumed for breaking the retention portion 62 by retaining the coupling means in the coupling state, whereby the deploying speed of the airbag 44 is set to the low speed (the deploying speed V1). Further, in the conditions (II) and (III), since the coupling means is switched to the coupling canceled state, and the belt 56 does not prevent the inflation and deployment of the airbag 44, the airbag 44 is inflated and deployed at the deploying speed V2.

(7) The retention strength of the retention portion 62 is different for each first redundant portion 58 on the basis of the combination of the first redundant portion 58 and the retention portion 62. Accordingly, the retention by the first redundant portion 58 is canceled in order from the first redundant portion 58 having the retention portion 62 having the low retention strength, in accordance with the inflation of the airbag 44. In other words, since the energy of the inflation and deployment of the airbag 44 is consumed each time the retention by the retention portion 62 is canceled in each of the first redundant portions 58, the deploying speed of the airbag 44 continues lowering over a predetermined period.

(8) The belt 56 is arranged outside the airbag 44. Accordingly, the inflation in the width direction of the airbag 44 is regulated by the belt 56, and the excessive inflation in the vehicle width direction is suppressed.

The eighth embodiment may be changed as follows.

(a) The deploying speed of the airbag 44 may be lowered only in the period that the airbag 44 is inflated and deployed outside the vehicle seat 22. In this case, the second redundant portion 60 may be slackened immediately before the airbag 44 comes out of the vehicle seat 22 from the storage space 41.

Further, the deploying speed of the airbag 44 may be lowered even in the period that the airbag 44 is inflated and deployed in the vehicle seat 22, that is, the storage space 41. In this case, in order to achieve the inflation and deployment of the airbag 44 at the high deploying speed V2 in the vehicle seat 22, the second redundant portion 60 may be omitted.

(b) The retention portion in each of the first redundant portions 58 may be formed by a different means from the sewing threads. For example, the adjacent fold pieces 61 in each of the first redundant portions 58 may be adhered by an adhesive agent. In this case, each of the first redundant portions 58 may be folded and retained.

(c) The retention portion 62 may be constituted by a pair of snap-fit type fastening parts such as a snap-fit button, a snap-fit hook or the like. In this case, a pair of fastening parts may be respectively provided in the opposing fold pieces 61 of the first redundant portion 58. In this case, the first redundant portion 58 can be retained in the folded state by coupling both fastening parts. Further, both fastening parts are separated in accordance with the inflation and deployment of the airbag 44, and the retention of the first redundant portion 58 is canceled.

(d) It is possible to change the number of the redundant portions 57 in the belt 56, and the number of the first redundant portions 58 in each of the redundant portions 57.

(e) In all the first redundant portions 58, the retention strength of the retention portion 62 may be different. A plurality of first redundant portions 58 may be divided into a plurality of groups, and the retention strength of the retention portion 62 may be different for each group. Further, the retention strength of the retention portion 62 may be identical in all the first redundant portions 58.

(f) In the case where the retention strength of the retention portion 62 is different between the first redundant portions 58, no demanded relation exists between the magnitude of the retention strength and the position of the first redundant portion 58. Accordingly, it is optional to make the retention strength higher in which of the retention portions 62 in the first redundant portion 58, and make the retention strength lower in which of the retention portions 62 in the first redundant portion 58.

(g) The coupling means for coupling the end portion 56B of the belt 56 to the vehicle seat 22 may be achieved by a different structure from the eighth embodiment. One example thereof is shown in FIGS. 39(A) and 39(B). In this modification, the coupling means is provided with the anchor member 71 and the restraint member 72. The anchor member 71 is formed in a substantially rectangular box shape, and is fixed to the end portion 56B of the belt 56. Locking holes 91 are respectively provided in a pair of opposing side walls of the anchor member 71, and one communication hole 92 is provided in a bottom wall of the anchor member 71. The restraint member 72 is formed by a shape memory alloy transforming in accordance with energization. A major part of the restraint member 72 is arranged within the anchor member 71. On the other hand, a part of the restraint member 72 is fixed to the end portion 56A of the belt 56 in a state of passing through a bottom wall of the anchor member 71 with the communication hole 92. The restraint member 72 is separated into two locking pieces 93 within the anchor member 71.

When the restraint member 72 is not energized, each of the locking pieces 93 is transformed in a bent state, and is locked to the corresponding locking hole 91, as shown in FIG. 39(A). On the basis of this locking, the anchor member 71 is coupled to the restraint member 72. In this case, the end portion 56B of the belt 56 is coupled to the side frame portion 28 with the anchor member 71, the restraint member 72, the end portion 56A of the belt 56, the bolt 53 and the nut 63 (a coupling state). The end portion 56A of the belt 56 is always fixed to the vehicle seat (the side frame portion 28). Accordingly, in this coupling state, both end portions 56A and 56B of the belt 56 are fixed to the vehicle seat 22.

Further, when the restraint member 72 is energized, each of the locking pieces 93 is transformed to the inner side of the anchor member 71 and comes out of the locking hole 91, as shown in FIG. 39(B). On the basis of this transformation, the locking of the restraint member 72 and the anchor member 71 is canceled, and the coupling (the restraint) of the anchor member 71 by the restraint member 72 is canceled (a coupling canceled state). In this coupling canceled state, only one end portion 56A of the belt 56 is fixed to the vehicle seat 22.

In accordance with the coupling means mentioned above, the coupling state and the coupling canceled state are switched by controlling the energization of the restraint member 72 by the controller 84.

(h) The coupling means may be achieved by a different structure from the eighth embodiment and the item (g). One example thereof is shown in FIGS. 40(A) and 40(B). In this modification, the coupling means is provided with a pin 94 and an actuator. A winding portion 96 loosely wound around the pin 94 is formed in the end portion 56B of the belt 56. A thick broken line in FIG. 40(A) shows a seamed portion 97 by the sewing threads. Both end portions of the pin 94 are exposed from a winding portion 96. On the other hand, a pair of bearings 98 are respectively provided in the vehicle seat 22, for example, the side frame portion 28. The pin 94 is supported so as to be movable along an axial direction with respect to the bearing 98, in both end portions thereof.

The actuator is provided for pushing out the pin 94 from the winding portion 96, and employs a micro gas generator (hereinafter, refer to as MGG) here. The MGG 95 is provided with a cylinder 95A, and a piston 95B slidably accommodated within the cylinder 95A. The MGG 95 is ignited in response to an input of a predetermined drive signal so as to generate gas, and makes the piston 95B protrude from the cylinder 95A. The pin 94 is pressed by the piston 95B of the MGG 95, and the pin 94 is pushed out from the winding portion 96.

In the coupling means mentioned above, when the MGG 95 is not actuated (when the piston 95B moves backward), a major part of the pin 94 is positioned within the winding portion 96, and both end portions of the pin 94 are supported by both bearings 98. On the basis of this support, the end portion 56B of the belt 56 is coupled to the vehicle seat 22 (the side frame portion 28) with the pin 94, and the bearing 98 (a coupling state). The end portion 56A of the belt 56 is always fixed to the vehicle seat (the side frame portion 28). Accordingly, in the coupling state, both end portions 56A and 56B of the belt 56 are fixed to the vehicle seat 22.

Further, if the MGG 95 is ignited in response to the input of the drive signal so as to generate the gas, the piston 95B protrudes from the cylinder 95A so as to hit the pin 94 and push out from the winding portion 96. On the basis of this pushing, the coupling (the restraint) of the end portion 56B of the belt 56 by the pin 94 is canceled (the coupling canceled state). In this coupling canceled state, only one end portion 56A of the belt 56 is fixed to the vehicle seat 22.

In the coupling means mentioned above, the coupling state and the coupling canceled state are switched by controlling the output of the drive signal applied to the MGG 95 by the controller 84. The MGG 95 may employ a structure for making the piston 95B jump out from the cylinder 95A by gas. In this case, the piston 95B employs an elongated structure, that is, an integral structure of the pin 94 and the piston 95B in FIG. 40(A). The piston 95B is inserted to the winding portion 96, and is supported by the bearing 98 so as to be movable in the axial direction. In this case, the bearing 98 may be arranged in both sides of the winding portion 96, or may be arranged in right side in FIG. 40(A).

In the coupling means mentioned above, when the MGG 95 is not actuated, a part of the piston 95B is supported by the bearing 98 in a state of being arranged within the winding portion 96. On the basis of this support, the end portion 56B of the belt 56 is coupled to the vehicle seat 22 with the piston 95B and the bearing 98. In other words, both end portions 56A and 56B of the belt 56 are fixed to the vehicle seat 22.

Further, if the MGG 95 is ignited in response to the input of the drive signal so as to generate the gas, the piston 95B jumps out from the cylinder 95A so as to come out from the winding portion 96 and the bearing 98. Accordingly, the force supporting the end portion 56B of the piston 95B to the bearing 98 disappears. Further, the coupling (the restraint) of the end portion 56B of the belt 56 by the pin 94 is canceled (the coupling canceled state). As a result, only the one end portion 56A of the belt 56 is fixed to the vehicle seat 22.

In the coupling means mentioned above, the coupled state and the coupling canceled state are switched by controlling the drive signal to the MGG 95 by the controller 84.

(i) It is possible to change the extending direction of the retention portion 62 in each of the first redundant portions 58. FIGS. 16 and 17 show one example thereof. In this modification, three fold pieces 61 of each of the first redundant portions 58 are seamed along the longitudinal direction of the belt 56, whereby the retention portion 62 is formed. In the latter term of the inflation and deployment period of the airbag 44, each of the retention portions 62 is broken in order from the rear side to the front side, in accordance with the progress of the inflation and deployment of the airbag 44. Since the energy of the inflation and deployment of the airbag 44 is consumed for breaking the retention portion 62, the deploying speed of the airbag 44 is lowered.

Although not illustrated, the extending direction of the retention portion 62 may be changed to a direction which diagonally intersects the longitudinal direction of the belt 56. In this case, the same advantages as the eighth embodiment can be expected.

In FIGS. 16 and 17, the adjacent retention portions 62 in the longitudinal direction of the belt 56 may be connected to each other.

(j) The one end portion 56A of the belt 56 may be fixed to the rear portion of the airbag 44 in place of the side frame portion 28. Further, the other end portion 56B of the belt 56 may be fixed directly to the side frame portion 28 with no one end portion 56A.

(k) In the case where the passenger P is seated at the normal position of the vehicle seat 22, and puts an arm on an armrest of the door, it is determined in the eighth embodiment that a part of the body of the passenger P exists in the passenger restraint region Z1, and the procedures in accordance with the condition (I) are executed. In the condition (I), the actuation start time of the inflator 48 is set to "early stage", and the deploying speed of the airbag 44 is set to "low speed", regardless of the side collision speed, as mentioned above.

However, in this case, there is hardly generated any problem if the energy applied to the arm of the passenger P as the reaction force of the airbag 44 being inflated and deployed is high, and it would rather be effective for smoothly inflating and deploying the airbag 44 to quickly push out the arm from the passenger restraint region Z1 by the airbag 44. Accordingly, in the case where only the arm exists in the passenger restraint region Z1, it can be assumed that a part of the body of the passenger P is not detected in the passenger restraint region Z1, and the passenger P may be determined to be seated in the normal posture.

(l) In the eighth embodiment, the passenger detecting camera 83 is used as the second detector and the position detector, however, other detectors may be used in place thereof or in addition thereto. For example, an infrared sensor, a load distribution sensor, a weight sensor or the like may be used. In these cases, it is possible to detect a weight of the passenger P seated on the vehicle seat 22, a load distribution of the passenger P applied to the seat back 24, and a position of each of the positions of the passenger P seated on the vehicle seat 22 with respect to the vehicle seat 22.

Further, in order to distinguish whether a part of the body of the passenger P exists in the passenger restraint region Z1 or the other simple interference material than the passenger P exists, it is possible to detect a surface temperature of the subject by using an infrared ray by means of a thermography apparatus. Further, for the same purpose, it is possible to detect an odor in the passenger restraint region Z1 by an odor sensor.

(m) When the passenger P is seated in the normal posture, it is possible to advance the actuation start time of the airbag 44 in the same manner as the case of the medium or high speed, even if the side collision speed is low.

(n) It is possible to use the belt 56 having a slightly shorter length than the entire length of the outer periphery of the airbag 44 being inflated and deployed. In this case, the structure may be made such that the belt 56 is separated when the inflation and deployment of the airbag 44 is finished. For example, the perforated line in the belt 56 may be formed along its width direction so that the perforated line may be cut when the inflation and deployment of the airbag 44 is finished and the belt 56 comes to the tension state.

Ninth Embodiment

Next, a description will be given of a ninth embodiment in accordance with the present invention with reference to FIGS. 41 to 43.

In the eighth embodiment, the structure is made such as to advance the actuation start time of the inflator 48 in comparison with the actuation start time corresponding to the detection of the side collision by the impact sensor 81, in the case where the predetermined execution condition is established. However, in the ninth embodiment, a further earlier stage is set as the advancing time, in addition to the time period in the eighth embodiment. In order to distinguish these two time periods, the former is referred to as "early stage" and the latter is referred to as "earliest stage". In the ninth embodiment, a timing about 2 milliseconds before the generating timing of the side collision is set as "early stage", and a timing about 3 to 4 milliseconds before the generating timing of the side collision is set as "earliest stage". These numerical values are only one example, and may be changed. When the side collision speed is high at a time of predicting the side collision, the controller 84 sets the actuation start time of the inflator 48 to "earliest stage" regardless of the seating posture of the passenger P.

Figures 41, 42:
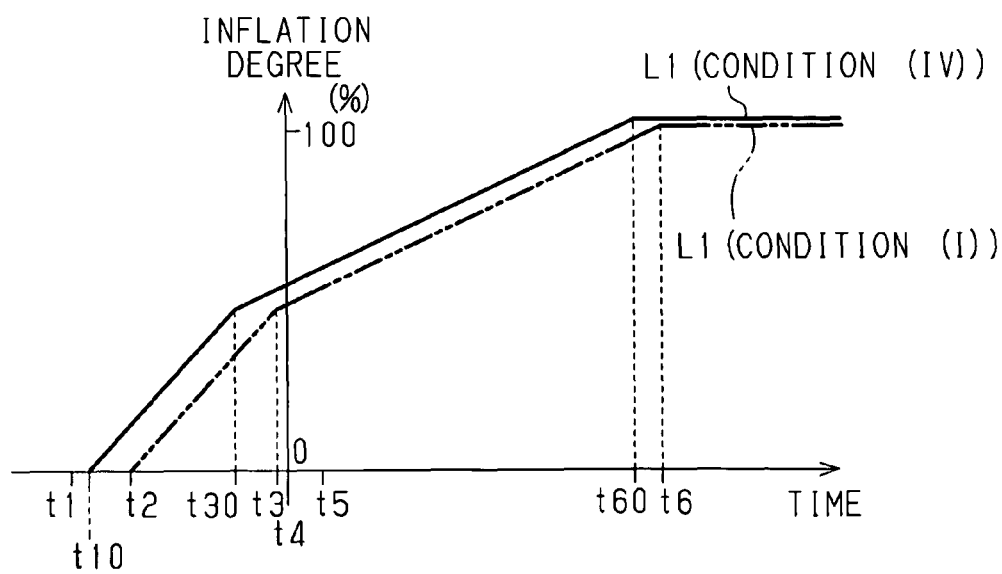
FIG. 41 is a view showing a relation among a seated posture, a side collision speed, and the content of control by a controller in a ninth embodiment.
FIG. 42 is a graph showing changes over time of an inflation degree of the airbag in a condition (IV)

FIG. 41 shows an outline of control content by the controller 84. The following two points (refer to cross-hatched portion) are differences from FIG. 30. One is a point that the actuation start time of the inflator 48 is set to "earliest stage" in the case where the side collision speed is high in the condition (I) in the eighth embodiment. The other is a point that the actuation start time of the inflator 48 is set to "earliest stage" in the case where the side collision speed is high in the condition (II). In this case, the former is referred to as a condition (IV), and the latter is referred to as a condition (V).

Next, a description will be given of contents of the control by the controller 84 in the conditions (IV) and (V) with reference to FIGS. 42 and 43.

Condition (IV): case where the seating posture is "specific posture," and the side collision speed is "high speed"

In this case, the side collision is predicted at time t1 in advance of the actual side collision at time t4 in FIG. 42. Then, the actuation start time of the inflator 48 is set to "earliest stage", and the deploying speed of the airbag 44 is set to "low speed".

In more detail, in order to set the actuation start time of the inflator 48 to "earliest stage", the ignition command signal is output to the inflator 48 at time t10 which is before the generation of the actual side collision (time t4) and before the case where the actuation start time is set to "early stage".

Further, in order to set the deploying speed of the airbag 44 to "low speed", the energization of the restraint member 72 continues being stopped. At this time, since the restraint member 72 continues gripping the anchor member 71, the coupling state of the coupling means is maintained.

Accordingly, the inflation degree is changed as shown by an actual characteristic line L1 in FIG. 42. In FIG. 42, the characteristic line L1 shown by the two-dot chain line corresponds to changes over time of the inflation degree in the condition (I). As is apparent from both characteristic lines L1, in the condition (IV), there is indicated a characteristic that the inflation degree is changed in the same tendency as the condition (I), however, is shifted to the earlier side as a whole. Specifically, the inflation and deployment of the airbag 44 is started at time t10. The airbag 44 is inflated and deployed at the high deploying speed V2 in a period until time t30 when the side support portion 25 starts inflating forward by the airbag 44 after time t10. Time t30 is before time t3 when the side support portion 25 starts inflating forward by the airbag 44 at a time of the condition (I).

The airbag 44 is inflated and deployed at the low deploying speed V1 in a period until time t60 when the airbag 44 finishes inflating and deploying after time t30. Time t60 is before time t6 when the inflation and deployment of the airbag 44 is finished in the condition (I).

Condition (V): case where the seating posture is "normal posture", and the side collision speed is "high speed"

Figure 43:
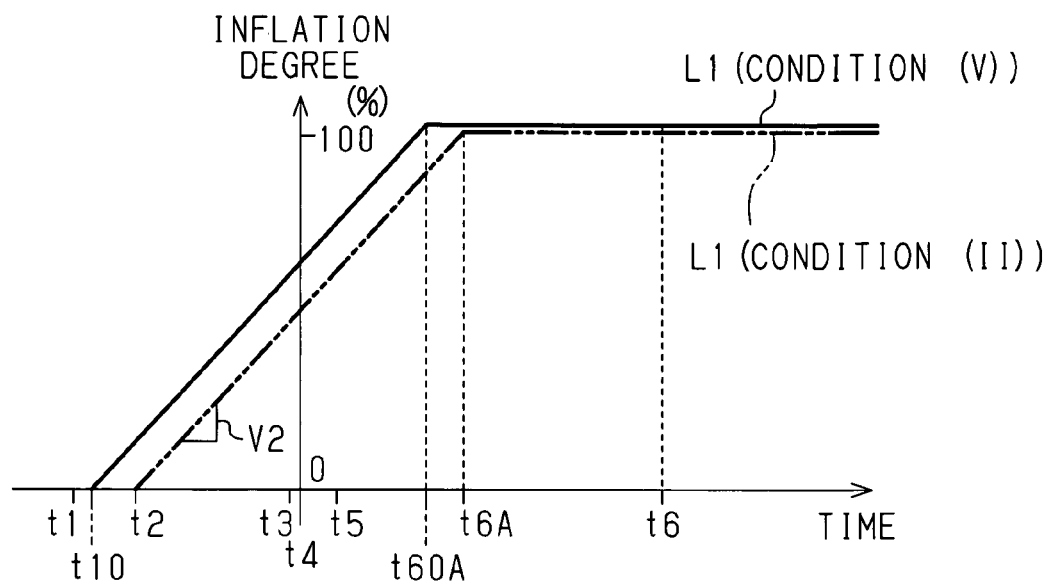
FIG. 43 is a graph showing changes over time of an inflation degree of the airbag in a condition (V)

In this case, if a side collision is predicted at time t1 in advance of the actual side collision at time t4 in FIG. 43, the actuation start time of the inflator 48 is set to "earliest stage", and the deploying speed of the airbag 44 is set to "normal".

In more detail, in order to set the actuation start time of the inflator 48 to "earliest stage", the ignition command signal is output to the inflator 48 at time t10 which is before the generation of the actual side collision (time t4) and before the case where the actuation start time is set to "early stage".

Further, in order to set the deploying speed of the airbag 44 to "normal", the restraint member 72 is energized. The restraint member 72 is transformed by this energization, and the coupling (the restraint) of the anchor member 71 by the restraint member 72 is canceled (the coupling canceled state).

Accordingly, the inflation degree is changed as shown by an actual characteristic line L1 in FIG. 43. In FIG. 43, the characteristic line L1 shown by the two-dot chain line corresponds to changes over time of the inflation degree in the condition (II). As is apparent from both characteristic lines L1, in the condition (V), there is indicated a characteristic that the inflation degree is changed in the same tendency as the condition (II), however, is shifted to the earlier side as a whole. Specifically, the inflation and deployment of the airbag 44 is started at time t10. The airbag 44 is inflated and deployed at the high deploying speed V2 in a period until time t60A when the inflation and deployment of the airbag 44 is finished after time t10. Time t60A is before time t6A when the inflation and deployment of the airbag 44 is finished at a time of the condition (II).

The other structures than the above are the same as the eighth embodiment. Therefore, in accordance with the ninth embodiment, the following advantage is obtained in addition to the same advantages as the advantages (1) to (8) mentioned above in the eighth embodiment.

(9) If the relative speed immediately before the side collision between the vehicle and the side collision subject is predicted to be high, the actuation start time of the inflator 48 is advanced in comparison with the case where the relative speed is not high (is medium or low). The change of the actuation start time as mentioned above is carried out regardless of whether a part of the body of the passenger P exists in the passenger restraint region Z1.

Since the actuation start time of the inflator 48 is advanced as mentioned above, the period of the inflation and deployment of the airbag 44 is shifted to the earlier side in both cases that the deploying speed is lowered and is not lowered. Accordingly, since the restraint of the passenger P by the airbag 44 is started from the early stage, the protecting performance of the passenger is improved.

The ninth embodiment may be changed in the same manner as the items (a) to (n) mentioned above.

Tenth Embodiment

Figure 44:
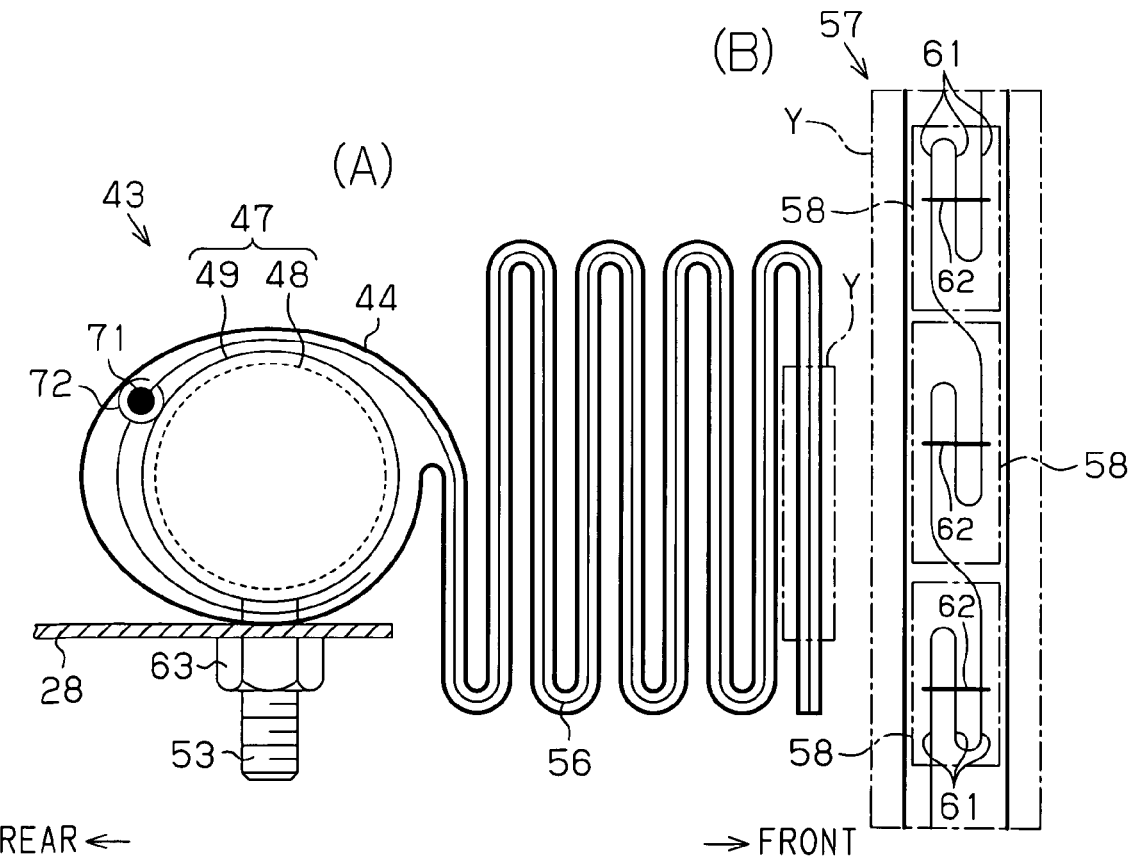
FIG. 44(A) is a cross-sectional plan view showing an airbag module in accordance with a tenth embodiment.
FIG. 44(B) is a cross-sectional plan view showing a portion Y in FIG. 44(A) in an enlarged manner.

Next, a description will be given of a tenth embodiment in accordance with the present invention with reference to FIGS. 44(A) and 44(B). The tenth embodiment is different from the eighth embodiment, in which the belt 56 is arranged outside the airbag 44, in that the belt 56 is arranged in the airbag 44.

The belt 56 has the same length as the distance between the rear end and the front end of the inflated and deployed airbag 44. The rear portion of the belt 56 is wound around the inflator assembly 47 within the airbag 44. The bolt 53 of the retainer 49 is inserted to the rear end portion of the belt 56. The rear end portion of the belt 56 is fixed to the side frame portion 28 by the bolt 53 and the nut 63. The front end portion of the belt 56 is coupled to the front end portion within the airbag 44 by means of the seam, the adhesion or the like.

The redundant portion 57 is formed in the intermediate portion in the longitudinal direction of the belt 56. The redundant portion 57 comes to a slackened state when the airbag 44 is in the storage mode. The redundant portion 57 has three first redundant portions 58. Each of the first redundant portions 58 is formed by folding the belt 56 along the fold line which is substantially orthogonal to the longitudinal direction of the belt 56. Each of the first redundant portions 58 is folded and retained by the retention portion 62. Each of the retention portions 62 is formed by seaming three fold pieces 61 in the direction which is substantially orthogonal to the longitudinal direction of the belt 56 by the sewing threads. In each of the first redundant portions 58, three fold pieces 61 are seamed at a different retention strength from the other first redundant portions 58. On the basis of the seam mentioned above, the retention strength is different for each first redundant portion 58.

The deployment control assembly is constructed by a plurality of first redundant portions 58 and the retention portions 62 provided to each first redundant portion 58. In the deployment control assembly, the raw material, the length and the width of the belt 56, and the number, the retention strength and the like of the first redundant portion 58 are set in such a manner as to satisfy the conditions (i) and (ii) mentioned above.

The other structures (including the coupling means) than the above are the same as the eighth embodiment. Accordingly, the same reference numerals are attached to the same members, portions and the like as the eighth embodiment, and a description thereof will be omitted.

In the tenth embodiment, the arranged position of the belt 56 is different from the eighth embodiment, however, since the energy of the inflation and deployment of the airbag 44 is consumed by the breakage of the retention portion 62 in the latter term of the inflation and deployment period, the deployment speed of the airbag 44 is lowered than the deployment speed V2.

The same advantages as the above (1) to (7) in the eighth embodiment are obtained by the tenth embodiment. The tenth embodiment may be modified in the same manner as the items (a) to (n) mentioned above.

The invention claimed is:

1. A side airbag apparatus absorbing a shock from a side portion of a vehicle so as to protect a passenger, comprising:
    an inflator for blowing out gas;
    an airbag stored in a vehicle seat, wherein the airbag inflates and deploys by the gas from the inflator, breaks the vehicle seat so as to extend out of the vehicle seat, and is inflated and deployed between a body side portion of the vehicle and the vehicle seat;
    inflator control means for predicting a side collision of the vehicle and for starting an actuation of the inflator in advance of the side collision in response to the prediction; and
    a deployment control assembly for lowering a deploying speed of the airbag at least outside the vehicle seat in comparison with a deploying speed at a time of starting the actuation of the inflator after the side collision,
    wherein the airbag is stored in the vehicle seat in a folded storage mode,
    wherein the deployment control assembly is provided with:
        an elongated member fixed to the vehicle seat or the airbag and having a redundant portion which slackens when the airbag is in the storage mode; and
        a retention portion retaining the redundant portion in the slackened state, and
    wherein the retention by the retention portion is canceled in accordance with the inflation and deployment of the airbag.

2. The side airbag apparatus according to claim 1, wherein the deployment control assembly lowers the deploying speed of the airbag in a period from when the airbag comes out of the vehicle seat after the airbag is inflated within the vehicle seat and the vehicle seat starts inflating forward.

3. The side airbag apparatus according to claim 1, wherein the airbag is stored in the vehicle seat in a folded storage mode, and
    wherein the deployment control assembly is provided with:
        an elongated member fixed to the vehicle seat or the airbag, slackening when the airbag is in the storage mode, and being tensioned by the airbag being inflated and deployed; and
        a separable portion provided in the elongated member and separating in accordance with the inflation and deployment of the airbag.

4. The side airbag apparatus according to claim 1, wherein the deployment control assembly is provided with an elongated member formed by a raw material having an elasticity, and the elongated member is fixed to the vehicle seat or the airbag, and is expanded by the airbag being inflated and deployed.

5. The side airbag apparatus according to claim 1, wherein the elongated member is arranged in the airbag.

6. The side airbag apparatus according to claim 1, wherein the airbag is provided with:
    a pair of overlapping portions obtained by folding a base fabric sheet into two or a pair of overlapping portion respectively constituted by base fabric sheets; and
    an outer coupling portion coupling both overlapping portions in the peripheral edge portions thereof,
    wherein the deployment control assembly is provided in a region surrounded by the outer coupling portion in the airbag, couples the both overlapping portions detachably, and is provided with an inner coupling portion separated in accordance with the inflation of the airbag.

7. The side airbag apparatus according to claim 1, wherein the deployment control assembly is provided with:
- a first fold portion provided in a rear portion of the airbag and accordion folded; and
- a second fold portion provided in a front portion of the airbag and roll folded,
- wherein, immediately after starting the actuation of the inflator, the deploying speed of the airbag is lowered at least outside the vehicle seat on the basis of a cancellation of a folded state of the first fold portion in the vehicle seat and a cancellation of a folded state of the second fold portion outside the vehicle seat.

8. The side airbag apparatus according to claim 1, wherein the deployment control assembly is provided with a movable member moving between a first position which limits an amount of gas blown out from the inflator and fed to the airbag and a second position which does not limit the gas amount, and
- wherein the movable member is moved to the first position, whereby the deploying speed of the airbag is lowered.

9. The side airbag apparatus according to claim 1, further comprising:
- a first detector detecting a side collision of a vehicle;
- a second detector detecting a part of the body of a passenger in the passenger restraint region;
- predicting means predicting a side collision of the vehicle; and
- changing means setting to an executing condition a fact that the side collision is predicted by the predicting means, and a part of the body is detected by the second detector, wherein, when the executing condition is established, the changing means advances an actuation start time of the inflator in comparison with an actuation start time in response to a detection of the side collision by the first detector,
- wherein, when the executing condition is established, the deployment control assembly lowers the deploying speed of the airbag in comparison with the deploying speed of the airbag carried out in response to the side collision detection by the first detector.

10. A side airbag apparatus absorbing a shock from a side portion of a vehicle so as to protect a passenger, comprising:
- an inflator for blowing out gas;
- an airbag stored in a vehicle seat, wherein the airbag inflates and deploys by the gas from the inflator, breaks the vehicle seat so as to extend out of the vehicle seat, and is inflated and deployed between a body side portion of the vehicle and the vehicle seat;
- inflator control means for predicting a side collision of the vehicle and for starting an actuation of the inflator in advance of the side collision in response to the prediction; and
- a deployment control assembly for lowering a deploying speed of the airbag at least outside the vehicle seat in comparison with a deploying speed at a time of starting the actuation of the inflator after the side collision,
- wherein the airbag is stored in the vehicle seat in a folded storage mode,
- wherein the deployment control assembly is provided with:
  - an elongated member fixed to the vehicle seat or the airbag and having a redundant portion which slackens when the airbag is in the storage mode; and
  - a retention portion retaining the redundant portion in the slackened state, and
- wherein the redundant portion is constituted by:
  - a first portion in which the retention by the retention portion is canceled in accordance with the inflation and deployment of the airbag; and
  - a second portion which is elongated in accordance with the inflation and deployment of the airbag before the retention by the retention portion is canceled.

* * * * *